(12) United States Patent
Okano et al.

(10) Patent No.: US 12,347,970 B2
(45) Date of Patent: Jul. 1, 2025

(54) SHOE APPARATUS, ACCESSORY, ACCESSORY SHOE APPARATUS, AND ELECTRONIC APPARATUS

(71) Applicant: CANON KABUSHIKI KAISHA, Tokyo (JP)

(72) Inventors: Yoshinobu Okano, Saitama (JP); Kenji Ishii, Kanagawa (JP); Hiromichi Sakamoto, Tokyo (JP); Takayuki Shu, Kanagawa (JP); Hiromi Hayasaki, Kanagawa (JP); Kouji Ikeda, Tokyo (JP); Yuhei Hattori, Tokyo (JP); Kei Tohyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 377 days.

(21) Appl. No.: 17/749,348

(22) Filed: May 20, 2022

(65) Prior Publication Data
US 2022/0393398 A1 Dec. 8, 2022

(30) Foreign Application Priority Data

Jun. 4, 2021 (JP) ................................. 2021-094031

(51) Int. Cl.
*H01R 13/631* (2006.01)
*G03B 15/02* (2021.01)

(52) U.S. Cl.
CPC .......... *H01R 13/631* (2013.01); *G03B 15/02* (2013.01); *G03B 2215/056* (2013.01)

(58) Field of Classification Search
CPC . G03B 15/02; G03B 2215/056; H01R 13/631
See application file for complete search history.

(56) References Cited

U.S. PATENT DOCUMENTS

2013/0002897 A1* 1/2013 Imafuji .................. G03B 17/14
348/E5.029

FOREIGN PATENT DOCUMENTS

JP 2018-084681 A 5/2018

* cited by examiner

*Primary Examiner* — Minh Q Phan
(74) *Attorney, Agent, or Firm* — Cowan, Liebowitz & Latman, P.C.

(57) ABSTRACT

A shoe apparatus attachable to and detachable from an accessory shoe apparatus of an electronic apparatus in a first direction includes a plurality of connection terminals arranged in a second direction orthogonal to the first direction, a shoe engagement portion engageable with the accessory shoe apparatus, and a terminal protecting portion configured to project from the shoe engagement portion toward a tip side in the first direction and to protect the plurality of connection terminals. The plurality of connection terminals are exposed in a direction orthogonal to the first and second directions from the terminal protecting portion, and include slopes that tilt in an exposed direction from inside to outside in the second direction on both sides in the second direction of the terminal protecting portion.

17 Claims, 39 Drawing Sheets

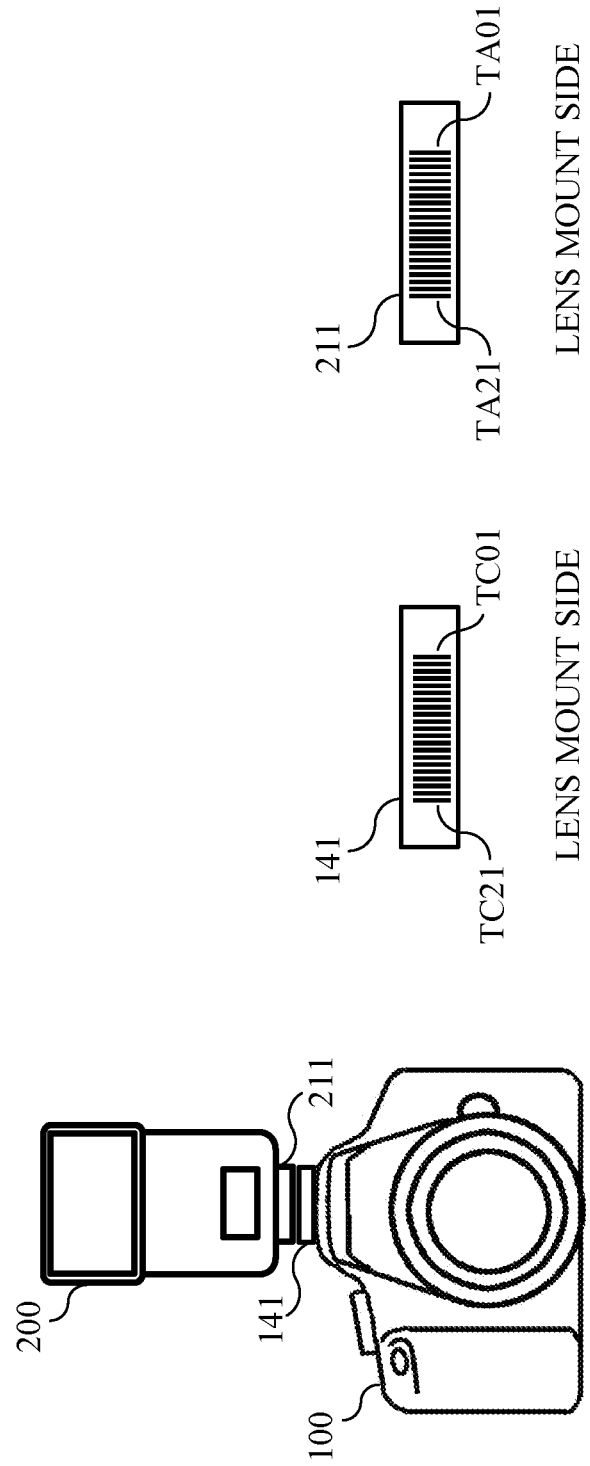

| SIGNAL NAME | ① MICROPHONE | | ② STROBO | |
|---|---|---|---|---|
| | FUNCTION | DIRECTION | FUNCTION | DIRECTION |
| FNC1 SIGNAL | GND | - | STARTX | CAMERA→ACCESSORY |
| FNC2 SIGNAL | DATA | ACCESSORY→CAMERA | UNUSE | - |
| FNC3 SIGNAL | LRCLK | ACCESSORY→CAMERA | UNUSE | - |
| FNC4 SIGNAL | BCLK | CAMERA→ACCESSORY | UNUSE | - |

FIG. 7

SHOE APPARATUS, ACCESSORY, ACCESSORY SHOE APPARATUS, AND ELECTRONIC APPARATUS

BACKGROUND OF THE INVENTION

Field of the Invention

The present invention relates to a shoe apparatus provided to an accessory to make the accessory attachable to and detachable from an electronic apparatus, and an accessory shoe apparatus provided to the electronic apparatus.

Description of the Related Art

An image pickup apparatus (electronic apparatus), such as a digital camera, includes an accessory shoe apparatus attachable to and detachable from a shoe apparatus of an accessory such as an illumination apparatus (flash unit). The accessory shoe apparatus includes an engagement member engageable with and configured to hold the shoe apparatus, and each of the accessory shoe apparatus and the shoe apparatus includes connection terminals for enabling bidirectional communication between the image pickup apparatus and the accessory. Conventionally, the number of connection terminals is often five.

Japanese Patent Laid-Open No. ("JP") 2018-084681 discloses an electronic viewfinder having a shoe apparatus attachable to and detachable from an accessory shoe apparatus of an image pickup apparatus, and the accessory shoe apparatus and the shoe apparatus maintain the compatibility with the five conventional connection terminals (communication pins) and increase the number of connection terminals within the shape of the engagement member.

However, if the shoe apparatus having a large number of connection terminals as disclosed in JP 2018-084681 gives priority to securing an area necessary to arrange those connection terminals, an area for a shape for protecting those communication terminals and a positioning area between components are limited. In addition, in the case where the shoe apparatus includes a terminal protecting portion for protecting the connection terminal separately from a portion engageable with the engagement member of the accessory shoe apparatus and an external force is applied to the accessory while the terminal protecting portion alone contacts the engagement member of the accessory shoe apparatus, the terminal protecting portion may get damaged.

SUMMARY OF THE INVENTION

The present invention provides a compact shoe apparatus etc., each of which can secure an area for arranging many communication terminals, an area for a shape for protecting them, and a positioning area between components, and suppress damages of a terminal protecting portion.

A shoe apparatus according to one aspect of the present invention is attachable to and detachable from an accessory shoe apparatus of an electronic apparatus in a first direction. The shoe apparatus includes a plurality of connection terminals arranged in a second direction orthogonal to the first direction, a shoe engagement portion engageable with the accessory shoe apparatus, and a terminal protecting portion configured to project from the shoe engagement portion toward a tip side in the first direction and to protect the plurality of connection terminals. The plurality of connection terminals are exposed in a direction orthogonal to the first and second directions from the terminal protecting portion, and include slopes that tilt in an exposed direction from inside to outside in the second direction on both sides in the second direction of the terminal protecting portion.

An accessory according to another aspect of the present invention includes the above shoe apparatus. An accessory shoe apparatus according to another aspect of the present invention is attachable to and detachable to the above shoe apparatus.

An electronic apparatus according to another aspect of the present invention includes the above accessory shoe apparatus.

Further features of the present invention will become apparent from the following description of exemplary embodiments with reference to the attached drawings.

BRIEF DESCRIPTION OF THE DRAWINGS

FIGS. 2A to 2C illustrate an example of the camera to which the accessory is attached and their contact arrangements according to the first embodiment.

FIG. 7 illustrates an assignment example of a functional signal to an accessory type according to the first embodiment.

DESCRIPTION OF THE EMBODIMENTS

Referring now to the accompanying drawings, a description will be given of embodiments according to the present invention.

First Embodiment

Figure 1:
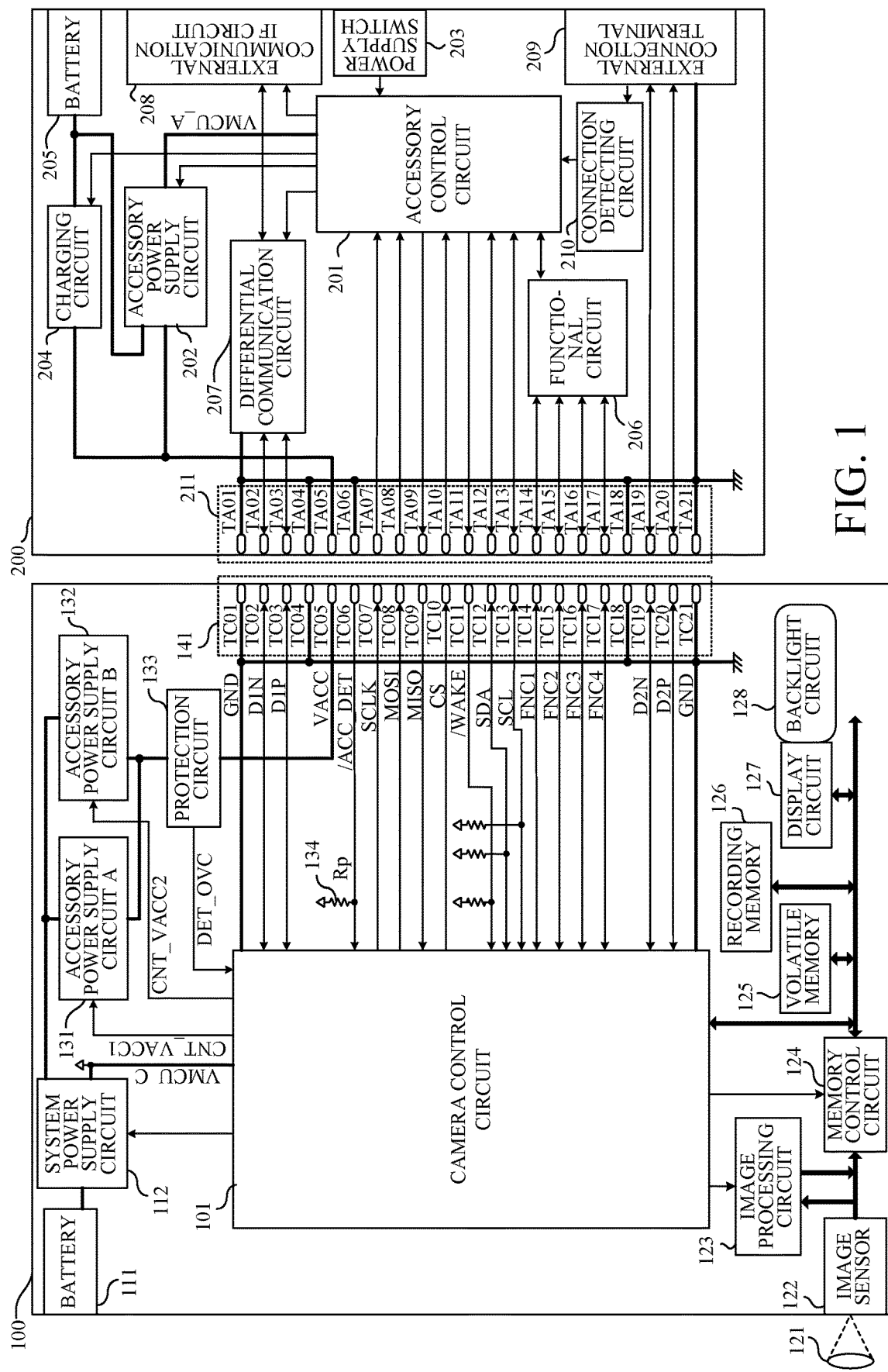
FIG. 1 illustrates configurations of a camera and an accessory according to a first embodiment of the present invention.

FIG. 1 illustrates an electrical configuration of a camera 100 as an electronic apparatus according to a first embodiment of the present invention and an accessory 200 detachably attached to the camera 100. In the camera 100 and the accessory 200, a plurality of contacts (terminals) TC01 to TC21 of a camera connector 141 provided in the camera 100 and a plurality of contacts TA01 to TA21 of an accessory connector 211 provided in the accessory 200 are connected to each other in a one-to-one correspondence, respectively and thereby they are electrically connected with each other.

The camera 100 is supplied with the electric power from a battery 111. The battery 111 is attachable to and detachable from the camera 100. A camera control circuit 101 as a control means of the camera 100 is a circuit that controls the entire camera 100, and includes a microcomputer having a built-in CPU or the like.

A system power supply circuit 112 is a circuit that generates a power supply for supplying the power to each circuit in the camera 100, and includes a DC/DC converter circuit, an LDO (Low Drop Out), a charge pump circuit, and the like. A voltage of 1.8V generated by the system power supply circuit 112 is constantly supplied as a camera microcomputer power supply VMCU_C from the battery 111 to the camera control circuit 101. The camera control circuit 101 controls the system power supply circuit 112 and thereby controls turning on and off of the power supply to each circuit of the camera 100.

An optical lens 121 is attachable to and detachable from the camera 100. Light from an object incident through the optical lens 121 is imaged on an image sensor 122 including a CMOS sensor, a CCD sensor, or the like. The object image formed on the image sensor 122 is encoded into a digital imaging signal. An image processing circuit 123 performs image processing such as noise reduction processing and white balance processing for the digital imaging signal to generate image data, and converts it into an image file, such as a JPEG format, in order to record the image data in a recording memory 126. The image processing circuit 123 generates from the image data VRAM image data for display on a display circuit 127.

A memory control circuit 124 controls a transmission and reception of the image data and other data generated by the image processing circuit 123 and the like. A volatile memory 125 is a memory capable of high-speed reading and writing such as DDR3 SDRAM, and is used for a workspace or the like of the image processing performed by the image processing circuit 123. The recording memory 126 is a readable and writable recording medium such as an SD card or CFexpress card that is attachable to and detachable from the camera 100 via an unillustrated connector. The display circuit 127 is a display located on the back surface of the camera 100, and includes an LCD panel, an organic EL display panel, and the like. A backlight circuit 128 adjusts the brightness of the display circuit 127 by changing a light amount of the backlight of the display circuit 127.

Each of an accessory-use power supply circuit A131 and an accessory-use power supply circuit B132 as the power supply means is a voltage conversion circuit that converts the voltage supplied from the system power supply circuit 112 into a predetermined voltage, and generates 3.3 V as an accessory power supply VACC in this embodiment.

The accessory-use power supply circuit A131 is a power supply circuit including an LDO or the like and having a low self-consumption power. The accessory-use power supply circuit B132 is a circuit that includes a DC/DC converter circuit or the like and can flow a larger current than that of the accessory-use power supply circuit A131. The self-consumption power of the accessory-use power supply circuit B132 is larger than that of the accessory-use power supply circuit A131. Therefore, when the load current is small, the accessory-use power supply circuit A131 is more efficient than the accessory-use power supply circuit B132, and when the load current is large, the accessory-use power supply circuit B132 is more efficient than the accessory-use power supply circuit A131. The camera control circuit 101 controls turning on and off of the voltage outputs of the accessory-use power supply circuits A131 and B132 according to the operating state of the accessory 200.

A protection circuit 133 as a protection means includes a current fuse element, a poly-switching element, an electronic fuse circuit that combines a resistor, an amplifier, and a switching element, and the like, and outputs an overcurrent detection signal DET_OVC when the power supply current values from the accessory-use power supply circuits A131 and B132 to the accessory 200 become excessive (abnormal) beyond a predetermined value. In this embodiment, the protection circuit 133 includes an electronic fuse circuit, and notifies the camera control circuit 101 through the overcurrent detection signal DET_OVC in the case where the current of 1 A or higher flows. The overcurrent detection signal DET_OVC indicates the overcurrent through the Hi level.

The camera connector 141 is a connector for an electrical connection with the accessory 200 via 21 contacts TC01 to TC21 arranged in a row. The contacts TC01 to TC21 are arranged in this order from one end to the other end in the arrangement direction thereof.

TC01 is connected to the ground (GND) and serves not only as a contact for the reference potential (GND potential) but also as a contact for controlling the wiring impedance of differential signals DIN and DIP described below. TC01 corresponds to a third grounded contact.

The differential signal DIN connected to TC02 and the differential signal DIP connected to TC03 are paired differential data communication signals that perform a data communication, and connected to the camera control circuit 101. TC02, TC03, TC07 to TC17, TC19, and TC20, which will be described later, are communication contacts.

TC04 as a first grounded contact is connected to GND and serves as a reference potential contact between the camera 100 and the accessory 200. TC04 is disposed outside TC05 described below in the contact arrangement direction.

The accessory power supply VACC generated by the accessory-use power supply circuits A131 and B132 is connected to TC05 as the power supply contact via the protection circuit 133.

An accessory attachment detection signal/ACC_DET is connected to TC06 as an attachment detection contact. The accessory attachment detection signal/ACC_DET is pulled up to the camera microcomputer power supply VMCU_C via a resistor element Rp134 (10 kΩ). The camera control circuit 101 can detect whether or not the accessory 200 is attached, by reading the signal level of the accessory attachment detection signal/ACC_DET. If the accessory attachment detection signal/ACC_DET signal level (potential) is a Hi level (predetermined potential), the accessory 200 is detected as being non-attached, and if it is a Lo level (GND potential as described later), the accessory 200 is detected as being attached.

When the camera 100 is powered on and the signal level (potential) of the accessory attachment detection signal/ACC_DET changes from the Hi level to the Lo level, various transmissions are performed between the camera 100 and the accessory 200 via the contacts.

The camera control circuit 101 supplies the power to the accessory 200 via TC05 as a power supply contact when the attachment state of the accessory 200 is detected.

SCLK connected to TC07, MOSI connected to TC08, MISO connected to TC09, and CS connected to TC10 are signals to be used by the camera control circuit 101 as a communication master to perform a SPI (Serial Peripheral Interface) communication. In this embodiment, the communication clock frequency of the SPI communication is 1 MHz.

A communication request signal/WAKE for requesting a communication from the accessory 200 to the camera control circuit 101 is connected to TC11. The communication request signal/WAKE is pulled up to the camera microcomputer power supply VMCU_C via a resistor. The camera control circuit 101 can receive the communication request from the accessory 200 by detecting a trailing edge of the communication request signal/WAKE.

SDA connected to TC12 and SCL connected to the TC13 are signals for the camera control circuit 101 to act as a communication master and perform an I2C (Inter-Integrated Circuit) communication. SDA and SCL are signals for an open drain communication (referred to as an open drain communication hereinafter) pulled up to the camera microcomputer power supply VMCU_C, and the communication frequency is 100 kbps in this embodiment.

In the I2C communication, both the data transmission from the camera 100 and the data transmission from the accessory 200 are performed via the SDA. When the SPI communication and the I2C communication are compared with each other, the I2C communication has a lower communication speed than that of the SPI communication, and can achieve a lower power consumption. The SPI communication has a higher communication speed than the I2C communication, and is therefore suitable for a communication of information having a large data amount.

Therefore, in the communication between the camera 100 and the accessory 200 according to this embodiment, information having a large data amount is communicated in the SPI communication, and information having a small data amount is communicated in the I2C communication. For example, data is first communicated in the I2C communication, and a control is made so that the SPI communication is further executed in the case where the SPI communication can be executed or the SPI communication needs to be executed based on this data.

An FNC1 signal connected to TCT4 (synchronous contact), an FNC2 signal connected to TC15, an FNC3 signal connected to TC16, and an FNC4 signal connected to TC17 are signals that can change the function according to the type of the attached accessory 200. For example, in the case where the accessory 200 is a microphone device, the signal communicated via TC 15 is an audio data signal. In the case where the accessory 200 is an illumination (strobe or flash) unit, the signal communicated via TC14 is a signal for controlling the light emission timing. Depending on the type of the attached accessory, a signal that realizes a different function may be communicated via the same contact. For example, in the case where the accessory 200 is an accessory other than the illumination unit, a synchronization signal for controlling a timing different from the light emission timing may be communicated via TC14. TC14 to TC17 correspond to functional signal contacts. A communication using at least one of the functional signal contacts is also referred to as a functional signal communication.

The functional signal communication can execute a communication at a timing that does not depend on the I2C communication or the SPI communication in parallel with the I2C communication and the SPI communication.

The type of the accessory, as used herein, means the above-mentioned microphone device, illumination unit, and the like. Accessories that achieve the same purpose, such as illuminations with different performances, belong to the same type. Accessories that achieve different purposes, such as a microphone device and an illumination unit, belong to different types.

The functional signal communication is executed based on the information acquired by the I2C communication or the SPI communication.

TC18 as a second grounded contact (reference potential contact) is also connected to GND, and is a contact that serves as a reference potential between the camera 100 and the accessory 200, similar to TC04.

A differential signal D2N connected to TC19 (first differential signal contact) and a differential signal D2P connected to TC20 (second differential signal contact) are paired data communication signals that perform a data communication and connected to the camera control circuit 101. For example, the USB communication can be performed via TC19 and TC20.

TC21 is connected to GND and can be used not only as a contact for a reference potential but also as a contact for controlling the wiring impedance of the differential signals D2N and D2P. TC21 corresponds to a fourth grounded contact. The contacts TC01, TC04, TC06, TC18, and TC21 are connected, for example, to a GND portion of a flexible substrate 158 illustrated in FIGS. 17A and 17B, which will be described later, and the GND portion of the flexible substrate 158 is fixed with a metallic member having a GND level of the camera 100 by a screw 157 or the like. The metallic member having the GND level includes, for example, an engagement member 151, an unillustrated base plate inside the camera 100, and the like.

This embodiment disposes the attachment detection contact TC06 to which the accessory attachment detection signal/ACC_DET is connected is arranged, next to the contact (first clock contact) TC07 that transmits SCLK (first clock signal) as a clock signal. In general, a noise (clock noise) due to the potential fluctuation of the clock signal is transmitted to a contact adjacent to the contact of the clock signal, which may cause a malfunction. In particular, in a configuration having a large number of contacts and a short distance between contacts as in this embodiment, the influence is more significant. Accordingly, disposing the attachment detection contact TC06 next to the SCLK contact TC07 can suppress the influence of the clock noise.

The accessory attachment detection signal/ACC_DET is pulled up before the accessory is attached, but is set to the GND potential after the accessory is attached. On the other hand, the SCLK contact TC07 that transmits the clock signal does not transmit the clock signal before the accessory is attached, and thus the potential does not fluctuate. The potential fluctuates because the clock signal is transmitted only after the accessory is attached.

When the SCLK contact TC07 transmits the clock signal, the attachment detection contact TC06 is at the GND potential. Therefore, even if the attachment detection contact TC06 receives the clock noises, the potential of the control circuit of the camera 100 or the accessory 200 is less likely to fluctuate, so that the malfunction can be prevented. In addition, the clock noise can be restrained from transmitting to a position distant farther than the attachment detection contact TC06. As a result, since it is unnecessary to dispose the GND terminal, the influence of the clock noises can be suppressed without increasing the number of contacts.

SCL (second clock signal) as a clock signal is also transmitted to the contact (second clock contact) TC13. However, the frequency of SCLK transmitted to the SCLK contact TC07 is higher than that of SCL, and the SCLK contact TC07 generates more clock noises than the SCL contact TC13. Therefore, disposing the attachment detection contact TC06 next to the SCLK contact TC07 rather than next to the SCL contact TC13 can provide a greater effect of preventing the malfunction due to the clock noises.

In addition to the difference in frequency, SCL transmitted by the SCL contact TC13 is a clock signal of the I2C communication standard, and the voltage fluctuation of the signal line is driven by the open drain connection. On the other hand, SCLK transmitted by the SCLK contact TC07 is a clock signal pursuant to the SPI communication standard, and the voltage fluctuation of the signal line is driven by the CMOS output. Therefore, the SCL contact TC13 tends to have a gentler edge of the voltage fluctuation than the SCLK contact TC07, and the clock noises are less likely to occur. Thus, disposing the attachment detection contact TC06 next to the SCLK contact TC07 rather than next to the SCL contact TC13 is more effective in preventing the malfunction caused by the clock noises.

The differential signals DIN and DIP may be transmitted in pairs to the first and second differential signal contacts TC19 and TC20 to transmit the clock signal. At that time, a clock signal (third clock signal) having a frequency higher than that of the SCLK contact TC07 or the SCL contact TC13 may be transmitted. Since the differential signals DIN and DIP are paired signals, the emission of the clock noise is smaller than that of the SCLK contact TC07 or the SCL contact TC13 that transmits a single-ended signal. Therefore, disposing the attachment detection contact TC06 next to the SCLK contact TC07 rather than next to the first and second differential signal contacts TC19 and TC20 can more effectively prevent the malfunction caused by the clock noise.

The contact (first data contact) TC08 disposed on an opposite side of the attachment detection contact TC06 with respect to the SCLK contact TC07 transmits MOSI (first data signal). Since MOSI is a data signal, it appears to be susceptible to clock noises. Since MOSI is a data signal of the same SPI communication standard as the clock signal transmitted by the SCLK contact TC07, the fluctuation timing of the potential is synchronized with the clock signal and is less affected by the clock noise. Therefore, the contact TC08 does not have to be fixed to the GND potential and can be used as a MOSI contact.

The accessory 200 has a battery 205 and receives the power supply from the battery 205 and also receives the power supply from the camera 100 via the camera connector 141 and the accessory connector 211. An accessory control circuit 201 as a control means of the accessory 200 is a circuit that controls the entire accessory 200, and is a microcomputer having a built-in CPU and the like.

An accessory power supply circuit 202 is a circuit that generates a power supply to be supplied to each circuit of the accessory 200, and includes a DC/DC converter circuit, an LDO, a charge pump circuit, and the like. The voltage 1.8 V generated by the accessory power supply circuit 202 is constantly supplied as an accessory microcomputer power supply VMCU_A to the accessory control circuit 201. Turning on and off of the power supply to each circuit of the accessory 200 is controlled by controlling the accessory power supply circuit 202.

A charging circuit 204 is a circuit for charging the battery 205 using the power supplied from the camera 100. In the case where it can be determined that the sufficient power is supplied from the camera 100 to perform the charging operation, the accessory control circuit 201 controls the charging circuit 204 to charge the battery 205. Although the battery 205 attached to the accessory 200 has been described in this embodiment, the accessory 200 may operate only with the power supply from the camera 100 without the battery 205. In this case, no charging circuit 204 is necessary.

A differential communication circuit 207 is a circuit for performing a differential communication with the camera 100, and can transmit and receive data to and from the camera 100. An external communication IF circuit 208 is an IF circuit for performing a data communication with an unillustrated external device, such as an Ethernet communication IF, a wireless LAN communication IF, and a public network communication IF.

The accessory control circuit 201 controls the differential communication circuit 207 and the external communication IF circuit 208 and thereby can transmit the data received from the camera 100 to the external device or the data received from the external device to the camera 100. A functional circuit 206 is a circuit having a different function depending on the type of the accessory 200. A configuration example of the functional circuit 206 will be described later.

An external connection terminal 209 is a connector terminal connectable to an external device, and is a USB TYPE-C connector in this embodiment. A connection detecting circuit 210 is a circuit for detecting that an external device is connected to the external connection terminal 209, and the accessory control circuit 201 can detect that the external device has been connected to the external connection terminal 209 by receiving the output signal of the connection detecting circuit 210.

A power switch 203 is a switch for turning on and off the operation of the accessory 200, and the accessory control circuit 201 can detect the ON position and the OFF position by reading the signal level of the terminal to which the power switch 203 is connected.

The accessory connector 211 is a connector electrically connectable to the camera 100 via the 21 contacts TA01 to TA21 that are arranged in a row. The contacts TA01 to TA21 are arranged in this order from one end to the other end in the arrangement direction.

TA01 is connected to GND and serves not only as a contact of the reference potential but also as a contact for controlling the wiring impedance of the differential signals DIN and DIP. TA01 corresponds to a third grounded contact.

The differential signal DIN connected to TA02 and the differential signal DIP connected to TA03 are paired data communication signals for the data communication, and are connected to the differential communication circuit 207. TA02, TA03, TA07 to TA17, TA19, and TA20 described later are communication contacts.

TA04 as the first grounded contact is connected to GND and serves as a reference potential contact between the camera 100 and the accessory 200. TA04 is located outside TA05 described below in the contact arrangement direction.

The accessory power supply circuit 202 and the charging circuit 204 are connected to TA05 as the power supply contact, and the accessory power supply VACC supplied from the camera 100 is connected to it.

TA06 as an attachment detection contact is directly connected to GND, and turns the accessory attachment detection signal/ACC_DET described above into the GND level as the Lo level when the accessory 200 is attached to the camera 100. Thereby, it becomes it serves as a contact for causing the camera 100 to detect the attachment of the accessory 200.

SCLK connected to TA07, MOSI connected to TA08, MISO connected to TA09, and CS connected to TA10 are signals for the accessory control circuit 201 to act as a communication slave and perform the SPI communication.

The communication request signal/WAKE for requesting the communication from the accessory control circuit 201 to the camera 100 is connected to TA11. When the accessory control circuit 201 outputs the communication request signal/WAKE at the Lo level and requests the camera 100 for the communication in the case where the accessory control circuit 201 determines that the communication with the camera 100 is necessary.

When the power is supplied from the camera control circuit 101 to the accessory 200 via TC5 in response to detecting that the accessory 200 is in the attached state, the accessory control circuit 201 notifies the camera control circuit 101 of the reception of the power supply by changing the signal level (potential) of the communication request signal/WAKE from the Hi level to the Lo level.

The accessory control circuit 201 notifies that the accessory 200 has a cause of the communication with the camera 100 by changing the signal level (potential) of the communication request signal/WAKE from the Hi level to the Lo level even without any requests from the camera. With this configuration, the camera control circuit 101 can omit the operation of periodically checking whether or not the accessory 200 has a cause of the communication through polling. In addition, in the case where the accessary 200 has the cause of the communication, the accessory 200 can communicate the fact to the camera 100 on a real-time basis.

SDA connected to TA12 and SCL connected to TA13 are signals for the accessory control circuit 201 to act as a communication slave and perform the I2C communication.

The FNC1 signal connected to TA14 (synchronous contact), the FNC2 signal connected to TA15, the FNC3 signal connected to TA16, and the FNC4 signal connected to TA17 are signals whose functions can be changed according to the type of the accessory 200. For example, in the case where the accessory 200 is a microphone device, it is an audio data signal, and in the case where the accessory 200 is a strobe device, it is a signal for controlling the light emission timing. TA14 to TA17 correspond to functional signal contacts.

TA18 as the second grounded contact (reference potential contact) is also connected to GND, and serves as a reference potential contact between the camera 100 and the accessory 200, similar to TA04.

The differential signal D2N connected to TA19 (first differential signal contact) and the differential signal D2P connected to TA20 (second differential signal contact) are paired data communication signals for the data communication and connected to the external connection terminal 209.

TA21 is connected to GND and serves not only as a contact for a reference potential but also as a terminal for controlling the wiring impedance of the differential signals D2N and D2P. TA21 corresponds to a fourth grounded contact. The contacts TA01, TA04, TA06, TA18, and TA21 are connected, for example, to the GND portion of the flexible substrate 259 illustrated in FIGS. 19A and 19B, which will be described later, and the GND portion of the flexible substrate 259 is fixed to a metallic member having a GND level of the accessory 200 with an unillustrated screw etc. The metallic member having the GND level includes, for example, a shoe attachment leg 251 and an unillustrated base plate inside the accessory 200.

FIG. 2A illustrates that the accessory connector 211 disposed on the shoe provided on the lower part of the accessory (strobe device) 200 is connected to the camera connector 141 disposed on the accessory shoe provided at the top of the camera 100. FIG. 2B illustrates an arrangement example of the 21 contacts TC01 to TC21 in the camera connector 141. TC01 is disposed at the right end viewed from the object side, and the 21 contacts up to TC21 are arranged in a row. The accessory shoe is attached by sliding it from the top side to the bottom side in FIG. 2B relative to the accessory shoe having the camera connector 141.

FIG. 2C illustrates an arrangement example of the 21 contacts TA01 to TA21 in the accessory connector 211. Similar to the camera connector 141, TA01 is disposed at the right end viewed from the object side, and the 21 contacts up to TA21 are arranged in a row. Usually, the contacts TA01 to TA21 and the corresponding contacts TC01 to TC21 are connected to each other. However, if an excessive static pressure or impact is applied to the accessory 200, the contacts may be disconnected. In particular, when a force in the rotational direction acts on the direction in which the contacts are arranged in the accessory 200, the disconnection is likely to occur at the end contacts.

Figure 3A:
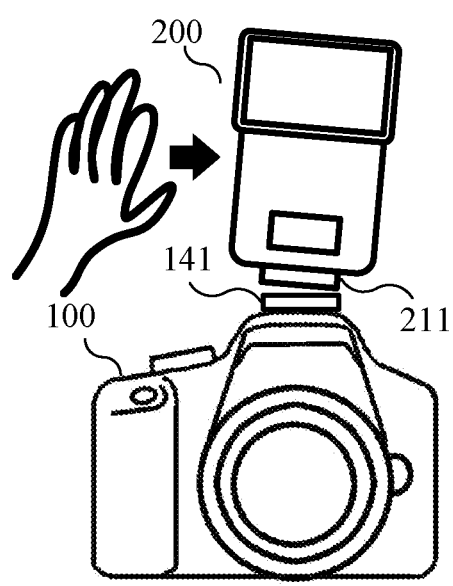
FIGS. 3A and 3B illustrate how an external force is applied to the accessory attached to the camera according to the first embodiment.

FIG. 3A exaggerates the appearance of the excessive static pressure applied to the accessory 200 from the left side viewed from the object side. At this time, a force acts on the contacts TC21 and TA21 and the neighboring contacts of the camera connector 141 and the accessory connector 211 in the disconnecting direction, and a poor connection is likely to occur. On the other hand, a stronger force acts on the contacts TC01 and TA01 and the neighboring contacts in the connecting direction than that in the normal state.

Figure 3B:
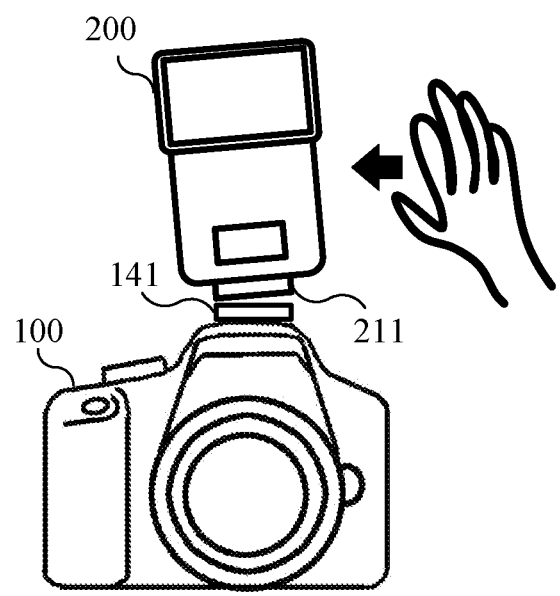

FIG. 3B exaggerates the appearance of the excessive static pressure applied to the accessory 200 from the right side viewed from the object side. At this time, a force acts on the contacts TC01 and TA01 and the neighboring contacts of the camera connector 141 and the accessory connector 211 in the disconnecting direction, and a poor connection is likely to occur. On the other hand, a stronger force acts on the contacts TC21 and TA21 and the neighboring contacts in the connecting directions than that in the normal state.

This embodiment connects to GND the contacts TC01 and TA01 and TC21 and TA21 at both ends of the camera connector 141 and the accessory connector 211. Thereby, even if a poor connection temporarily occurs at the contact at one end due to the excessive static pressure, the GND connection can be secured at the contact at the other end. Therefore, this configuration can restrain each circuit and electric element from getting damaged as a result of that the reference potential of the accessory 200 becomes unstable due to the poor GND connection.

In the case where the accessory 200 in which part of the GND contacts is missing is attached due to a defect and breakdown of the accessory connector 211 or the like, the camera control circuit 101 cannot detect that the part of the GND contacts is missing. In such a case, the operating current concentrates on the remaining GND contacts, and the accessory 200 may malfunction in some cases.

Figure 4A:
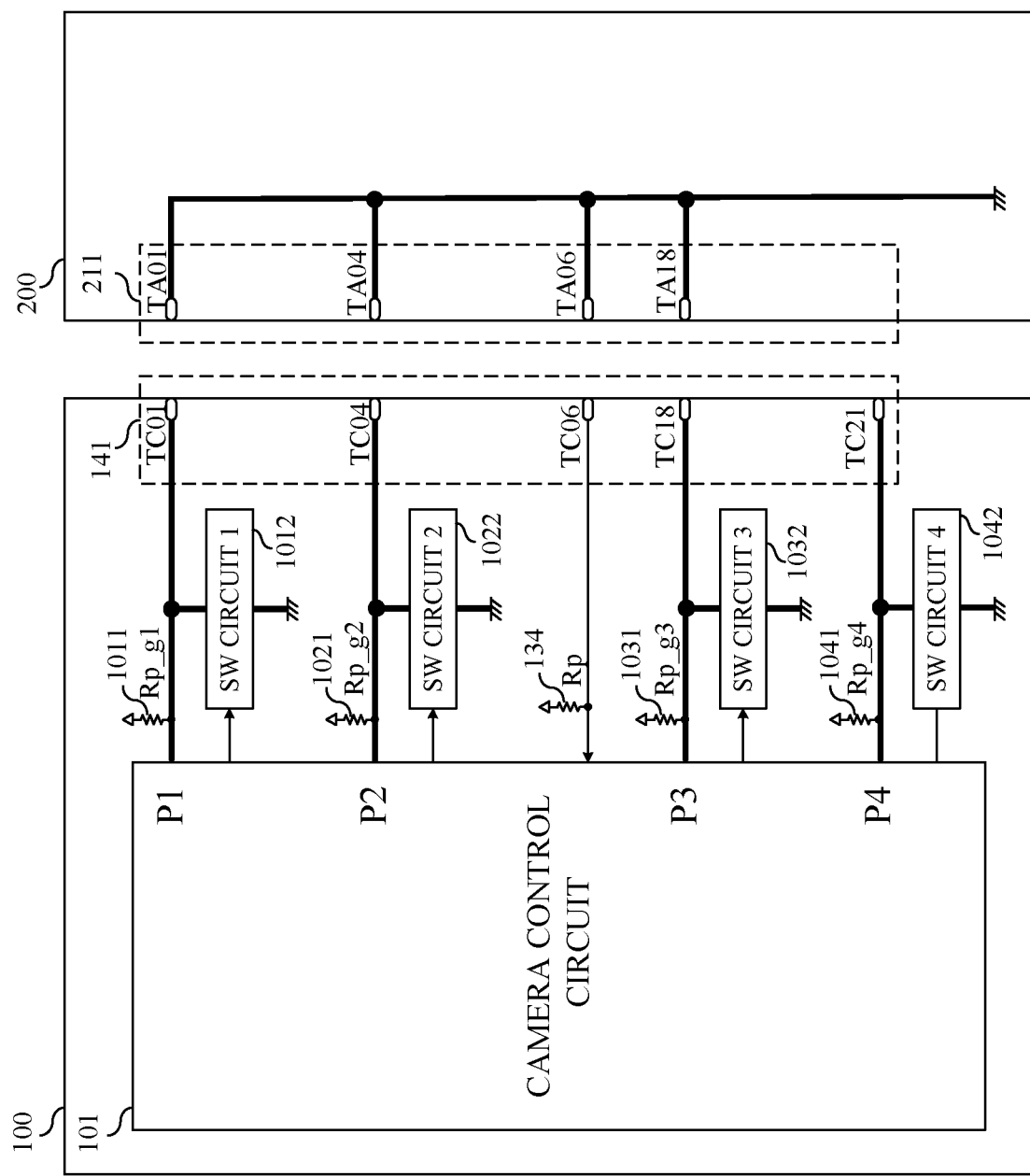
FIG. 4A illustrates a configuration for determining a connection state of a grounded contact according to the first embodiment.

FIG. 4A is a configuration example for allowing the camera 100 to detect the connection state of the GND contact of the accessory 200, and illustrates extracted part relating to the grounded contact from the configuration illustrated in FIG. 1.

TC01, TC04, TC18, and TC21 are connected to input terminals P1, P2, P3, and P4 of the camera control circuit 101, respectively, and pulled to the camera microcomputer power supply VMCU_C via resistors 1011Rp_g1, 1021Rp_g2, 1031Rp_g3, and 1041Rp_g4, respectively. An SW circuit 1, an SW circuit 2, an SW circuit 3, and an SW circuit 4 are connected to TC01, TC04, TC18, and TC21, respectively.

The SW circuit 1 is a switching circuit driven by the control signal of the camera control circuit 101, and when it is turned on by the control signal, TC01 is connected to GND. It is desirable that the SW circuit 1 includes, for example, an FET, or a circuit that has impedance that is as small as possible when the operation is turned on, and the impedance that is as large as possible when the operation is turned off. Each of the SW circuits 2, 3, and 4 also has the same configuration as that of the SW circuit 1 as illustrated in FIG. 4A.

Figure 4B:
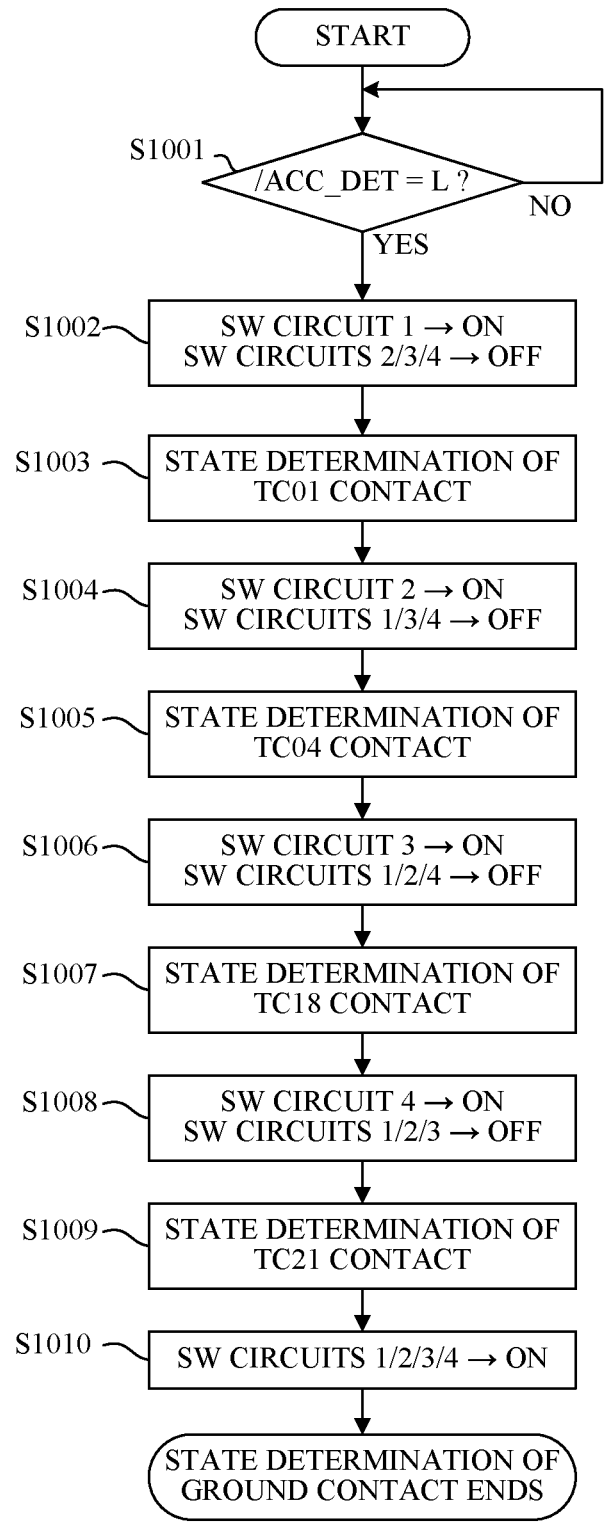
FIG. 4B is a flowchart illustrating processing executed by the camera according to the first embodiment.

A flowchart of FIG. 4B illustrates a sequence for determining the connection state of the grounded terminal in the configuration illustrated in FIG. 4A. The camera control circuit 101 executes this processing and other processing described later according to a computer program. S means the step.

In S1001, the camera control circuit 101 monitors the signal level of the accessory attachment detection signal/ACC_DET and determines whether or not the accessory 200 is attached. If the signal level is Hi, the camera control circuit 101 returns to S1001 and performs the detection again, assuming that the accessory 200 is not attached, and if the signal level is Lo, it proceeds to S1002 assuming that the accessory 200 is attached.

In S1002, the camera control circuit 101 makes such a control that the SW circuit 1 is turned on and the SW circuits 2, 3, and 4 are turned off, respectively.

In S1003, the camera control circuit 101 confirms the voltage level of the input terminal P1, and determines that TC01 is connected to the grounded contact if it is a Lo level, and that TC01 is not connected to the grounded contact if it is a Hi level.

Next, in S1004, the camera control circuit 101 makes such a control that the SW circuit 2 is turned on and the SW circuits 1, 3, and 4 are turned off, respectively.

In S1005, the camera control circuit 101 confirms the voltage level of the input terminal P2, and determines that TC04 is connected to the grounded contact if it is a Lo level, and that TC04 is not connected to the grounded contact if it is a Hi level.

Next, in S1006, the camera control circuit 101 makes such a control that the SW circuit 3 is turned on and the SW circuits 1, 2, and 4 are turned off, respectively.

In S1007, the camera control circuit 101 confirms the voltage level of the input terminal P3, and determines that TC18 is connected to the grounded contact if it is a Lo level, and that TC18 is not connected to the grounded contact if it is a Hi level.

Next, in S1008, the camera control circuit 101 makes such a control that the SW circuit 4 is turned on and the SW circuits 1, 2, and 3 are turned off, respectively.

In S1009, the camera control circuit 101 confirms the voltage level of the input terminal P4, and determines that TC18 is connected to the grounded contact if it is a Lo level, and that it is not connected to the grounded contact if it is a Hi level.

In S1010, the camera control circuit 101 makes such a control that the SW circuits 1, 2, 3, and 4 are turned on, respectively.

Such a control enables the camera control circuit 101 to confirm the attachment state of the grounded contact with the attached accessory 200, and to determine whether or not to supply to the accessory power supply circuit 202 and the like based on the ground connection state.

Figure 16A:
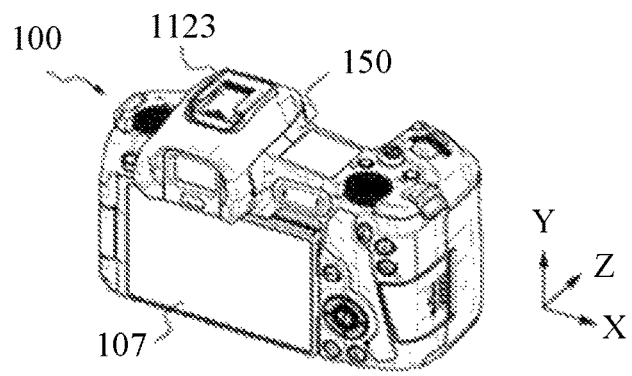
FIGS. 16A, 16B, and 16C are perspective views of the camera and an external flash unit as the accessory according to the first embodiment.
Figure 16B:
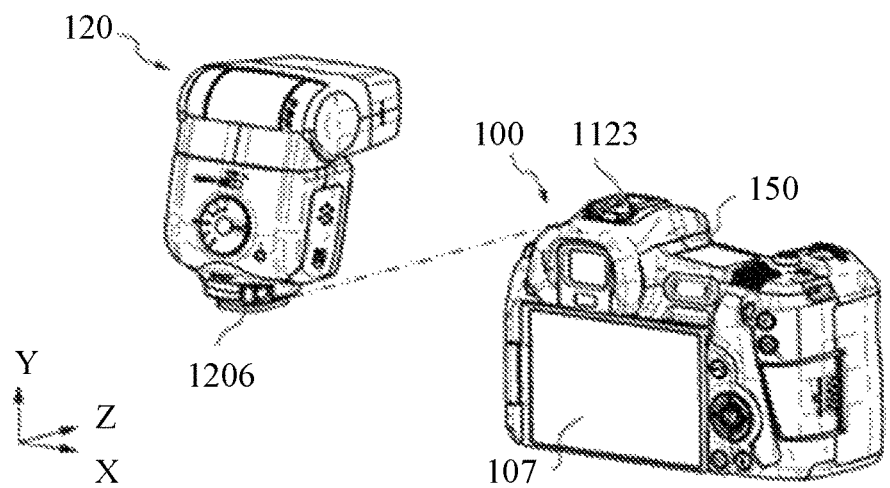
Figure 16C:
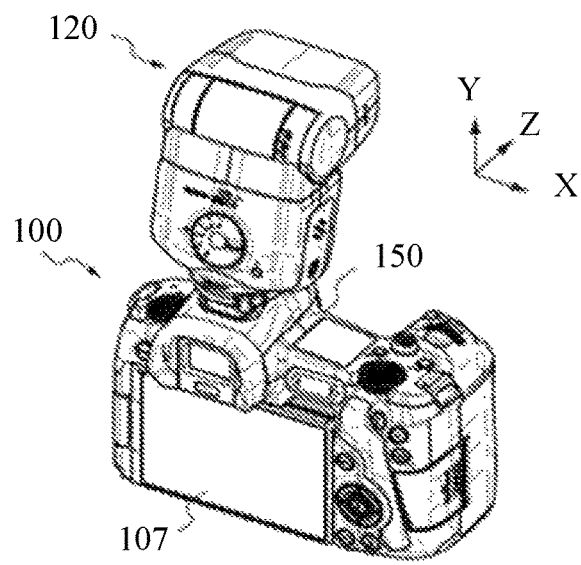

In the meanwhile, if the accessory 200 is tilted to the camera 100 or the like when the accessory 200 is attached to the camera 100, only some of the plurality of contacts TC01 to TC21 and TA01 to TA21 can be connected with each other. As illustrated in FIGS. 16A, 16B, and 16C, where a Z direction is the attachment direction of the accessory 200 to the camera 100, an X direction is a direction in which the plurality of contacts TC01 to TC21 and TA01 to TA21 are aligned, and a Y direction is a direction orthogonal to the X direction and the Z direction, only some of the contacts may be connected in the following cases.

First, as illustrated in FIGS. 3A and 3B, when the accessory 200 is tilted to the camera 100 around an axis parallel to the Z direction, some of the plurality of contacts may be connected with each other on one side where the camera 100 and the accessory 200 are close to each other but some of the plurality of contacts are disconnected from each other on the other side where the camera 100 and the accessory 200 are separated from each other. Although not illustrated, when the accessory 200 is tilted (twisted) to the camera 100 around an axis parallel to the Y direction, some contacts on an opposite side of the plurality of contacts that are connected with each other are separated from each other.

As detailed later with reference to FIGS. 5A and 5B, in the camera 100 and the accessory 200 according to this embodiment, the attachment detection processing is executed prior to various communications while the accessory 200 is attached to the camera 100. At this time, if the attachment detection contacts TC06 and TA06 are connected, the attachment detection processing can be executed. After the attachment detection processing via the contacts TC06 and TA06 is executed, the communication request signal/WAKE is output from the accessory 200 to the camera 100 via the contacts (also referred to as communication request contacts hereinafter) TC11 and TA11. By detecting this communication request signal/WAKE, the camera 100 performs various communications, determining that the accessory 200 is in a communicable state. However, in the case where the camera 100 cannot detect the communication request signal/WAKE even though the attachment of the accessory 200 to the camera 100 is detected, the camera 100 determines that there is a communication error with the accessory 200. If the accessory 200 is tilted or twisted while the accessory 200 is being attached to the camera 100, only some of the contacts are temporarily connected, it is determined that there is a communication error, and error processing, such as an alarm, is performed, the user may misunderstand that the accessory 200 breaks down.

Therefore, this embodiment adopts the contact arrangement so as to reduce the occurrence of a situation in which the camera 100 cannot detect the communication request signal/WAKE even though the attachment of the accessory 200 to the camera 100 is detected.

As described above, when the accessory 200 is tilted to the camera 100 around an axis parallel to the Z direction, the contacts TC01 and TA01 and the neighboring contacts are connected as illustrated in FIG. 3A, and the contacts TC21 and TA21 and the neighboring contacts are disconnected, or the contacts TC21 and TA21 and the neighboring contacts are connected and the contacts TC01 and TA01 and the neighboring contacts are disconnected as illustrated in FIG. 3B.

This embodiment uses the contacts TC06 and TA06 to detect the attachment of the accessory 200 to the camera 100. As illustrated in FIG. 3A, when the contacts TC01 and TA01 are connected with each other, the neighboring contacts TC06 and TA06 are often connected with each other. At this time, if the communication request contacts TC11 and TA11 are located near the distant contacts TC21 and TA21, the camera 100 is unlikely to detect the communication request signal/WAKE even though the attachment of the accessory 200 to the camera 100 is detected.

On the other hand, as illustrated in FIG. 3B, the contacts TC06 and TA06 may be connected with each other while the contacts TC21 and TA21 are connected with each other. In this case, if the contacts TC11 and TA11 are arranged on a side of the contacts TC01 and TA01 distant from the contacts TC06 and TA06, the camera 100 is unlikely to detect the communication request signal/WAKE even though the attachment of the accessory 200 to the camera 100 is detected.

On the other hand, this embodiment adopts the following contact arrangement. As illustrated in FIG. 1, the attachment detection contacts TC06 and TA06 and the communication request contacts TC11 and TA11 are disposed between the contacts TC01 and TA01 closest to one end and the contacts TC21 and TA21 closest to the other end in the direction in which a plurality of contacts TC01 to TC21 and TA01 to TA21 are arranged (referred to as a contact arrangement direction hereinafter). This arrangement relationship will be referred to as a first arrangement relationship. The attachment detection contacts TC06 and TA06 are disposed between the communication request contacts TC11 and TA11 and the contacts TC01 and TA01. This arrangement relationship will be referred to as a second arrangement relationship. Then, in the contact arrangement direction, distances between the attachment detection contacts TC06 and TA06 and the communication request contacts TC11 and TA11 are made shorter than distances between the communication request contacts TC11 and TA11 and the contacts TC21 and TA21. This arrangement relationship will be referred to as a third arrangement relationship. In this embodiment, the contacts TC01 to TC21 and TA01 to TA21 are arranged at regular pitches, so that the distance between the contacts herein can be rephrased as the number of other contacts arranged between these contacts, and a short (or long) distance can be rephrased as a small (or large) number of other contacts.

In this embodiment, the distances between the communication request contacts TC11 and TA11 and the contacts TC01 and TA01 are set to be equal to or less than the distance between the communication request contacts TC11 and TA11 and the contacts TC21 and TA21 in the contact arrangement direction. This arrangement relationship will be referred to as a fourth arrangement relationship. In particular, this embodiment disposes the communication request contacts TC11 and TA11 at the centers between the contacts TC01 to TC21 and TC01 to TC21, and makes equal to each other the distances between the communication request contacts TC11 and TA11 and the contacts TC01 and TA01, and the distances between the communication request contacts TC11 and TA11 and the contacts TC21 and TA21. The communication request contacts TC11 and TA11 do not necessarily have to be disposed at the centers between the contacts TC01 to TC21 and TC01 to TC21, but they are preferably disposed near the centers.

This embodiment makes the distances between the attachment detection contacts TC06 and TA06 and the contacts TC01 and TA01 equal to or greater than the distances between the attachment detection contacts TC06 and TA06 and the communication request contacts TC11 and TA11 in the contact arrangement direction. This arrangement relationship will be referred to as a fifth arrangement relationship. In particular, this embodiment disposes the attachment detection contacts TC06 and TA06 at the centers between the communication request contacts TC11 and TA11 and the contacts TC01 and TA01, and makes the distances between the attachment detection contacts TC06 and TA06 and the contacts TC01 and TA01 and the distances between the attachment detection contacts TC06 and TA06 and the communication request contacts TC11 and TA11 equal to each other. The attachment detection contacts TC06 and TA06 do not necessarily have to be disposed at the centers between the communication request contacts TC11 and TA11 and the contacts TC01 and TA01, but it is preferable to dispose them near the centers.

With the above contact arrangement, the communication request contacts TC11 and TA11 are highly likely to be connected with each other if the attachment detection contacts TC06 and TA06 are connected with each other in the tilted state illustrated in FIG. 3A, and in the tilted state illustrated in FIG. 3B, even if the communication request contacts TC11 and TA11 are connected with each other, the attachment detection contacts TC06 and TA06 are highly likely to be disconnected with each other. As a result, whichever state the accessory 200 is tilted in, the occurrence of a situation in which the camera 100 cannot detect the communication request signal/WAKE can be reduced even though the attachment of the accessory 200 to the camera 100 is detected.

A description will now be given as a comparative example of a case where the positions of the contacts TC06 and TA06 and the contacts TC11 and TA11 are exchanged. That is, a description will be given of a case where the contacts TC11 and TA11 are used to detect the attachment and the contacts TC06 and TA06 are used to detect the communication request signal/WAKE. In this configuration, when the accessory 200 is tilted to the camera 100 and the contacts TC01 and TA01 and the neighboring contacts are disconnected from each other, the contacts TC11 and TA11 for the attachment detection may be connected with each other but the contacts TC06 and TA06 for the communication request signal/WAKE may be disconnected from each other, resulting in a communication error.

Therefore, in order to avoid the communication error, it is preferable to dispose the attachment detection contact on one end side in the contact arrangement direction rather than the contacts for the communication request signal/WAKE as in this embodiment.

As illustrated in FIGS. 20A to 20C and 23A and 23B, which will be described later, in a configuration where the accessory 200 holds a plurality of contacts with a connection plug 256 as a holding member made of a nonconductive material such as a resin material, the connection plug 256 may have a convex shape toward the lower side (contact direction with the camera connector 141) in the drawing. In such a case, the contact on one end side in the contact arrangement direction of the plurality of contacts is likely to be connected but the contact on the other end side is likely to be disconnected. However, the contact arrangement illustrated in this embodiment can reduce an occurrence of a communication error even if some of the contacts are disconnected when the accessory 200 is attached to the camera 100.

As described above, when the accessory 200 is twisted relative to the camera 100 around the axis parallel to the Y direction, some contacts on one end side in the contact arrangement direction of the plurality of contacts may be connected, but the other contacts on the other end side may be disconnected. When such a state occurs in the process of attaching the accessory 200 to the camera 100, the connection timings shift among the plurality of contacts. If the contact timing significantly shifts, a time lag from the attachment detection of the accessory 200 to the camera 100 to the detection of WAKE becomes long, and consequently a communication error may be determined. At this time, depending on the twisting direction of the accessory 200, the side of the contacts TC01 and TA01 or the side of the contacts TC21 and TA21 starts to be connected first.

In the case where the side of the contacts TC01 and TA01 starts to be connected, the closer the communication request contacts TC11 and TA11 are to the contacts TC21 and TA21, the longer the time lag becomes from the attachment detection of the accessory 200 to the detection of the communication request signal/WAKE. The longer the time lag is, the more easily a communication error is determined. On the other hand, in the case where the side of the contacts TC21 and TA21 starts to be connected and the communication request contacts TC11 and TA11 are disposed on the side of the contacts TC01 and TA01 of the attachment detection contacts TC06 and TA06, a time lag occurs from the attachment detection of the accessory 200 to the detection of the communication request signal/WAKE.

On the other hand, this embodiment adopts the above contact arrangement, and shortens a time lag from the attachment detection of the accessory 200 to the detection of the communication request signal/WAKE, regardless of which side of the contacts starts to be connected.

This embodiment disposes at positions between the attachment detection contacts TC06 and TA06 and the communication request contacts TC11 and TA11 the contacts TC07 and TA07 to TC10 and TA10 for the SPI communication (communication in the second communication method) between the camera 100 and the accessory 200. The contacts TC12, TA12, TC13, and TA13 used for the I2C communication (communication in the first communication method) between the camera 100 and the accessory 200 are disposed at positions close to the communication request contacts TC11 and TA11 on the opposite side of the attachment detection contacts TC06 and TA06.

The communication between the camera 100 and the accessory 200 is executed after the camera 100 detects the communication request signal/WAKE. Therefore, until the communication between the camera 100 and the accessory 200 is executed, the connection of the contacts for the communication is not confirmed. On the other hand, in this embodiment, if the attachment detection contacts TC06 and TA06 and the communication request contacts TC11 and TA11 are connected with each other, the communication contacts TC07, TA07 to TC10, TA10, TC12, TA12, TC13, and TA13 arranged near and between them, respectively, can be considered to be connected.

Since it can be considered that the positions between the attachment detection contacts TC06 and TA06 and the communication request contacts TC11 and TA11 are more reliably connected, the contacts used for the SPI communication executed after the I2C communication are preferably disposed at positions between the attachment detection contacts TC06 and TA06 and the communication request contacts TC11 and TA11.

As illustrated in FIGS. 4A, 4B, and FIGS. 12 and 20 which will be used later for the explanation, a configuration in which the number of contacts is smaller than that of the camera 100 is conceivable as the configuration of the accessory 200. Even in this configuration, the attachment detection contact and the communication request contact are necessary contacts, and the attachment detection contact and the communication request contact may be arranged under an idea similar to the configuration in which the number of contacts is equal to that of the camera 100. However, a part of the above-mentioned first to fifth arrangement relationships may not be satisfied.

Figure 12:
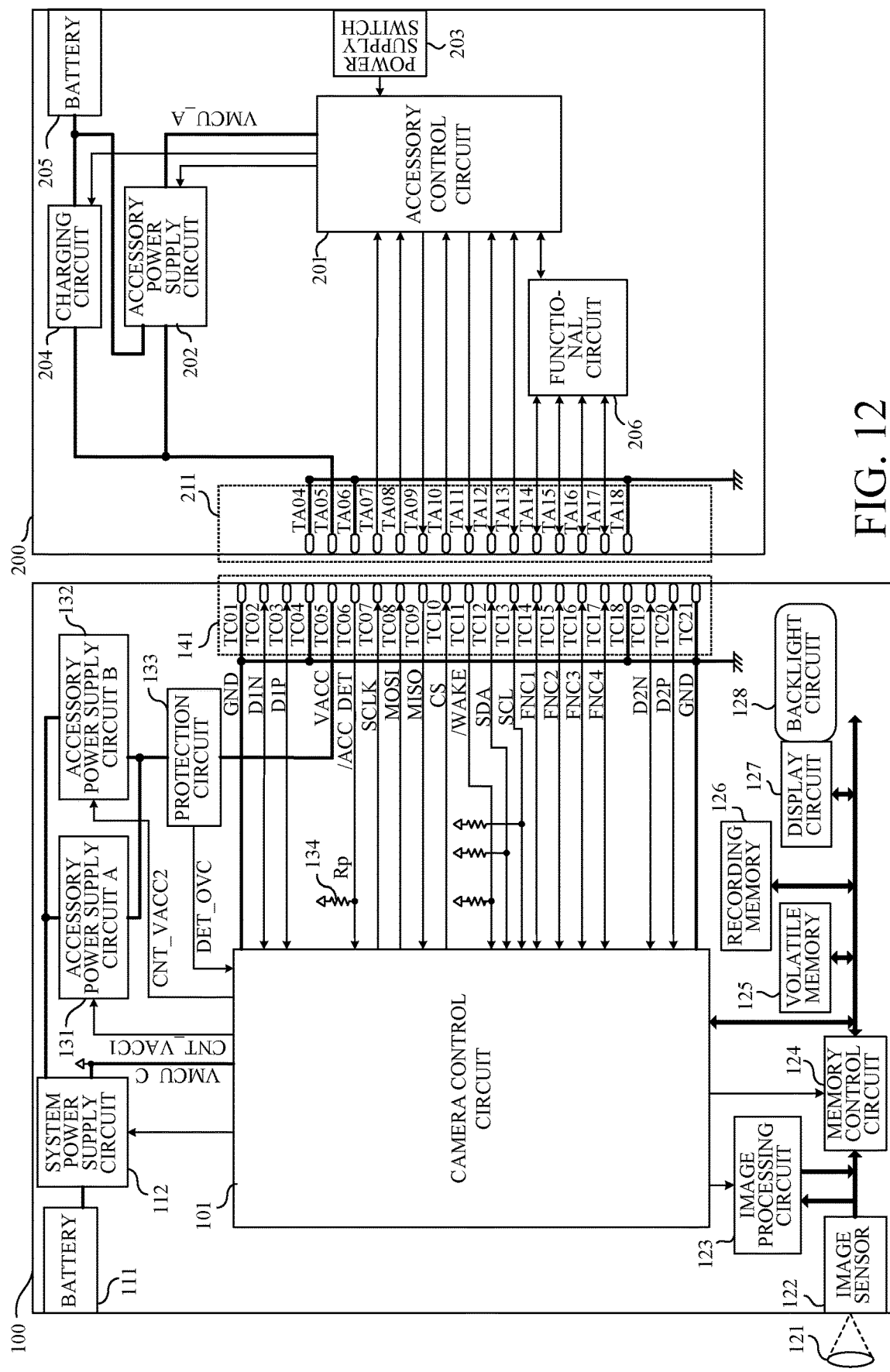
FIG. 12 illustrates a configuration example of the accessory according to the first embodiment.

For example, assume a configuration having no contact TA21 as illustrated in FIGS. 4A and 4B. In this configuration, a distance between the communication request contact TA11 and the contact TA01 is longer than a distance between the communication request contact TA11 and the contact TA20 in the contact arrangement direction. That is, the fourth arrangement relationship is not satisfied. In addition, for example, assume a configuration having no contacts TA01 to TA03 and TA19 to 21 as illustrated in FIG. 12. In this configuration, a distance between the attachment detection contact TA06 and the contact TA04 in the contact arrangement direction is shorter than a distance between the attachment detection contact TA06 and the communication request contact TA11. That is, the fifth arrangement relationship is not satisfied.

As described above, in a configuration in which the position of the contact position at the end of the accessory 200 is different from the contact position at the end of the camera 100, part of the first to fifth arrangement relationships may not be satisfied. In such a case, it is assumed that the position facing the contact at the end of the camera 100 in the attached state is the position of the contact at the end of the accessory 200, and the attachment detection contact and the communication request contact may be arranged so as to satisfy the first to fifth arrangement relationships. Alternatively, as in the protrusion portion 256a illustrated in FIGS. 20A, 20B, and 20C, the attachment detection contact and the communication request contact may be arranged so as to satisfy the first to fifth arrangement relationships in consideration of the distance from the protrusion portion 256a instead of the distance from the contact at the end. A flowchart of FIG. 5A illustrates processing executed by the camera control circuit 101 when the accessory 200 is attached to the camera 100.

In S401, the camera control circuit 101 as an attachment detection means monitors the signal level of the accessory attachment detection signal/ACC_DET and determines whether or not the accessory 200 is attached. If the signal level is Hi, the camera control circuit 101 returns to S401 and performs the detection again, assuming that the accessory 200 is not attached, and if the signal level is Lo, proceeds to S402 assuming that the accessory 200 is attached.

In S402, the camera control circuit 101 sets a power supply control signal CNT_VACC1 to the Hi level in order to turn on the output of the accessory-use power supply circuit A131, and proceeds to S403. The accessory-use power supply circuit A131 outputs the accessory power supply VACC in response to the power supply control signal CNT_VACC1 becoming Hi.

In S403, the camera control circuit 101 monitors the signal level of the overcurrent detection signal DET_OVC and determines whether or not the overcurrent is flowing. If the signal level is Lo, the camera control circuit 101 proceeds to S404 assuming that no overcurrent flows, and if the signal level is Hi, proceeds to S405 assuming that the overcurrent flows to perform error processing.

Figures 5A, 5B:
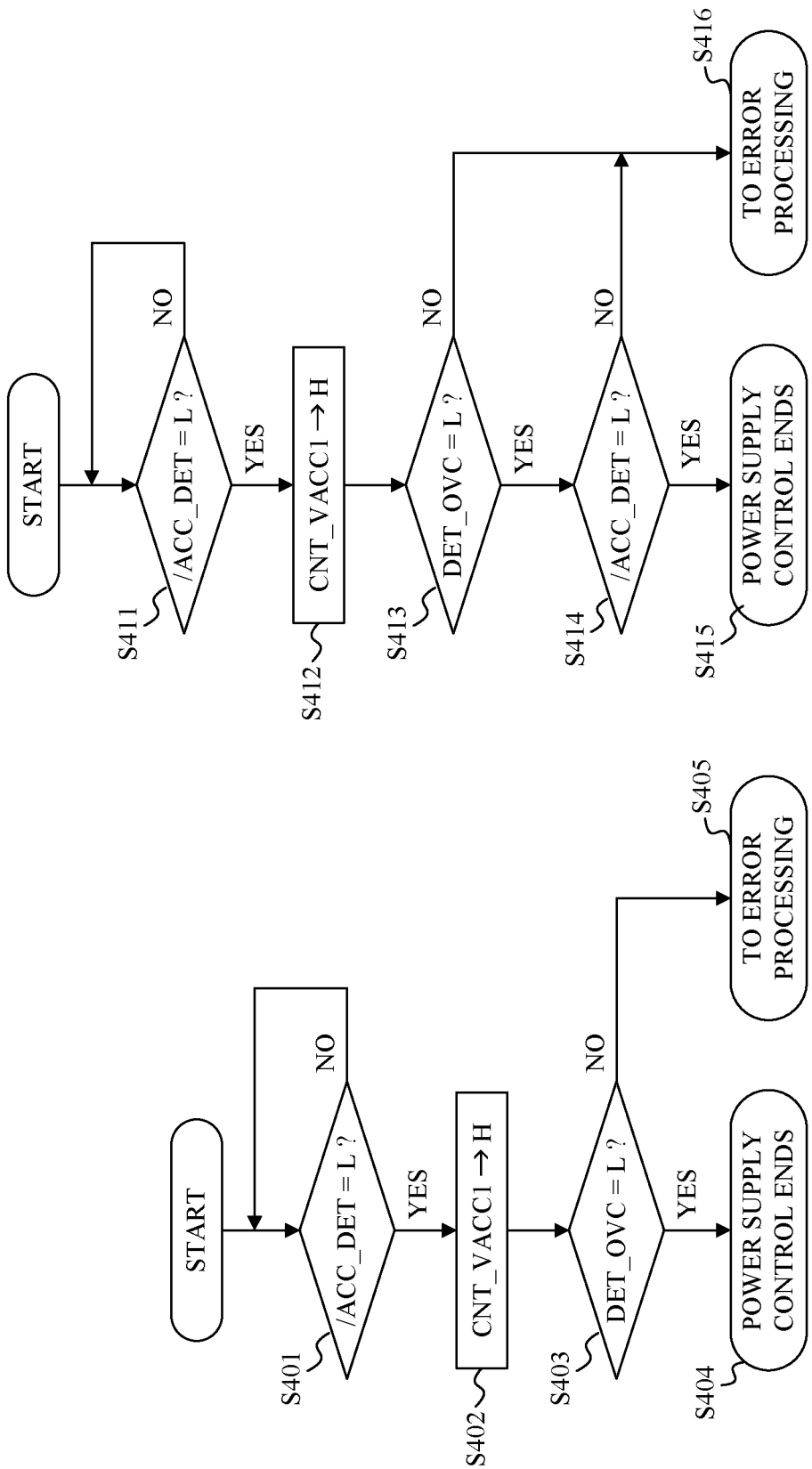
FIGS. 5A and 5B illustrate a flowchart of processing executed by the camera according to the first embodiment.
Figure 6A:
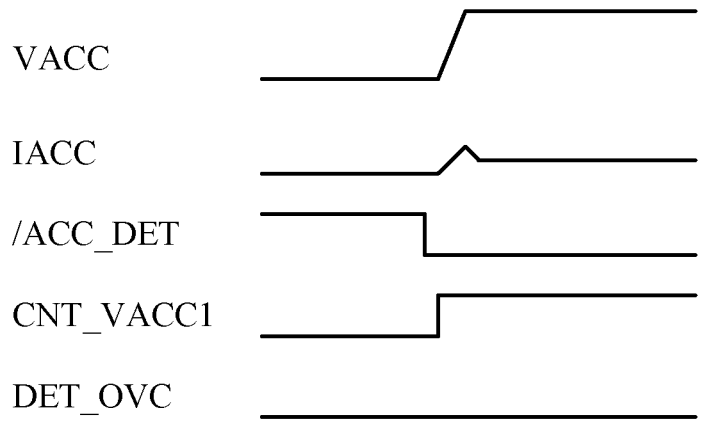
FIGS. 6A, 6B, and 6C are timing charts illustrating signal changes when a contact adjacent to a power supply contact is short-circuited according to the first embodiment.

FIG. 6A schematically illustrates a change in the signal in the case where the flow proceeds to S404 in the processing of FIG. 5A. IACC is the current of the accessory power supply VACC. Since the accessory power supply VACC normally leads up after the power supply control signal CNT_VACC1 is set to Hi in S402, the overcurrent detection signal DET_OVC remains at a Lo level.

Figure 6B:
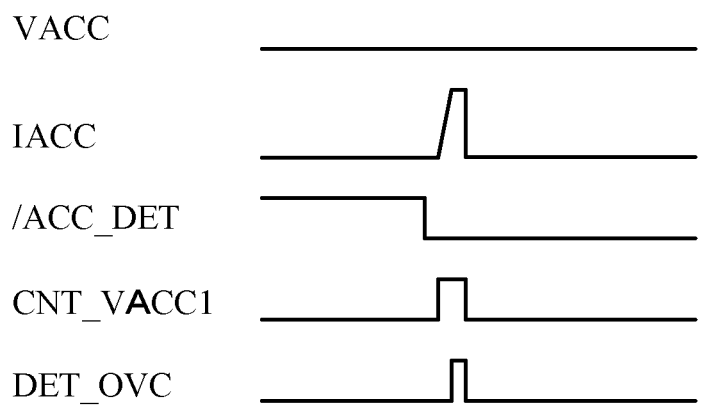

FIG. 6B schematically illustrates a change in the above signal in the case where the flow proceeds to S405 in the processing of FIG. 5A. Since the overcurrent flows through IACC after the power supply control signal CNT_VACC1 is set to Hi in S402, the overcurrent detection signal DET_OVC changes to the Hi level and notifies the camera control circuit 101. Upon receiving the notification of the overcurrent detection signal DET_OVC, the camera control circuit 101 turns off the outputs of the accessory-use power supply circuits A131 and B132 as error processing to stop the power supply to the accessory 200. Thus, even in the case where the overcurrent flows through the accessory power supply VACC, the camera control circuit 101 can detect the overcurrent and safely stop the system.

Usually, in a case where an abnormal current flows through the accessory power supply VACC, it is presumed that the camera 100 and the accessory 200 are out of order, but since the camera connector 141 and the accessory connector 211 are exposed to the outside, and thus the neighboring contacts may be short-circuited due to an adhesion of a foreign matter such as a metal piece.

In this embodiment, the accessory power supply VACC has a voltage of 3.3 V, whereas the camera microcomputer power supply VMCU_C and the accessory microcomputer power supply VMCU_A have a voltage of 1.8 V. Thus, if a voltage of 3.3 V is applied to an electric element operating at a voltage of 1.8 V, the electric element may get damaged. Since the post-short-circuiting behavior depends on the characteristic of the electric element, the camera control circuit 101 may not always be able to detect the short-circuiting between the terminals. For example, since the I2C communication signal is at the Hi level in the communication standby state, even if it is short-circuited with the voltage of 3.3 V equal to and higher than the voltage of 1.8V, the abnormality cannot be detected depending on the characteristic of the electric element of the connection destination.

On the other hand, this embodiment disposes the GND contacts TC04 and TA04 on one of the two sides of the accessory power supply VACC contacts TC05 and TA05, and the contacts TC06 and TA06 of the accessory attachment detection signal/ACC_DET on the other side. As described above, the accessory attachment detection signal/ACC_DET is connected to GND in the accessory 200. Thus, even in the case where short-circuiting occurs between the contacts, the overcurrent can be detected and the system can be safely stopped without applying 3.3 V to the element operating at 1.8 V.

As described above, if the accessory power supply VACC is supplied when the GND contact is not connected, the reference potential of the accessory 200 becomes unstable, and consequently each circuit and the electric element may get damaged. In operating the device, an external force may be applied that makes unstable the connection of the connector terminals. On the other hand, by arranging the accessory power supply VACC contact and the GND contact adjacent to each other as in this embodiment, the connection of only the accessory power supply VACC contact can be more effectively prevented than a case where the accessory power supply VACC contact and the GND contact are separate terminals.

Figure 9:
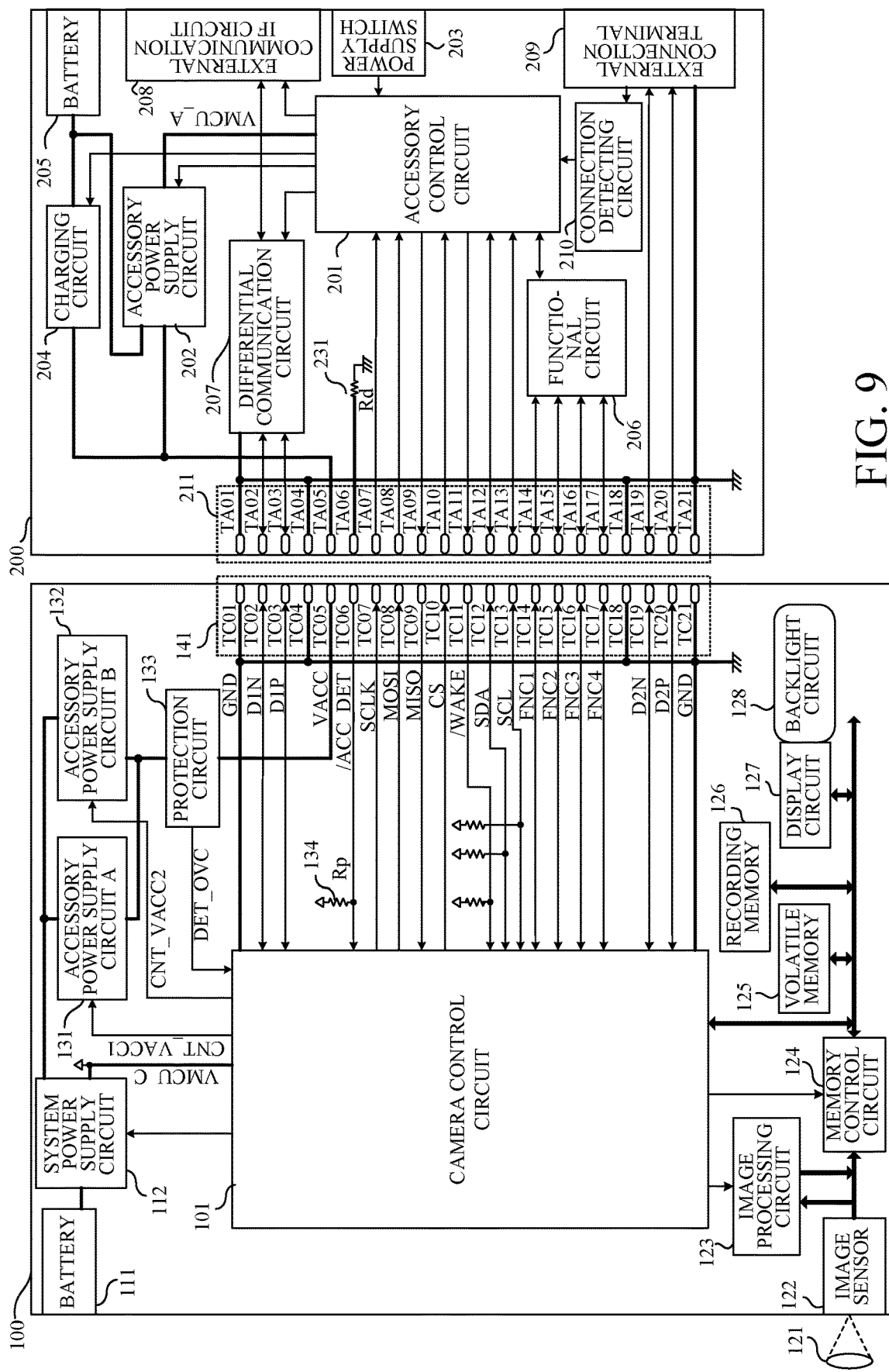
FIG. 9 illustrates a configuration example of the camera and the accessory according to the first embodiment.

This embodiment connects the accessory attachment detection signal/ACC_DET to GND in the accessory 200, but may connect it to GND via a resistor element Rd231 as in the accessory 200 illustrated in FIG. 9. The short-circuiting current can be reduced by the connection to GND via the resistor element Rd231.

In this case, it is necessary to select the resistor element Rd231 having such a resistance value that a voltage of (Rd/(Rp+Rd))×1.8 V obtained by dividing the voltage of 1.8 V of the camera microcomputer power supply VMCU_C by the resistor elements Rp134 and Rd231 satisfies the Lo level threshold (Vil) of the camera control circuit 101. For example, in the case where a Low level detection threshold value (Vil) of the camera control circuit 101 is 0.33 times the power supply voltage, the resistance value of the resistor element Rd231 needs to be half or less of the resistor element Rp134 (10 kΩ). In the example of FIG. 9, the resistance value of the resistor element Rd231 is set to 5 kΩ.

FIG. 5B illustrates processing executed by the camera control circuit 101 when the accessory 200 having the configuration illustrated in FIG. 9 is attached to the camera 100. Since S411 to S413 are the same as S401 to S403 illustrated in FIG. 5A, a description thereof will be omitted.

In S414 after S413, the camera control circuit 101 monitors the signal level of the accessory attachment detection signal/ACC_DET, and determines whether or not the accessory attachment detection signal/ACC_DET contacts TC06 and TA06 are short-circuited with the accessory power supply VACC contacts TC05 and TA05. If the signal level is Lo, the camera control circuit 101 proceeds to S415 assuming that it is not short-circuited, and if the signal level is Hi, proceeds to S416 assuming that it is short-circuited to performs the error processing.

Figure 6C:
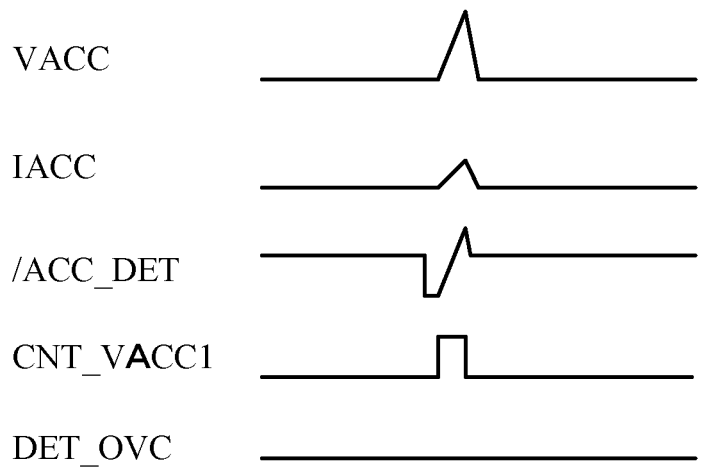

FIG. 6C schematically illustrates the state of the above signal in the case where the accessory power supply VACC and the accessory attachment detection signal/ACC_DET are short-circuited in the accessory 200 having the configuration of FIG. 9 to which the resistor element Rd231 (5 kΩ) is added. After the power supply control signal CNT_VACC1 is set to Hi in S402, no overcurrent flows in IACC because the current is limited by the resistor element Rd231.

On the other hand, the voltage of the accessory power supply VACC is applied to the accessory attachment detection signal/ACC_DET. As soon as the signal level of the accessory attachment detection signal/ACC_DET becomes Hi due to interrupt processing or the like, the camera control circuit 101 sets the power control signal CNT_VACC1 to Lo in the error processing and stops outputting the accessory power supply VACC (power supply to the accessory 200). Thereby, the system can be safely stopped without continuously applying 3.3 V to the terminal of the element operating at 1.8 V.

Figure 10:
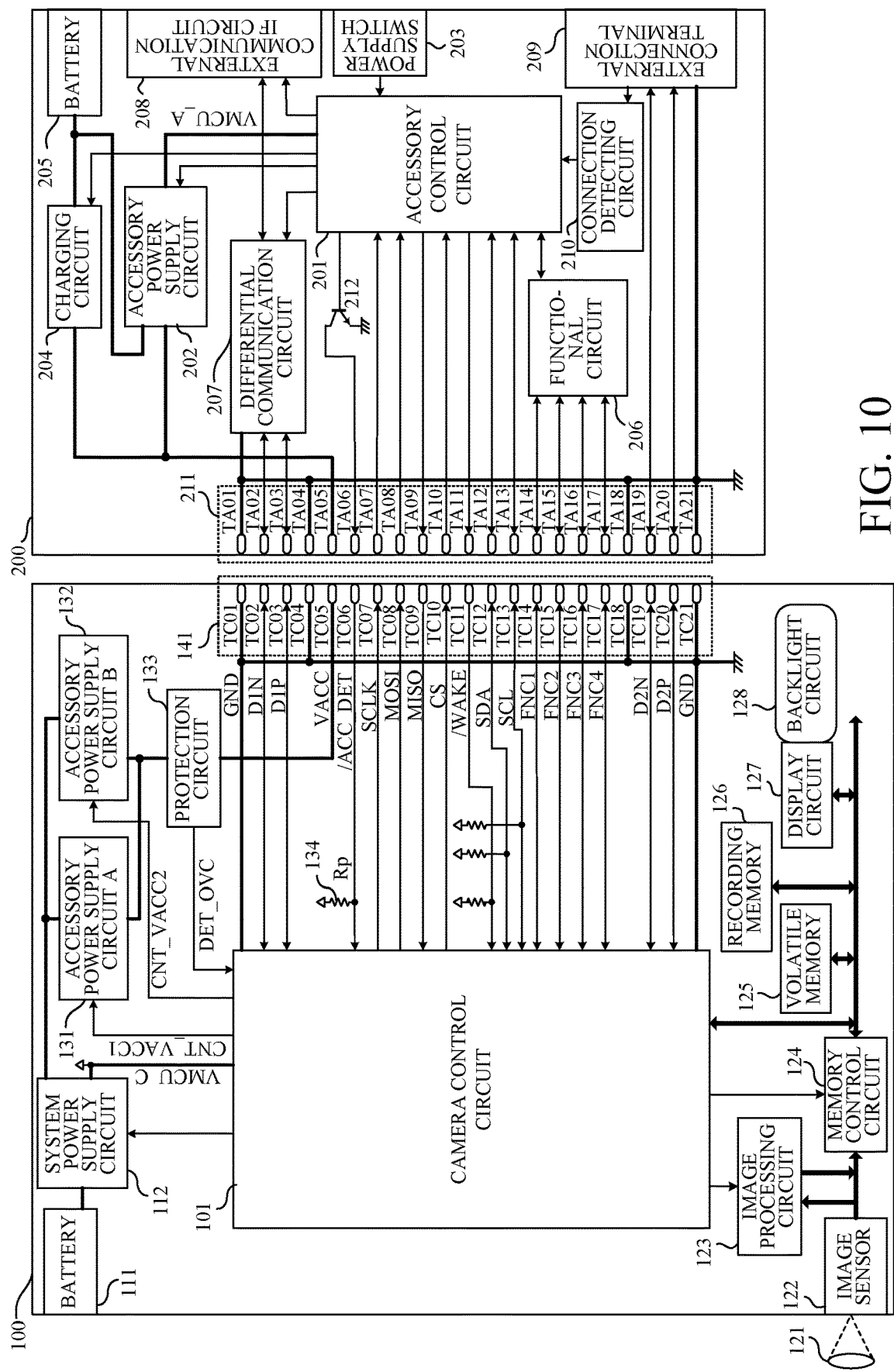
FIG. 10 illustrates another configuration example of the camera and accessories according to the first embodiment.

As illustrated in FIG. 10, the accessory 200 may be controlled so that the accessory attachment detection signal/ACC_DET becomes a Lo level (GND potential) by the accessory control circuit 201 via an NPN transistor 212 as a switching means. If the accessory 200 is attached to the camera 100 in the configuration illustrated in FIG. 1, the camera control circuit 101 can always detect the accessory 200, but in the configuration illustrated in FIG. 10, the accessory control circuit 201 can notify the attachment of the accessory 200 to the camera 100 at an arbitrary timing.

Figure 11:
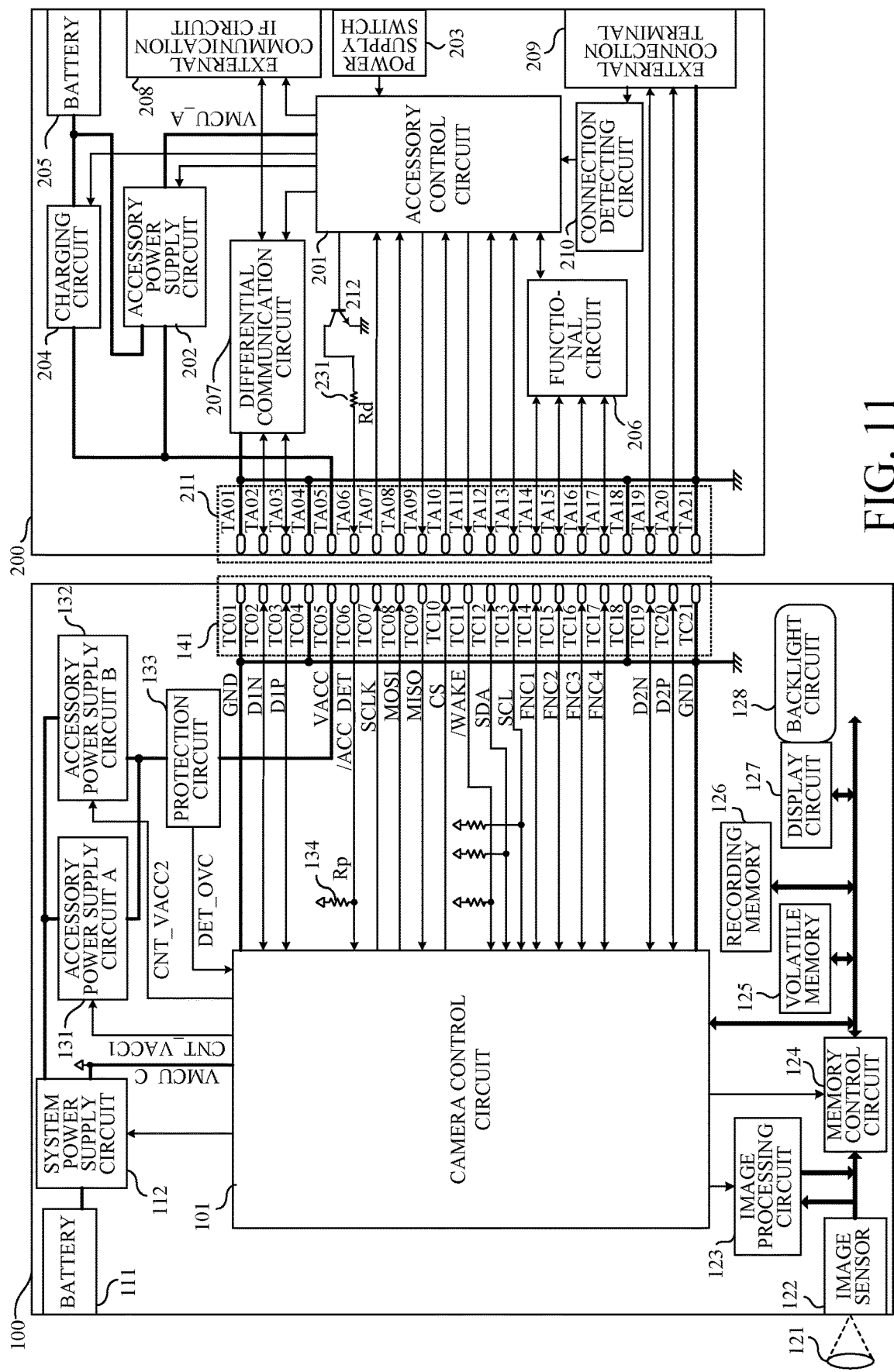
FIG. 11 illustrates still another configuration example of the camera and accessories according to the first embodiment.

As illustrated in FIG. 11, the accessory 200 may be configured so as to connect the resistor element Rd231 in series with the NPN transistor 212. In this case, the resistance value needs to be half or less of the resistor element Rp134 (10 kΩ) as in the configuration of FIG. 1.

As described above, even if the power supply contact and the adjacent contact are short-circuited, this embodiment can maintain the safety of the system including the camera 100 and the accessory 200, and restrain them from getting damaged.

FIG. 7 illustrates an example of the functions of the FNC1 signal to the FNC4 signal as the functional signals connected to the contacts TC14 to TC17 and the contacts TA14 to TA17 for each type of the accessory 200 (here, the microphone device and the strobe device).

Figure 8A:
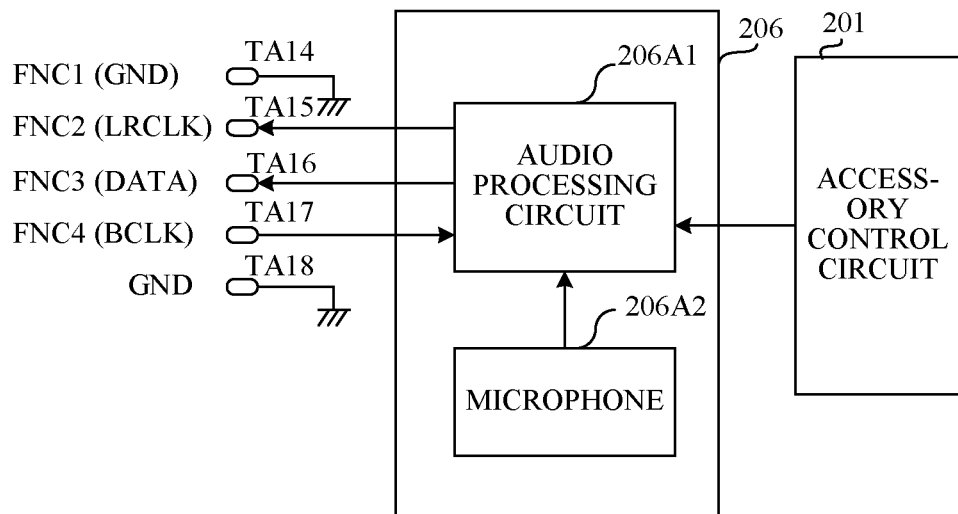
FIGS. 8A, 8B, and 8C illustrate a connection destination configuration of the functional signal according to the first embodiment.

In the microphone device, the FNC2 signal to the FNC4 signal are used as a digital audio (I2S: Inter-IC Sound standard) data bus to transfer audio data. FIG. 8A illustrates a configuration example of the functional circuit 206 in the case where the accessory 200 is a microphone device.

An audio processing circuit 206A1 in the functional circuit 206 is a codec circuit that converts an audio signal input from a microphone 206A2 into a digital audio (I2S) data format, and is controlled by the accessory control circuit 201. The accessory control circuit 201 can set the sampling frequency and the resolution by controlling the audio processing circuit 206A1. In this embodiment, the sampling frequency is 48 kHz and the resolution is 32 bits. The microphone 206A2 is, for example, a MEMS-IC microphone or an electret condenser microphone.

TA14 is the FNC1 signal that is not used as an I2S data bus and is connected to GND. In this embodiment, the unused functional signal is connected to GND, but the present invention is not limited to this embodiment, and a connection to a reference potential may be made as the stable potential other than the GND potential (0V) such as the power supply potential and the L level (low potential) or H level (high potential) of the signal.

The FNC2 signal connected to TAT5 (DATA contact) is an audio data signal (DATA), which is a signal output from the accessory 200 to the camera 100.

The FNC3 signal connected to TA16 (LRCLK contact) is an audio channel clock signal (LRCLK), which is a signal output from the accessory 200 to the camera 100.

The FNC4 signal connected to TA17 (BCLK contact) is an audio bit clock signal (BCLK), which is a signal output from the camera 100 to the accessory 200.

In this embodiment, since the sampling frequency is 48 kHz and the resolution is 32 bits as described above, the LRCLK frequency is 48 kHz and the BCLK frequency is 3.072 MHz. DATA has a maximum frequency of 1.536 MHz, which is half a cycle of CLK.

In the contact arrangement according to this embodiment, the reference potential contacts TA18 and TC18 connected to the GND potential as the reference potential are disposed next to the contacts TA17 and TC17 to which the FNC4 signal (BCLK) having the highest frequency is connected among the functional signal contacts to which the functional signals are connected. The signal wiring to the accessory shoe interface is generally configured with a flexible substrate. In order to reduce the product cost, the flexible substrate may have a single-sided specification, and the substrate wiring is made in the same arrangement as the contact arrangement. This embodiment disposes the GND contact as the reference potential contact next to the functional signal contact connected to the signal having the highest frequency among the functional signals. This configuration can suppress radiation noises (EMI) from the functional signal contact, interference with signals connected to other contacts, and crosstalk with signals other than the I2S data bus.

This embodiment connects to the GND potential as the reference potential the contacts TAT8 and TC18 next to the contacts TAT7 and TC17 connected to the FNC4 signal (BCLK) having the highest frequency, but the present invention is not limited to this example and the same effect can be obtained even if the connection is made to a stable reference potential other than the GND potential.

Figure 8B:
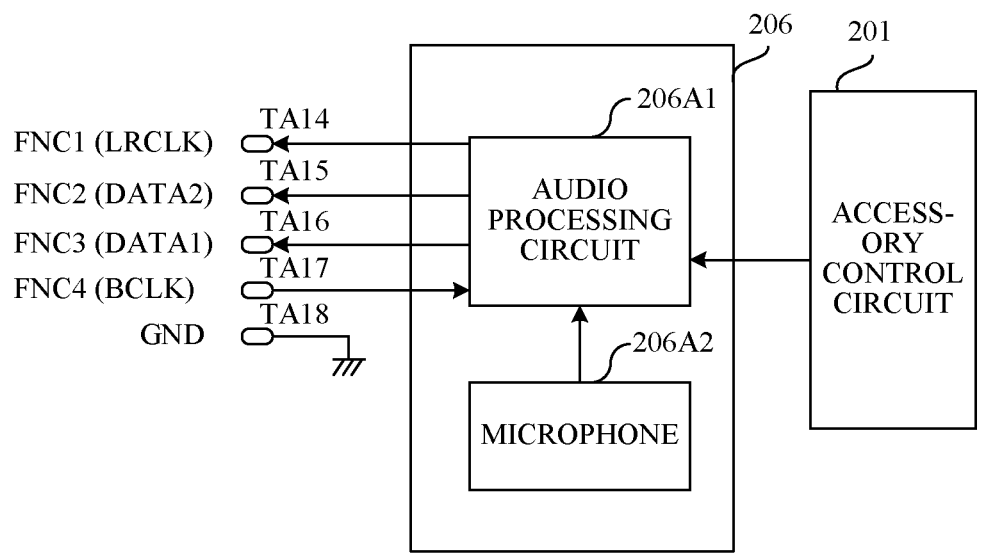

FIG. 8B is an example illustrating a configuration in which audio data is increased relative to FIG. 8A. The purpose of increasing the audio data is to increase the number of channels and the resolution.

The FNC4 signal connected to TA17 is an audio bit clock signal (BCLK), which is the same as that illustrated in FIG. 8A.

On the other hand, the FNC3 signal connected to TA14 is an audio channel clock signal (LRCLK), which is a signal output from the accessory 200 to the camera 100.

The FNC2 signal connected to TA15 is an audio data signal (DATA2), which is a signal output from the accessory 200 to the camera 100.

The FNC1 signal connected to TA16 operates as an audio data signal (DATA2), which is a signal output from the accessory 200 to the camera 100.

In this way, in the case where an audio data signal is added to increase the audio data amount and two signals are used, arranging signals in such order that a higher frequency is disposed closer to the GND terminal can provide a configuration that is relatively highly effective in preventing crosstalk.

Figure 8C:
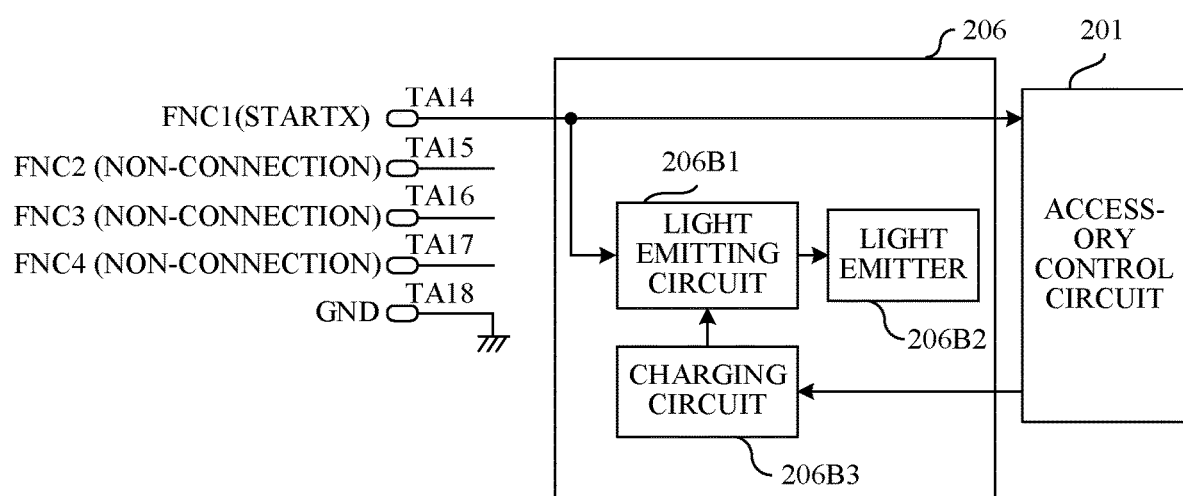

FIG. 8C illustrates a configuration example of the functional circuit 206 in the case where the accessory 200 is a strobe device. A light emitting circuit 206B1 in the functional circuit 206 is a strobe light emitting circuit including an IGBT, a trigger coil, and the like, and controls a light emission of the light emitter 206B2.

The light emitter 206B2 includes a xenon tube or the like and emits illumination light to illuminate the object. A charging circuit 206B3 includes a transformer, a switching FET, a capacitor, and the like, and accumulates electric charges for causing the light emitter 206B2 to emit light.

The FNC1 signal connected to TA14 is a light emission synchronization signal (STARTX) for controlling the light emission timing of the light emitter 206B2, and is a signal output from the camera 100 to the accessory 200. The FNC2 signal to the FNC4 signal are not used in the strobe device, and no signal is connected to these contacts.

This embodiment makes unused functional signal contacts disconnected (OPEN), but the present invention is not limited to this embodiment, and a connection to a stable reference potential, such as the power supply potential and the L or H level of the signal, may be made according to the contacts TC15 to TC17 as connection destinations of the contacts TA15 to TA17.

In the strobe device, only the FNC1 signal is used among the functional signals. Although the light emission synchronization signal (STARTX) is not a periodically generated signal, the camera 100 allocates GND to the FNC1 signal when the microphone device is connected so as to prevent the configuration of the camera control circuit 101 from being complicated.

A description will now be given of further features of the contact arrangement according to this embodiment. SDA (first signal) connected to the contacts TC12 and TA12 as the first signal contacts and SCL (second signal) connected to the contacts TC13 and TA13 as the second signal contacts are both signals for the I2C communication. These signals are transmitted by the open drain communication. Since both SDA and SCL are pulled up to the camera microcomputer power supply VMCU_C, they are the signal having a relatively high impedance during the communication standby, and easily subject to crosstalk.

Therefore, this embodiment assigns the communication request signal (fourth signal)/WAKE to the contacts TC11 and TA11 as the fourth signal contacts next to the SDA contacts TC12 and TA12. As described above, the communication request signal/WAKE is a signal for making a communication request from the accessory 200 to the camera 100.

Figure 15A:
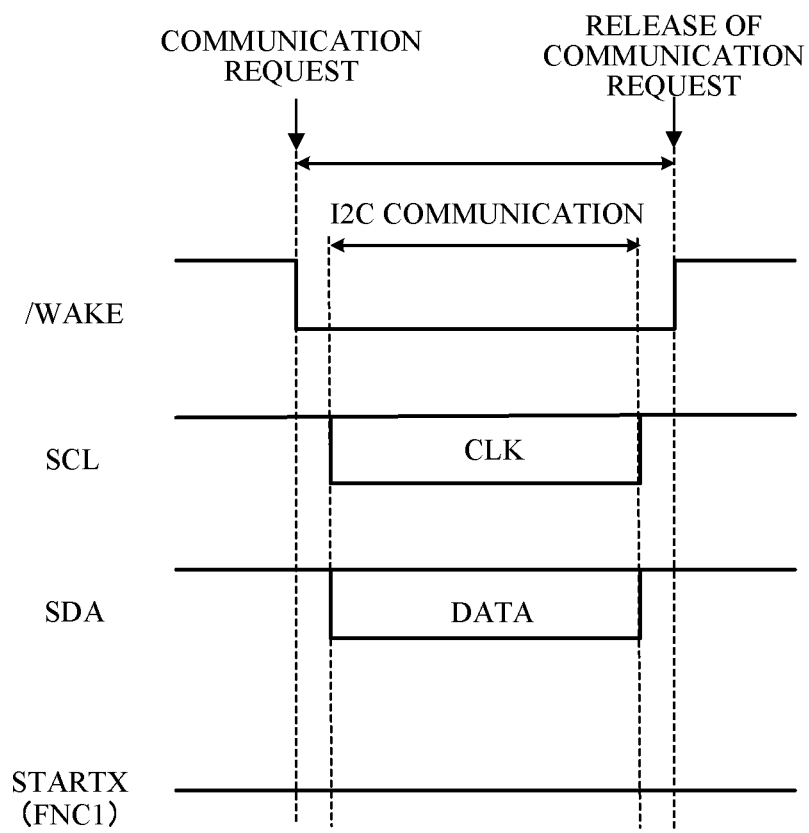
FIGS. 15A and 15B are timing charts in the case where the accessory is a strobe device according to the first embodiment.

FIG. 15A illustrates the timing at which the accessory 200 makes a communication request to the camera 100 and performs the I2C communication. As illustrated in FIG. 15A, the signal level of the communication request signal/WAKE changes from the Hi level to the Lo level prior to the I2C communication by SCL and SDA. This is because the I2C communication is performed in response to this change. Accordingly, disposing the contacts TC11 and TA11 of the communication request signal/WAKE at and near the SDA contact for the I2C communication can keep SDA of the communication request signal/WAKE from crosstalk.

As illustrated in FIG. 15A, a control to change the signal level of the communication request signal/WAKE from the Lo level to the Hi level after the I2C communication can keep SDA of the communication request signal/WAKE from crosstalk.

The FNC1 signal is assigned to the contacts TC14 and TA14 as the third signal contacts next to the SCL contacts TC13 and TA13. As described above, since GND is assigned to the FNC1 signal in the microphone device, SCL can be kept from crosstalk.

Figure 15B:
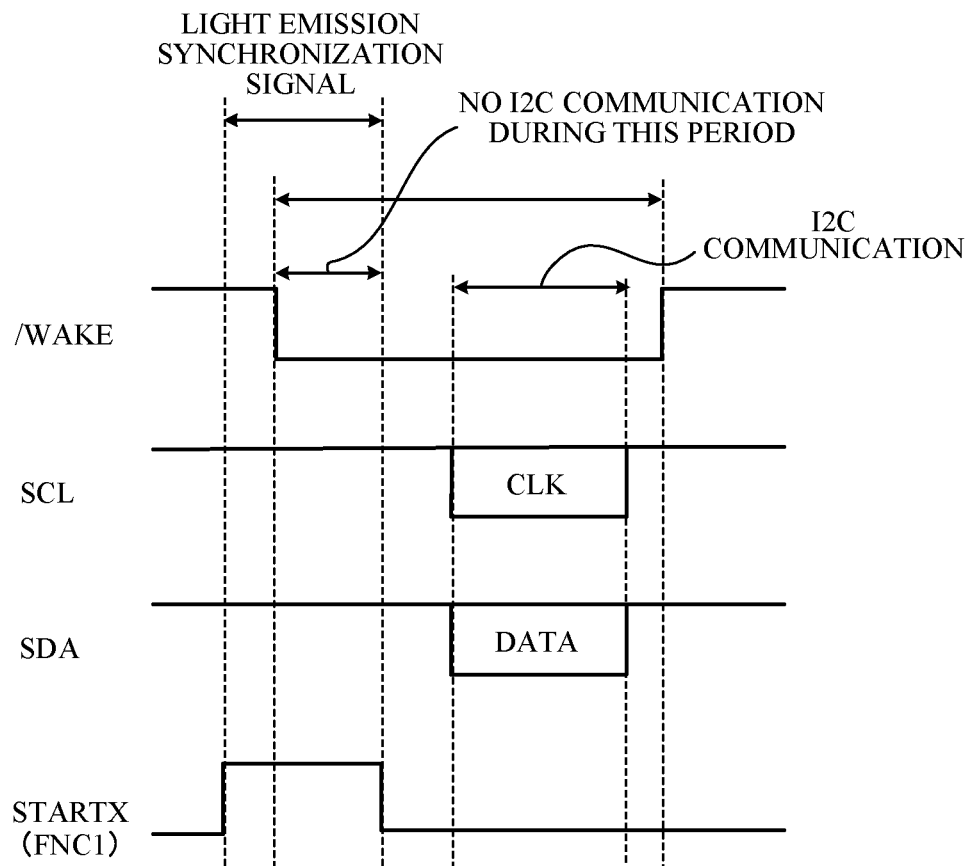

In the strobe device, the light emission synchronization signal (STARTX: third signal) as the FNC1 signal is assigned to the contacts TC14 and TA14 next to the SCL contacts TC13 and TA13. FIG. 15B illustrates the timing at which the accessory 200 makes a communication request to the camera 100, and performs the I2C communication and the strobe light emission. As illustrated in FIG. 15B, at the timing (period) when the light emission synchronization signal is output, no I2C communication is performed between the camera 100 and the accessory 200 in order to process the control of the strobe light emission with the highest priority. In other words, the light emission synchronization signal is a signal whose signal level changes before (or after) the I2C communication, but does not change during the I2C communication. This configuration can keep SCL of the light emission synchronization signal from crosstalk.

Thus, this embodiment disposes the STARTX contact on one of both sides of the SDA contact and the SCL contact, and disposes the/WAKE contact on the other side, thereby achieving a good I2C communication.

This embodiment sets to an open drain signal, similar to SDA, the communication request signal/WAKE connected to the contacts TC11 and TA11 next to the SDA contacts TC12 and TA12. In comparison with a push-pull type communication request signal/WAKE is a push-pull system, crosstalk to SDA can be suppressed when the signal level of the communication request signal/WAKE changes.

SCLK connected to the SCLK contacts TC07 and TA07 is a clock signal for the SPI communication, and operates at a driving frequency of 1 MHz in this embodiment. In this embodiment, the attachment detection contacts TC06 and TA06 next to the SCLK contacts TC07 and TA07 are used to transmit the accessory attachment detection signal/ACC_DET. As described above, the accessory attachment detection signal/ACC_DET is a signal that has a potential equivalent to GND when the accessory 200 is attached to the camera 100. Therefore, this contact arrangement can prevent crosstalk between SCLK and a signal other than the SPI bus.

MOSI connected to the other contacts TC08 and TA08 next to the SCLK contacts TC07 and TA07 is a data signal transmitted from the camera control circuit 101 to the accessory control circuit 201 by the SPI communication. Generally, the timing at which the MOSI output level in the SPI communication changes is synchronized with the timing at which the SCLK output level changes. Therefore, crosstalk can be suppressed between SCLK and MOSI by disposing the MOSI contacts TC08 and TA08 next to the SCLK contacts TC07 and TA07.

MISO connected to the other contacts TC09 and TA09 next to the MOSI contacts TC08 and TA08 is a data signal transmitted from the accessory control circuit 201 to the camera control circuit 101 in the SPI communication. Generally, the timing at which the MISO output level changes in the SPI communication is synchronized with the timing at which the SCLK output level changes, similar to MOSI. Therefore, by disposing the MISO contacts TC09 and TA09 next to the MOSI contacts TC08 and TA08, crosstalk between the MOSI and the MISO can be suppressed.

CS connected to the other contacts TC10 and TA10 next to the MISO contacts TC09 and TA09 is a communication request signal transmitted from the camera control circuit 101 to the accessory control circuit 201 in the SPI communication. Generally, CS in the SPI communication maintains a constant output level from a communication request to a communication completion.

Therefore, by disposing the CS contacts TC10 and TA10 next to the MISO contacts TC09 and TA09, crosstalk to MISO can be suppressed.

The communication request signal/WAKE connected to the contacts TC11 and TA11 adjacent to the CS contacts TC10 and TA10 is a signal for making a communication request from the accessory control circuit 201 to the camera control circuit 101. As described above, the communication request signal/WAKE is an open drain signal, and thus is relatively susceptible to crosstalk. Therefore, this embodiment disposes the contacts TC10 and TA10 for CS whose signal level changes relatively infrequently, next to the contacts TC11 and TA11 for the communication request signal/WAKE, and can suppress crosstalk to the communication request signal/WAKE.

A differential signal that requires an impedance control is connected to the contacts TC01 to TC03 and TA01 to TA03 and the contacts TC19 to TC21 and TA19 to TA21 located at and near both ends of the camera connector 141 and the accessory connector 211 (these will be collectively referred to as both end sides hereinafter). The signal wiring to the accessory shoe interface is generally configured with a flexible substrate. In order to achieve the desired wiring impedance on the flexible board, it is necessary to keep a distance between the lines of the differential signal and with GND to be wired in parallel. In a board in which both sides are used, it is common to form a mesh GND wiring on the backside of the differential signal. Thus, the signal wiring that requires the impedance control has relatively large restrictions on the wiring design in comparison with a general single-ended signal.

On the other hand, this embodiment connects the differential signal that requires an impedance control to the contacts located on both ends of the camera connector 141 and the accessory connector 211, thereby relatively reducing a relationship with other signals and improving the degree of freedom in wiring design.

The differential signal can be transferred at a high speed of about several hundred Mbps to several Gbps such as USB and PCIe, and is suitable to transfer a large data amount between devices. On the other hand, no differential signal may be used depending on the type of the accessory 200. The accessory that uses no differential signal needs no contacts assigned to the differential signal, so the accessory cost can be reduced by deleting the contact.

FIG. 12 illustrates a configuration variation of the accessory 200 illustrated in FIG. 1. More specifically, it has such a configuration that the contacts TA01 to TA03 and TA19 to TA21 and signals and circuits connected to them are omitted. That is, the accessory 200 in FIG. 12 has 15 contacts. In the configuration in FIG. 12, a differential signal is assigned to the contacts TC01 to TC03 and TC19 to TC21 located at both ends of the camera connector 141. On the other hand, the accessory 200 that needs no differential signal adopts a contact arrangement that eliminates a contact for the differential signal from the accessory connector 211, and includes only the contact necessary for the accessory 200.

The accessory 200 in FIG. 12 sets to the GND contacts the contacts TC04 and TA04 and the contacts TC18 and TA18 near both ends of the camera connector 141 and the accessory connector 211. With such a contact arrangement, even in the accessory 200 connected to a part of the contacts of the camera connector 141, the contacts at both ends of the accessory connector 211 can be set to the GND contacts. This configuration can prevent the GND contacts from being disconnected even in the case where an excessive static pressure or impact is applied to the accessory 200.

Figure 13:
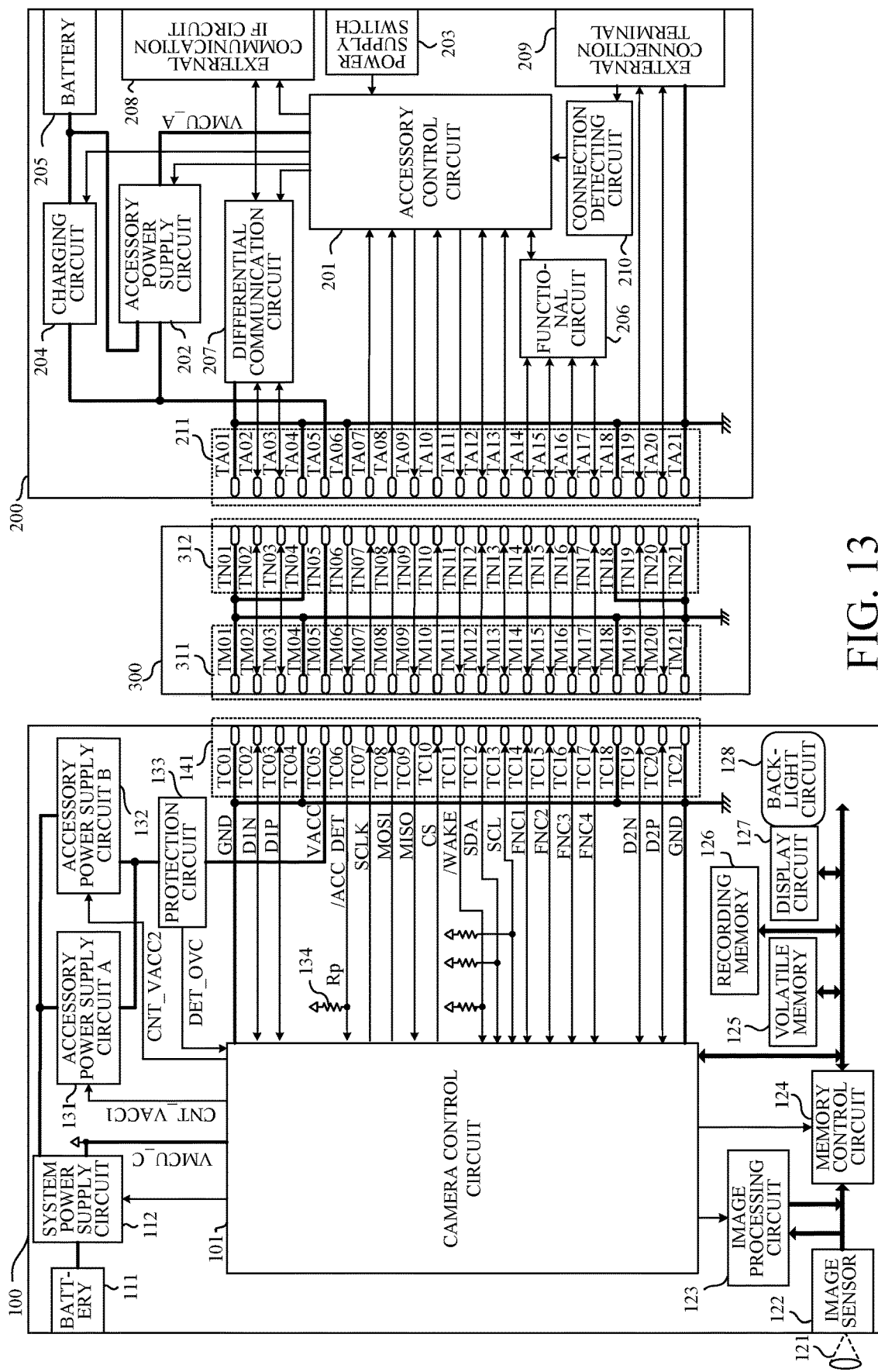
FIG. 13 illustrates a configuration example of the camera, the accessory, and an intermediate accessory according to the first embodiment.

A direct attachment of the accessory 200 to the camera 100 has been described. Referring now to FIG. 13, a description will be given of an intermediate accessory 300 attached between the camera 100 and the accessory 200. The camera 100 and the accessory 200 have the above-described configurations. The intermediate accessory 300 includes an extension cable for extending a distance between the camera 100 and the accessory 200, an adapter used to simultaneously attach a plurality of accessories to the camera 100, and the like. This embodiment will describe the intermediate accessory 300 as an extension cable. In the configuration in FIG. 13, the intermediate accessory 300 corresponds to an accessory, and the accessory 200 corresponds to another accessory.

The intermediate accessory 300 has a camera shoe and an accessory shoe that are attachable to the camera 100 and the accessory 200, respectively, and each is provided with a camera-side intermediate connector 311 and an accessory-side intermediate connector 312. The camera-side intermediate connector 311 has 21 contacts TM01 to TM21 arranged in a row, and is a connector for making an electrical connection with the camera 100. The contacts TM01 to TM21 each make a one-to-one contact with the contacts TC01 to TC21 in the camera connector 141.

On the other hand, the accessory-side intermediate connector 312 has 21 contacts TN01 to TN21 arranged in a row, and is a connector for making an electrical connection with the accessory 200. The contacts TN01 to TN21 each make a one-to-one contact with the contacts TA01 to TA21 in the accessory connector 211.

The intermediate accessory 300 having this contact arrangement can provide the power supply and the communication in the same manner as those when the accessory 200 is directly attached to the camera 100. At this time, the intermediate accessory 300 may receive the power supply from the camera 100, or the power supply from the camera 100 may be directly transmitted to the accessory 200. The power supply in this embodiment includes a case where the power supply from the camera 100 is transmitted to the accessory 200 as it is and no power is supplied to the accessory 300.

In FIG. 13, the number of contacts of the camera-side intermediate connector 311 is the same as the number of contacts of the camera connector 141, and the number of contacts of the accessory-side intermediate connector 312 is the same as the number of contacts of the accessory connector 211, but they may not necessarily be equal to each other.

Figure 14:
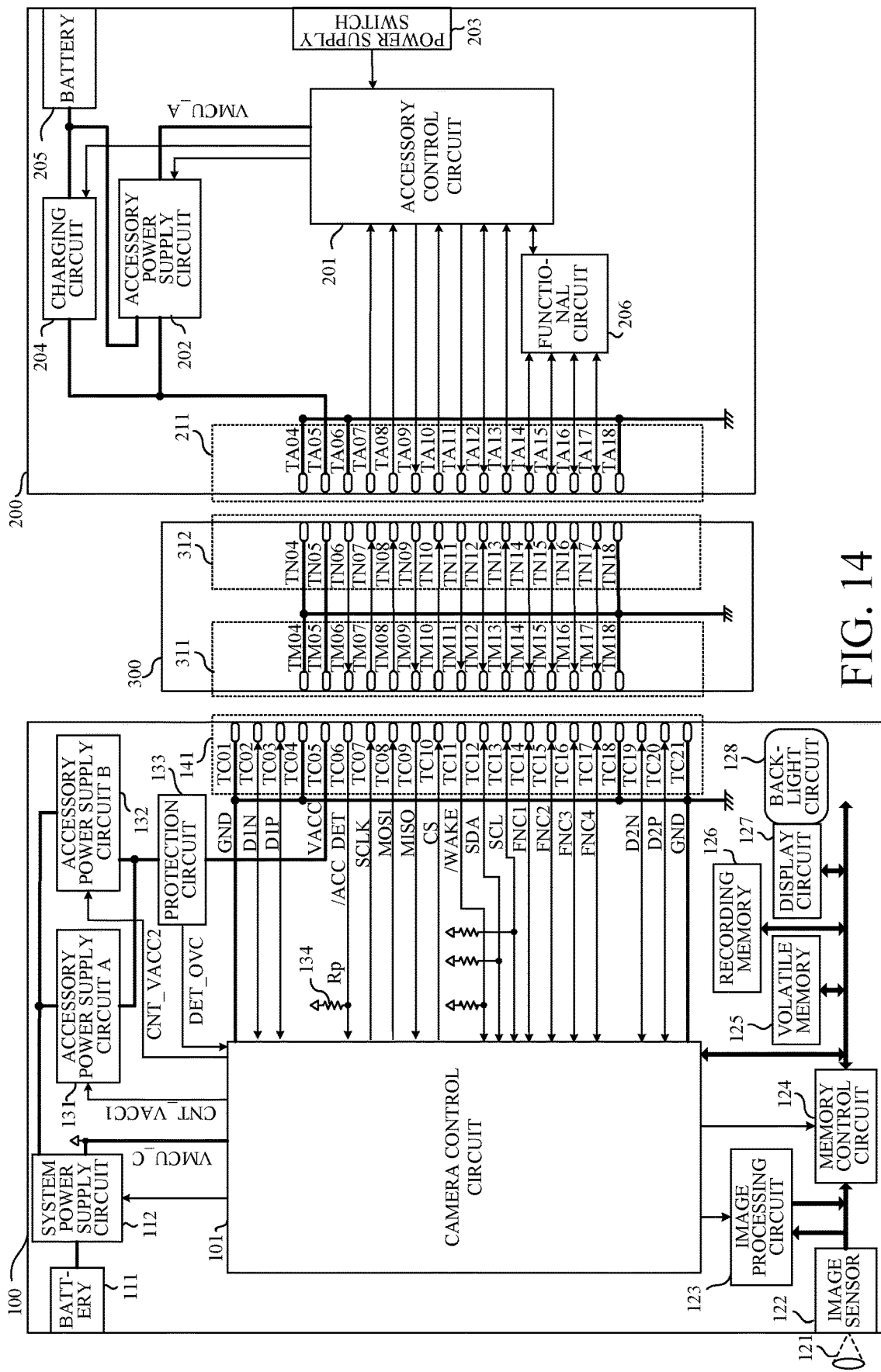
FIG. 14 illustrates another configuration example of the camera, the accessory, and the intermediate accessory according to the first embodiment.

FIG. 14 illustrates a variation of the configuration of FIG. 13 about the accessory 200 and the intermediate accessory 300. Although differential signals are connected to the contacts TC01 to TC03 and TC19 to TC21 on both ends of the camera connector 141, the differential signal may not be required depending on the function of the accessory 200. The configuration of FIG. 14 eliminates the contact to which the differential signal is connected, from the camera-side intermediate connector 311 and the accessory-side intermediate connector 312 and the accessory connector 211. That is, the intermediate accessory 300 and the accessory 200 in FIG. 14 each have 15 contacts. Thereby, a contact arrangement including only the contacts required for the intermediate accessory 300 and the accessory 200 is adopted.

A detailed description will now be given of the connection configuration between the camera 100 and the external flash unit 120, which is an example of the accessory 200.

FIG. 16A illustrates the camera 100 viewed from the diagonally rear side. FIG. 16B illustrates how to attach the external flash unit 120 to the accessory shoe 1123 of the camera 100. FIG. 16C illustrates the external flash unit 120 attached to the camera 100 viewed from the oblique rear side.

The imaging optical system is provided on the front side (field side) of the camera 100, and the image display unit 107 is provided on the rear side of the camera 100. A top cover 150 as an exterior member is provided on the top surface of the camera 100, and an accessory shoe 1123 is provided to the top cover 150. On the other hand, in the external flash unit 120, a camera connector 1206 is provided at the bottom of the external flash unit 120.

As illustrated in FIG. 16B, the external flash unit 120 is slid in a direction parallel to the front side in the Z direction (attachment side in the first direction) relative to the camera 100 to engage the camera connector 1206 and the accessory shoe 1123 with each other. Thereby, the external flash unit 120 can be attached to the camera 100. The front side in the Z direction is a direction from the rear side to the front side of the camera 100, that is, a direction from the image display unit 107 side toward the imaging optical system side. An X direction (second direction), a Y direction (third direction), and the Z direction (front-back direction) illustrated in FIGS. 16A, 16B, and 16C and subsequent figures are commonly used. The X direction is a direction orthogonal to the Z direction in the horizontal plane when the Z direction is parallel to the horizontal direction, and is the width direction of the camera 100. The Y direction is a direction orthogonal to the Z direction and the X direction, and is the height direction of the camera 100.

Figure 17A:
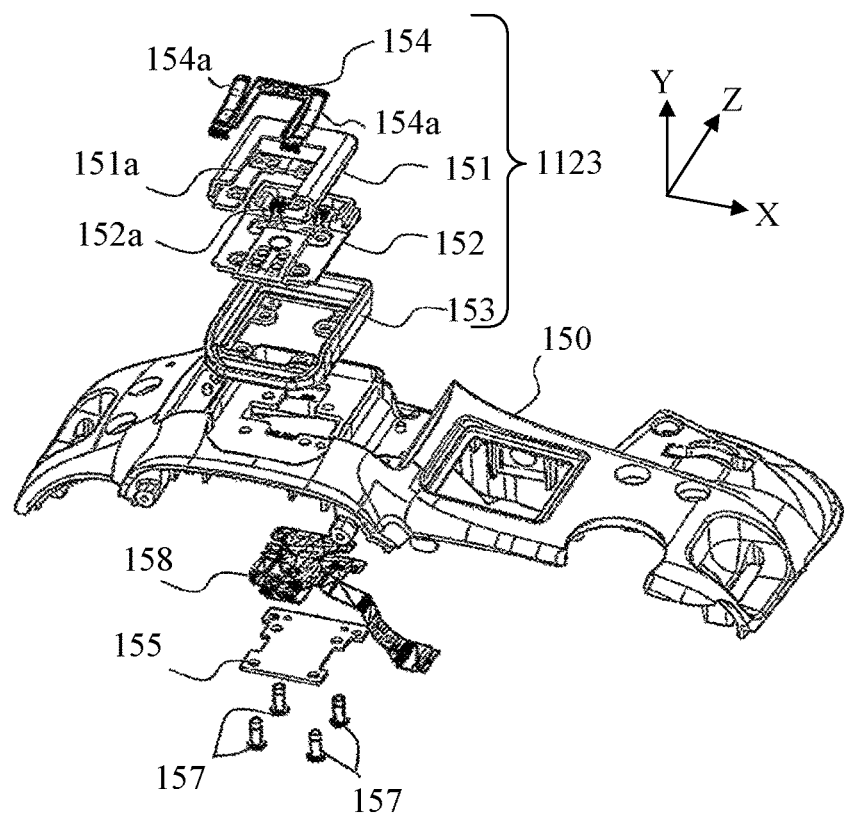
FIGS. 17A and 17B are an exploded view and a perspective view of an accessory shoe according to the first embodiment.
Figure 17B:
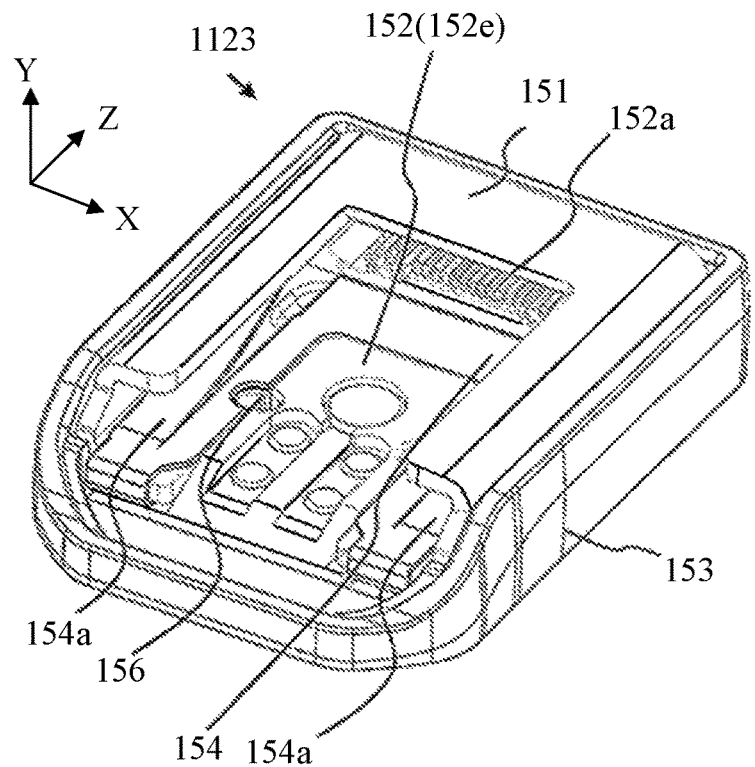

A detailed description will now be given of the accessory shoe 1123 of the camera 100. FIG. 17A illustrates the top cover 150 and the exploded accessory shoe 1123. FIG. 17B illustrates the assembled accessory shoe 1123. The assembly direction of the accessory shoe 1123 onto the top cover 150 is the Y direction.

The accessory shoe 1123 includes the engagement member 151, a connection terminal connector 152, a shoe stage 153, and an accessory shoe spring 154. The engagement member 151 is a member for holding the external flash unit 120 through an engagement with the external flash unit 120. The connection terminal connector 152 includes a plurality of connection terminals 152a arranged at regular pitches in the X direction on a connector base member 152e as a holding member made of a resin material or the like and held by the connector base member 152e. The connection terminals 152a correspond to the contacts TC01 to TC21 in the camera connector 141 illustrated in FIG. 1.

Figure 19A:
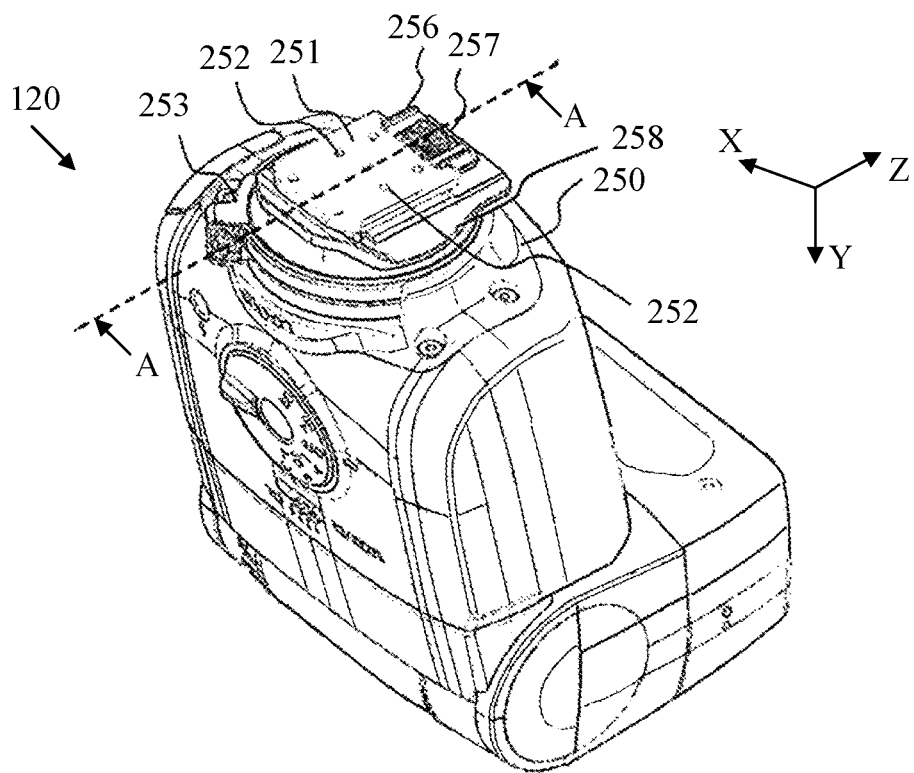
FIGS. 19A and 19B are a perspective view and a sectional view of the external flash unit according to the first embodiment.

In the connection terminal connector 152, the connection terminals 152a are arranged on the front side in the Z direction as the attachment direction of the external flash unit 120 (on the front side of the camera 100) as illustrated in FIG. 17B. An engagement hole portion 156 to be engaged with a lock pin 252 of the external flash unit 120 illustrated in FIG. 19A is provided behind the connection terminal connector 152 in the Z direction (on the rear side of the digital camera 100).

While the external flash unit 120 is attached to the accessory shoe 1123, the connection terminals 152a are electrically connected to the external flash unit 120. Each of the plurality of connection terminals 152a is electrically connected to a flexible substrate 158 disposed on the lower side of the top cover 150 in the Y direction. The flexible substrate 158 is connected to an unillustrated main substrate of the camera 100. Thus, when the external flash unit 120 is attached to the accessory shoe 1123, a communication is available between the external flash unit 120 and the camera 100.

The shoe stage 153 is a housing member that encloses the engagement member 151 and the connection terminal connector 152. An accessory shoe holding member 155 is a structural skeleton that holds the engagement member 151. As illustrated in FIG. 17A, the accessory shoe holding member 155, the flexible substrate 158, the top cover 150, the shoe stage 153, and the connection terminal connector 152 are fastened to the engagement member 151 by four screws 157 that are inserted into them. Thereby, these members are mutually positioned and fixed. By arranging the four screws 157 one by one in four areas equally divided in the X direction and the Z direction, the above components can be connected in a well-balanced manner.

Figure 18A:
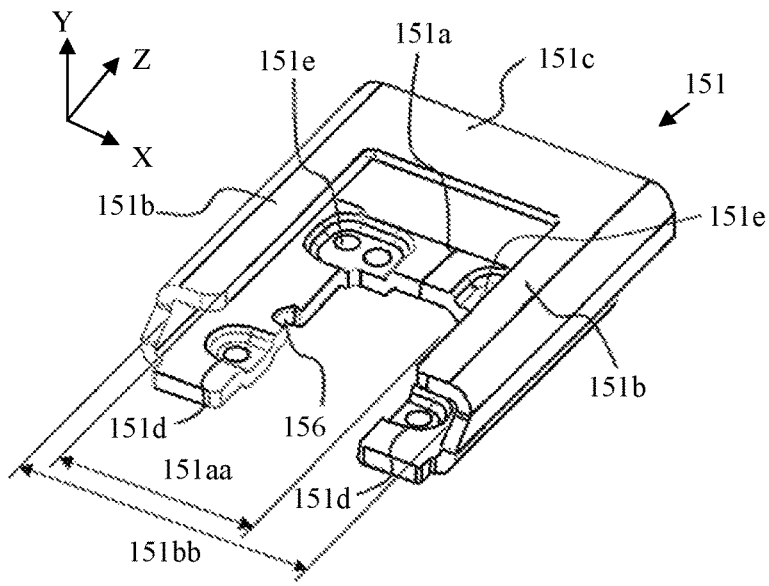
FIGS. 18A, 18B, and 18C illustrate a structure of an engagement member and a connection terminal connector of the accessory shoe according to the first embodiment.
Figure 18B:
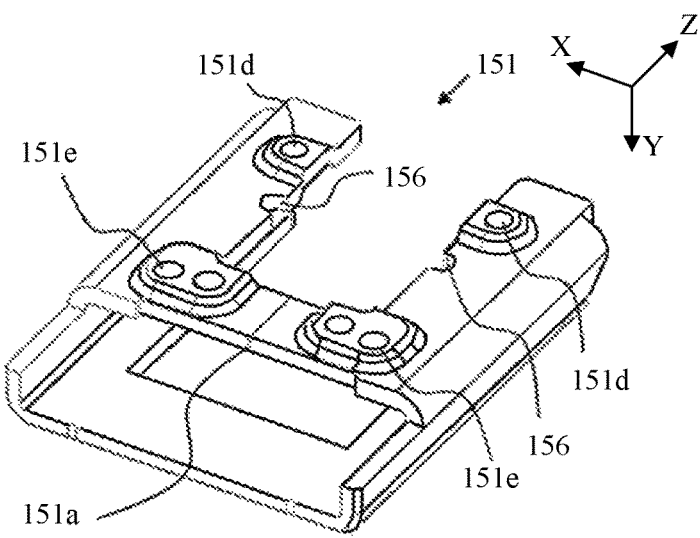
Figure 18C:
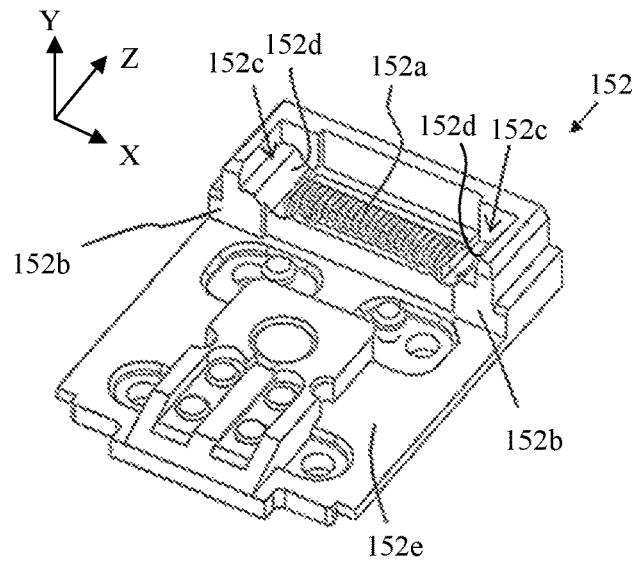
Figure 24:
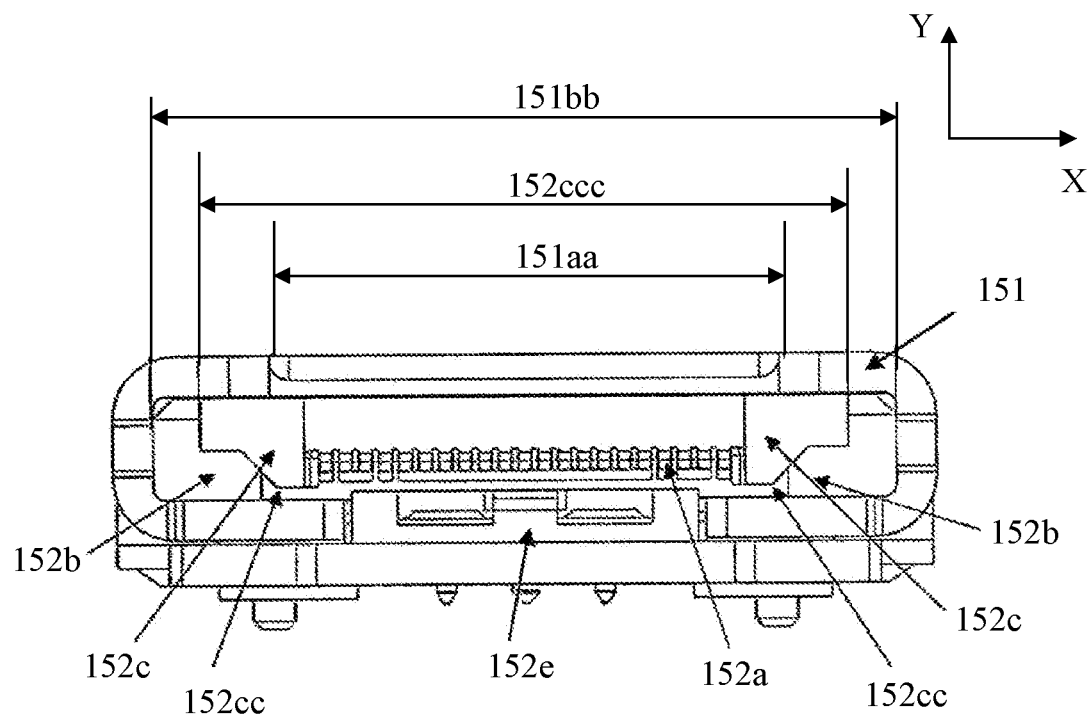
FIG. 24 is a front view of the accessory shoe according to the first embodiment.

FIG. 18A illustrates the structure on the top surface side of the engagement member 151, and FIG. 18B illustrates the structure on the bottom surface side of the engagement member 151. FIG. 18C illustrates the structure of the connection terminal connector 152 on the top surface side. FIG. 24 illustrates the accessory shoe 1123 viewed from the insertion direction (attachment direction) of the external flash unit 120.

The engagement member 151 is formed by bending a metal plate in a loop shape so that the end surfaces of the bent ends face and contact each other at a seam 151a. The engagement member 151 has a pair of engagement portions 151b, and a coupler 151c that couples the pair of engagement portions 151b together. The engagement member 151 has a pair of first screw hole portions 151d for fastening the screws 157 and a pair of second screw hole portions 151e. The engagement member 151 has engagement hole portions 156 to be engaged with the lock pins 252 of the external flash unit 120.

Figure 19B:
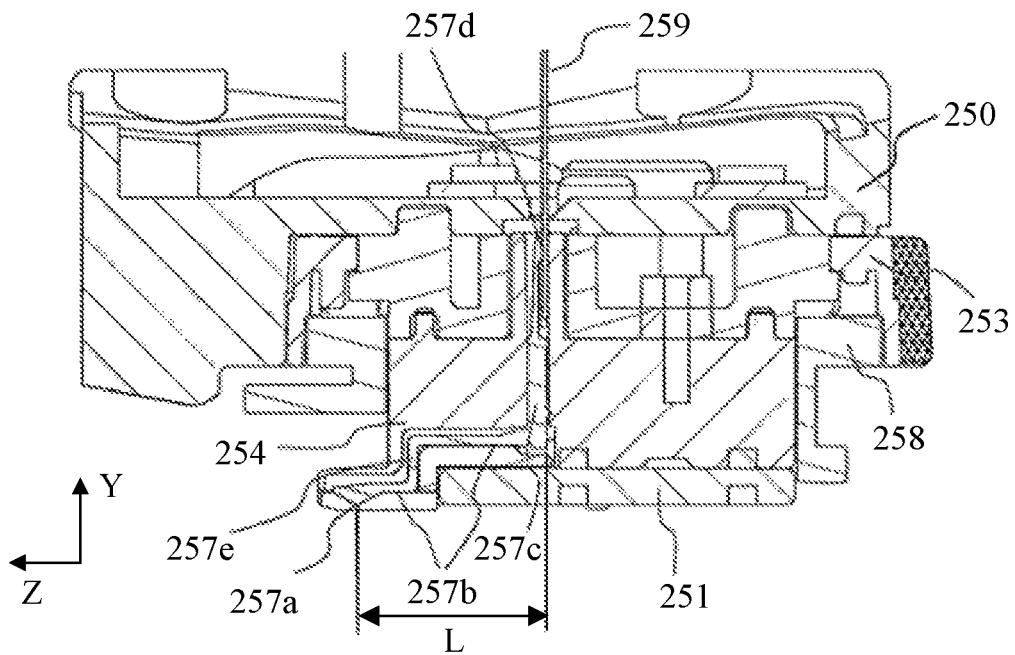

As illustrated in FIGS. 18A and 12, the pair of engagement portions 151b are separated by a first width (referred to as engagement portion interval hereinafter) 151aa in the X direction. A holding member 254 of the external flash unit 120, which will be described later, illustrated in FIG. 19B is inserted into the engagement portion interval 151aa. The pair of first screw hole portions 151d are provided at a predetermined interval in the X direction, and serve as a pair of first fastening hole portions provided apart from each other in the X direction at the back (on the rear side) in the Z direction. The pair of second screw hole portions 151e are provided at a predetermined interval in the X direction, and serve as a pair of second fastening hole portions provided apart from each other in the X direction at the front in the Z direction. The engagement hole portion 156 is formed at a position engageable with the lock pin 252 of the external flash unit 120 in an area sandwiched between the pair of first screw hole portions 151d.

In the connection terminal connector 152, as illustrated in FIGS. 17B and 18C, a plurality of connection terminals 152a are exposed. In the pitch direction (X direction) in which the plurality of connection terminals 152a are aligned, the position of the camera connector 1206 is determined by the engagement portion interval 151aa of the engagement member 151. Therefore, the holding member 254 of the external flash unit 120 is positioned relative to the connection terminal connector 152 by the engagement member 151.

A contact surface and a groove portion illustrated in FIG. 24 are formed on both sides of the connection terminal connector 152 (connector base member 152e) as one example of the camera connector 141 illustrated in FIG. 1 sandwiching the plurality of connection terminals 152a in the X direction on the front side in the Z direction. That is, there are formed contact surfaces 152b that contact and position the accessory shoe 1123 in the Z direction when the external flash unit 120 is attached, and groove portions 152c into which the accessory shoe 1123 is inserted. Each groove portion 152c is formed so as to extend from the contact surface 152b to the front side (attachment side) in the Z direction, and has a slope portion 152d so as to face inward and diagonally upward (so as to have a tilt to the X direction). Part of the groove portion 152c above the slope portion 152d extends outward in the X direction from the position of the top end of the slope portion 152d. This is to prevent a dent (sink) from being generated in the slope portion 152d during resin molding if the slope portion 152d is formed up to the top end of the groove portion 152c.

As illustrated in FIG. 24, in the X direction, an outermost inner surface 152ccc of the groove portion 152c in the connector base member 152e of the accessory shoe 1123 is located outside of the inner end surfaces of the pair of engagement portions 151b of the engagement member 151 (engagement portion interval 151aa) and is located inside of the outermost inner surface 151bb of the engagement member 151.

A slope start position 152cc, which is the end (lower end) of the slope portion 152d on the bottom surface side of the groove portion 152c, is provided inside the engagement portion interval 151aa. Thereby, it is possible to secure an area for providing the contact surface 152b that comes into contact with a contact portion 251b described later of the camera connector 1206 and positions it in the Z direction. Providing the slope shape starting from the slope start position 152cc can expand a space into which the shoe apparatus (camera connector 1206 described later) of the external flash unit 120 is inserted, and can secure the degree of freedom in the shape of the shoe apparatus. As a result, the shoe apparatus of the external flash unit 120 can be sufficiently formed with a shape that protects the connection terminals.

Figure 20A:
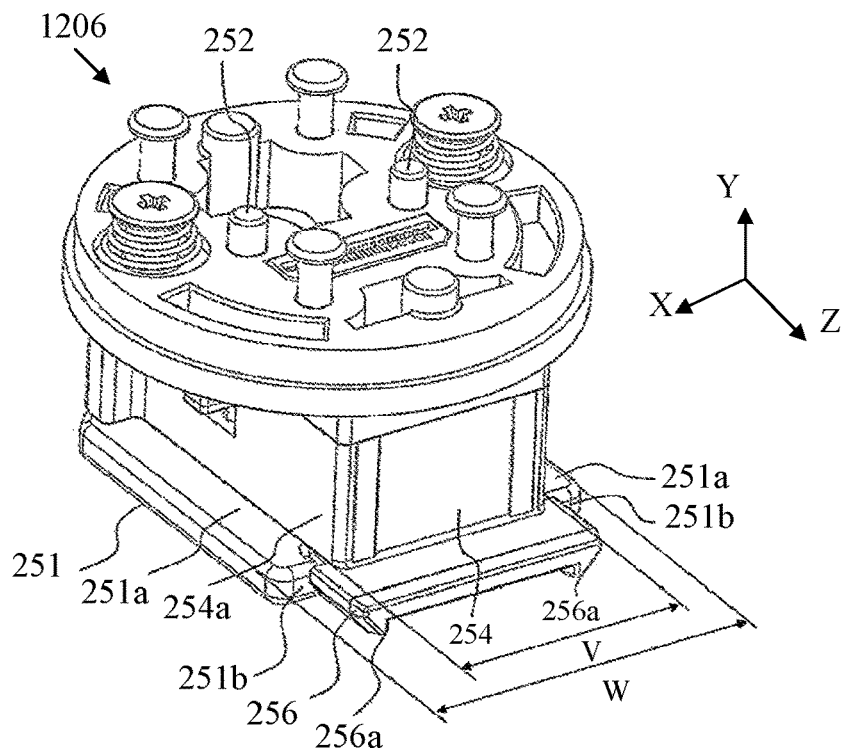
FIGS. 20A, 20B, and 20C are a perspective view and a front view illustrating an internal structure of a camera connector according to the first embodiment.
Figure 20B:
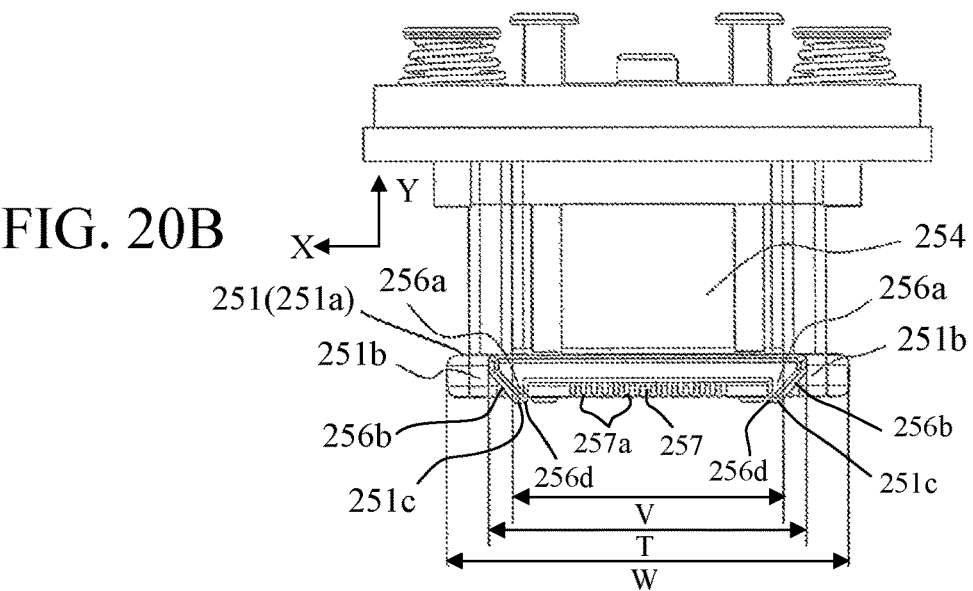

A description will now be given of the external flash unit 120. FIG. 19A illustrates the external flash unit 120 viewed from the camera connector 1206 side (bottom side in the Y direction). FIG. 19B is a section taken along a line A-A in FIG. 19A and illustrates the internal structure of the camera connector 1206. FIG. 20A illustrates the camera connector 1206. However, a base portion 250 and a lock lever 253, which will be described later, are omitted. FIG. 20B illustrates the camera connector 1206 viewed from the front in the Z direction.

The camera connector 1206 is provided on the bottom side in the Y direction (top side in FIG. 19A) of the base portion 250 of the external flash unit 120 as illustrated in FIG. 19B when it is attached to the accessory shoe 1123 of the camera 100. The camera connector 1206 includes a shoe attachment leg (engagement member, shoe plate) 251, the lock pins 252, the lock lever 253, the holding member 254, a connection plug 256, and a Y-direction holding member 258.

The shoe attachment leg 251 as a shoe engagement member is an engagement member engaged with the accessory shoe 1123 of the camera 100 and held. That is, the shoe attachment leg 251 is an engagement member on the external flash unit 120 side attachable to and detachable from the engagement member 151 of the accessory shoe 1123.

A large stress is applied to the accessory shoe 1123 and the camera connector 1206 due to the pressure for maintaining the attachment state and the external force (impact, etc.) acting on the external flash unit 120. The shoe attachment leg 251 is manufactured by processing a metal plate (sheet metal) in order to secure a high mechanical strength against such a large stress.

The lock pin 252 is a member for preventing the external flash unit 120 from falling off while the camera connector 1206 (shoe attachment leg 251) is attached to the accessory shoe 1123, and is held on the shoe attachment leg 251 movable in the Y direction. More specifically, the lock pin 252 is slidably held in the Y direction by the Y-direction holding member 258. The lock lever 253 and the Y-direction holding member 258 are held by the holding member 254.

When the external flash unit 120 is attached to the accessory shoe 1123 and the lock lever 253 is rotated, the Y-direction holding member 258 is moved downward in the Y-direction in FIG. 19B by an unillustrated cam portion. At that time, the lock pin 252 also moves downward in the Y direction in FIG. 19B together with the Y-direction holding member 258. Thereby, the lock pin 252 projects from the shoe attachment leg 251 and is engaged with the engagement hole portion 156 provided in the engagement member 151 of the accessory shoe 1123. The lock pin 252 and the engagement hole portion 156 serve as a positioning member in the Z direction for ensuring an electrical connection between the external flash unit 120 and the camera 100.

The connection plug 256 as one example of an accessory connector 211 illustrated in FIG. 1 is provided on the front side in the Z direction of the camera connector 1206, made of a nonconductive material (dielectric material) such as a resin material, and integrated with the holding member 254. An outermost width T of the connection plug 256 in the X direction is narrower than a width W of the shoe attachment leg 251 in the X direction. Thereby, an area for providing the contact portion 251b on the shoe attachment leg 251 is secured. The connection plug 256 has a plurality of connection terminals 257 for contacting and communicating with the plurality of connection terminals 152a of the accessory shoe 1123 illustrated in FIG. 18C. The connection terminals 257 correspond to the contacts TA01 to TA21 of the accessory connector 211 illustrated in FIG. 1.

The plurality of connection terminals 257 are provided so as to have a one-to-one correspondence with the plurality of connection terminals 152a, and held by the holding member 254 so as to extend in the Z direction and to line up in the X direction. Each connection terminal 257 has a tip portion 257a that comes into contact with the corresponding connection terminal 152a. The tip portion 257a is exposed to the lower side in the Y direction (-Y direction) and the tip side in the Z direction (+Z direction) from the connection plug 256. Each connection terminal 257 has a shape extending backward in the Z direction from a tip portion 257a, and has an extension portion 257b that displaces the tip portion 257a upward in the Y direction in FIG. 19B by an elastic deformation when the tip portion 257a comes into contact with the connection terminal 152a. A vertical extension portion 257c extending upward in the Y direction is formed at the back end of the extension portion 257b in the Z direction. Provided at the upper end of the vertical extension portion 257c is a flexible substrate connector 257d to be connected to an unillustrated main substrate of the external flash unit 120 and connected to a flexible substrate 259 inserted into the holding member 254 from the top side in the Y direction.

The extension portion 257b has a step portion 257e having a step in the Y direction in the middle of the Z direction. As described above, the extension portion 257b can be elastically deformed in the Y direction. However, in the case where the distance L in the Z direction of the extension portion 257b is short, a sufficient deformation amount cannot be obtained, and the durability is lowered. As a result, the connection terminal 152a and the tip portion 257a are repeatedly attached and detached, and the extension portion 257b may easily get damaged. Accordingly, providing the step portion 257e to the extension portion 257b can secure a sufficient distance L without causing the extension portion 257b to interfere with the shoe attachment leg 251.

As illustrated in FIGS. 20A and 20B, there are a pair of protrusion portions 256a that project downward in the Y direction (third direction) so as to sandwich a plurality of connection terminals 257 at both ends of the connection plug 256 in the X direction. That is, a pair of protrusion portions 256a are provided on both outer sides of the plurality of connection terminals 257. As illustrated in FIG. 20B, a lower tip portion 256d of each protrusion portion 256a protrudes below a line made by connecting the lower ends of the tip portions 257a of the connection terminals 257 in order to protect the connection terminals 257 from external forces such as the pressure and the impact. That is, the tip portions 257a of the connection terminals 257 is provided above (inside) a line made by connecting the lower tip portions 256d of the pair of protrusion portions 256a.

There is a slope portion 256b on the outer side (outer surface) of each protrusion portion 256a in the X direction, which serves as an outer surface that extends diagonally upward from the lower tip portion 256d and faces diagonally downward, that is, has a tilt to the X direction. In other words, each protrusion portion 256a is provided with the slope portion 256b on a side not facing the plurality of connection terminals 257 so that the width of each protrusion portion 256a in the X direction at a position close to the tip in the Y direction is smaller than that at a position distant from the tip. Since each protrusion portion 256a has such a shape, the connection plug 256 can be inserted into the groove portion 152c having the slope portion 152d in the connection terminal connector 152.

Figure 20C:
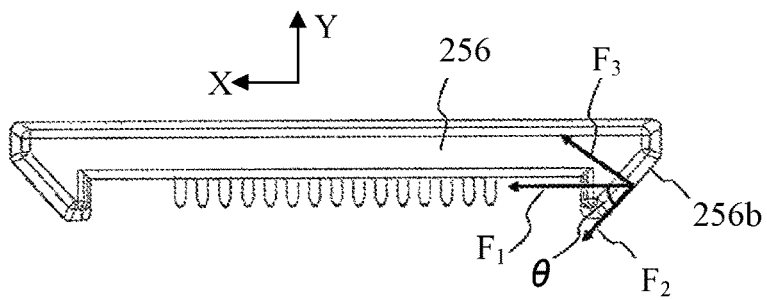

The slope portion 256b has a role of releasing an external force, such as the pressure and impact, from the connection plug 256 to prevent the connection plug from getting damaged. For example, FIG. 20C illustrates a case where an external force is applied to the connection plug 256 from the X direction. FIG. 20C illustrates the connection plug 256 viewed from the front in the Z direction.

An external force from the X direction is defined as $F_1$ as a vector. The external force $F_1$ acting on the slope portion 256b is decomposed according to the addition theorem in the vector space into a component force $F_2$ in a direction along the slope portion 256b and a component force $F_3$ in a direction perpendicular to the slope portion 256b. Where $\theta$ is an angle formed by the external force $F_1$ and the slope portion 256b, the component force $F_2$ and the component force $F_3$ can be calculated by the following expression (1).

$$F_2 = F_1 \cos \theta$$

$$F_3 = F_1 \sin \theta \tag{1}$$

In the case where the slope portion 256b is provided, $\theta$ is $0° < \theta < 90°$. In this range, the following is established:

$$F_2 < F_1$$

$$F_3 < F_1 \tag{2}$$

Since the component force $F_2$ escapes in the direction along the slope portion 256b, the component force $F_3$ is the only force that affects the connection plug 256. As described above, since the component force $F_3$ is smaller than the component force $F_1$, the connection plug 256 can be prevented from getting damaged even if an external force that is large to some extent is applied.

By forming the slope portions 256b on both sides in the X direction so that its width in the X direction becomes narrower toward the lower side in the Y direction, not only the external force from the X direction but also the external force from the bottom side in the Y direction can be partially released.

Figure 25:
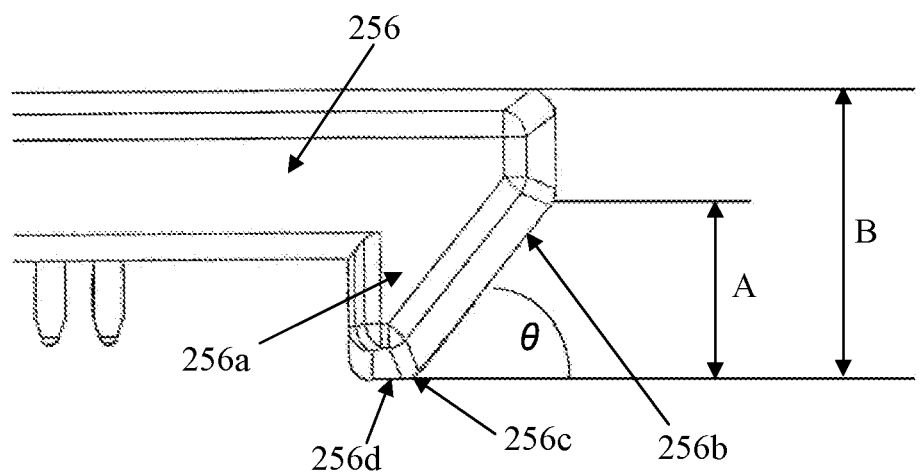
FIG. 25 is a partially enlarged view of a connection plug according to the first embodiment.

FIG. 25 illustrates the partially enlarged connection plug 256 viewed from the Z direction. In the Y direction, assume that B is a height from the lower tip portion 256d of the protrusion portion 256a to the top surface of the connection plug 256 (a height of the connection plug including the protrusion portion), and A is a height of the slope portion 256b from the lower tip portion 256d (slope start position 256c) to the upper end of the slope portion 256b. At this time, A is preferably one-fifth or more of B, more preferably one-fourth or more, one-third or more, or half or more as illustrated in FIG. 13. That is, the slope portion 256b is formed to have a significant size for the function of releasing the external force from the X direction, and is different from a chamfered shape generally provided at the corner of the protrusion portion. The tilt angle $\theta$ of the slope portion 256b to the X direction is preferably set in a range of $45°\pm20°$ for the above function of releasing the external force.

In order to secure a sufficient area for the contact portion 251b on the shoe attachment leg 251 relative to the contact surface 152b of the accessory shoe 1123 as the positioning portion in the Z direction, the width in the X direction may be set as short as possible between slope start positions 256c at the lower tip portions 256d of the slope portions 256b on both sides. This embodiment sets the width between the slope start positions 256c in the X direction inside the width V of the holding member 254 in the X direction. In other words, in this embodiment, the contact portion, which is a portion that contacts the contact surface 152b of the accessory shoe 1123 and is provided between the shoe engagement portion 251a and the protrusion portion 256a in the X direction, has a variable width in the area in contact with the contact surfaces 152b in the X direction depending on the position in the Y direction. In this embodiment, as the position is closer to the tip of the protrusion portion 256a in the Y direction, the width of the area in contact with the contact surface 152b becomes wider in the X direction. In addition, in other words, in this embodiment, the lower tip portion 256d, which is a lower end in the Y direction of the tip portion in the Z direction, is not located below the plurality of connection terminals 257 in the Y direction and outside the ends on the side of the plurality of connection terminals 257 of the shoe engagement portion 251a in the X direction. In this embodiment, the lower tip portion 256d is located below the plurality of connection terminals 257 in the Y direction. In this embodiment, the lower tip portion 256d is provided at a position inside the ends on the side of the plurality of connection terminals 257 of the shoe engagement portion 251a in the X direction. This structure secures a sufficient area for the contact portion 251b.

The camera connector 1206 has such a structure that the shoe attachment leg 251 and the holding member 254 are fastened. The details of this fastening structure will be described later.

The holding member 254 can be inserted into the engagement portion interval 151aa of the engagement member 151 of the accessory shoe 1123 illustrated in FIG. 18A, and has a coupler 254a having a width V shorter than the width W of the shoe attachment leg 251 in the X direction. The widths W and V are defined by the Japanese Industrial Standards (JIS) B7101-1975 "camera accessory attachment seat and attachment foot." When the coupler 254a is engaged with the engagement member 151, the position of the external flash unit 120 relative to the camera 100 is determined in the X direction. The shoe attachment leg 251 is urged upward in the Y direction when it comes into contact with an elastically deformable portion 154a of the accessory shoe spring 154 as the urging member illustrated in FIGS. 17A and 17B. Thereby, the top surface of the shoe engagement portion 251a is brought into contact (pressure contact) with the bottom surface of the engagement member 151, and the position of the external flash unit 120 relative to the camera 100 is determined in the Y direction.

When the contact portion 251b of the shoe attachment leg 251 contacts the contact surface 152b on the front side in the Z direction of the connection terminal connector 152, the position of the external flash unit 120 relative to the camera 100 is determined in the Z direction.

The holding member 254 is also a structure for coupling the shoe attachment leg 251 and the base portion 250, and the lock pins 252 and the connection terminals 257 are arranged inside the coupler 254a.

Figure 21A:
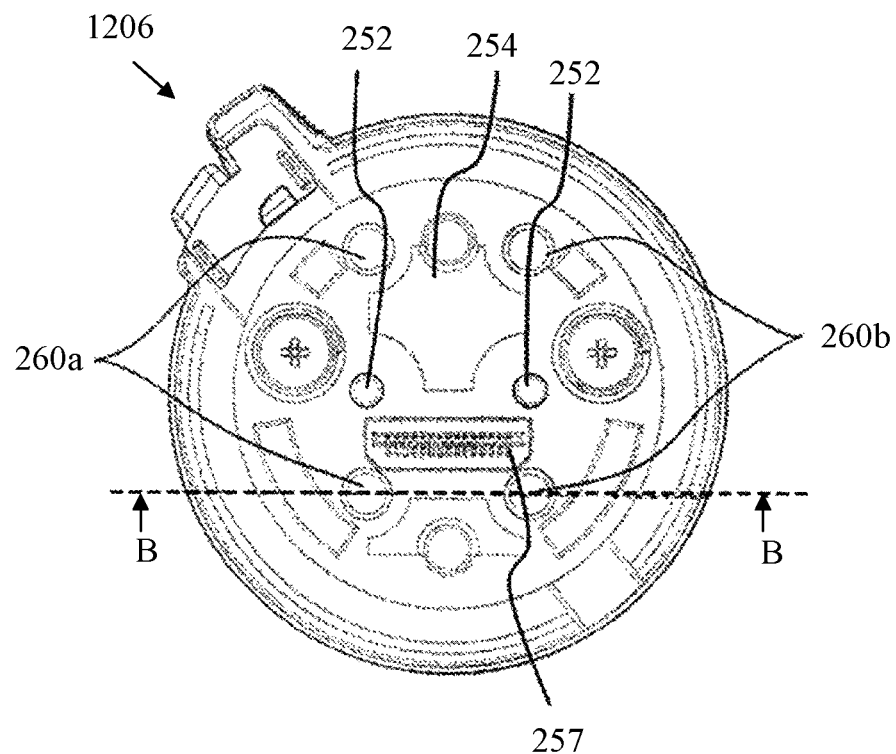
FIGS. 21A and 21B are a top view and a sectional view of the camera connector according to the first embodiment.

Next follows a description of the fastening structure between the holding member 254 and the shoe attachment leg 251. FIG. 21A illustrates the camera connector 1206 viewed from the upper side in the Y direction, and FIG. 21B illustrates a section taken along a line B-B in FIG. 21A.

A pair of first screw 260a and a pair of second screws 260b, which are fastening members for fastening the shoe attachment leg 251 to the holding member 254, penetrate the holding member 254 and are fastened to the shoe attachment leg 251. At this time, by disposing one screw in each of the four areas that are substantially equally divided in the X direction and the Z direction in a well-balanced manner, the shoe attachment leg 251 is stably held by the holding member 254. As described above, the shoe attachment leg 251 is a component to which a large stress is applicable. Therefore, a required mechanical strength can be ensured by fastening the metal shoe attachment legs 251 to the holding member 254 with a pair of first screws 260a and a pair of second screws 260b arranged in a well-balanced manner.

Figure 21B:
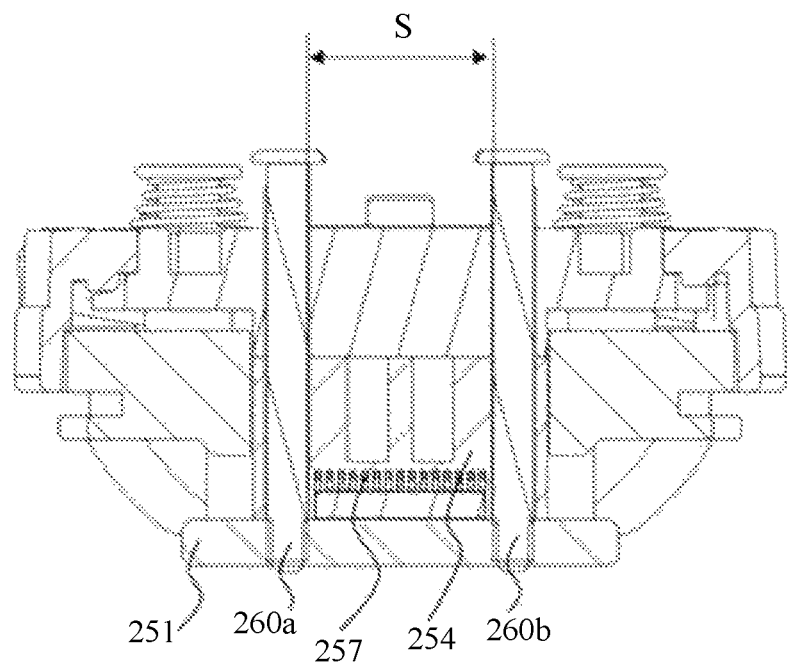

As illustrated in FIG. 21B, a plurality of connection terminals 257 are arranged in an area S sandwiched by the pair of first screws 260a and the pair of second screws 260b. The widths between the pair of first screws 260a and between the pair of second screws 260b are narrower than the width between the lower tip portions 256d of the protrusion portions 256a of the connection plug 256, the width V of the holding member 254, the outermost width T of the connection plug 256, and the width W of the shoe attachment leg 251.

Figure 26:
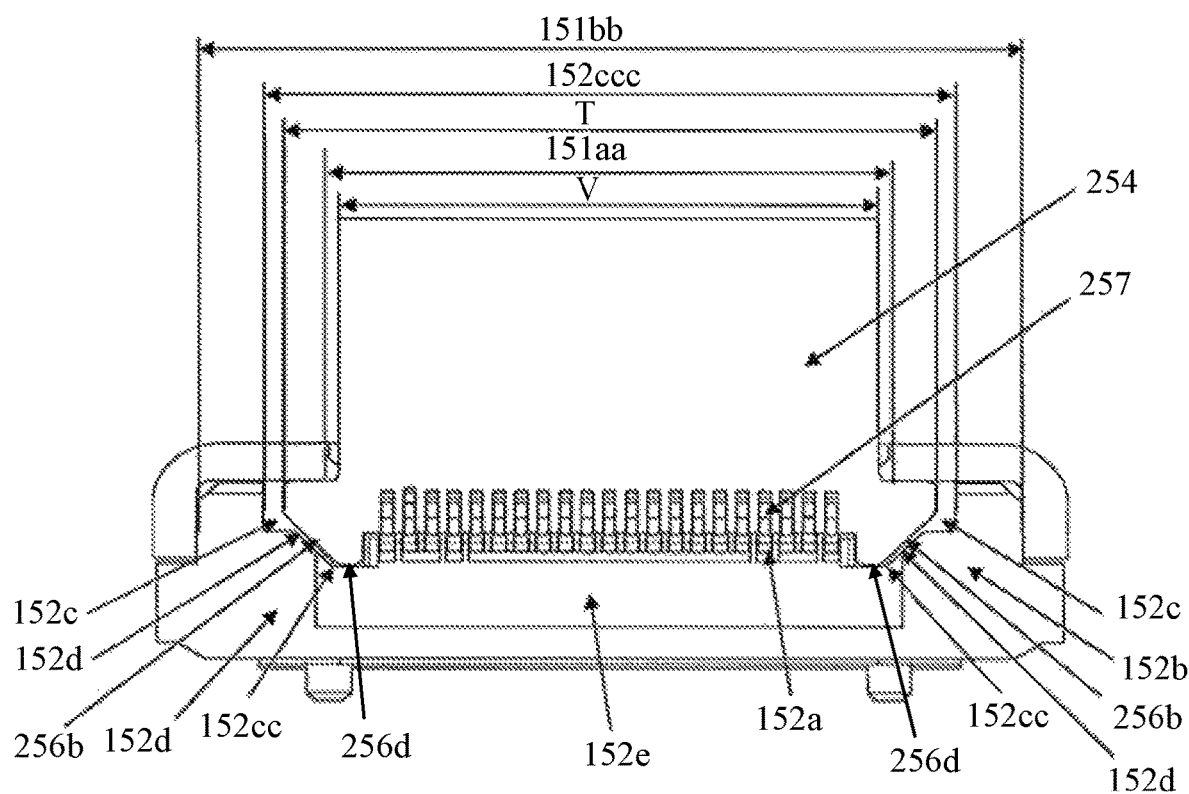
FIG. 26 is a front sectional view illustrating a state in which the camera connector is attached to the accessory shoe according to the first embodiment.

FIG. 26 illustrates a section of the accessory shoe 1123 viewed from the Z direction while the camera connector 1206 is attached to the accessory shoe 1123. This figure illustrates the sizes T and V of the camera connector 1206 and the positional relationship between each component of the camera connector 1206 and each component of the accessory shoe 1123.

In FIG. 26, as described above, the top surface of the shoe engagement portion 251a of the camera connector 1206 contacts the bottom (ceiling surface) of the engagement member 151 of the accessory shoe 1123 for positioning in the Y direction.

On the other hand, none of the lower tip portion 256d and the slope portion 256b of the protrusion portion 256a of the connection plug 256 in the camera connector 1206 contact the bottom surface and the slope portion 152d of the groove portion 152c of the accessory shoe 1123, respectively. A gap between the lower tip portion 256d of the protrusion portion 256a and the bottom surface of the groove portion 152c of the accessory shoe 1123 is set as small as possible. Thereby, when an external force in the X direction is applied to the external flash unit 120, the lower tip portion 256d of the protrusion portion 256a can come into contact with the bottom surface of the groove portion 152c of the accessory shoe 1123, and a floating amount of the connection plug 256 (a tilt to the accessory shoe 1123) can be reduced.

Each of a gap between the slope portions 256b and 152d and a gap between the inner end surface 152ccc of the groove portion 152c and the outer end surface of the connection plug 256 is set to be large to some extent. Thereby, when an external force in the X direction is applied to the external flash unit 120, the connection terminals 257 and 152a can be prevented from getting loaded.

In the groove portion 152c of the accessory shoe 1123, a relationship between a height of the groove portion 152c in the Y direction (a height from the bottom surface of the groove portion 152c to a ceiling surface of the engagement member 151) and a height of the slope portion 152d in the Y direction is similar to a relationship between the height B of the connection plug 256 and the height A of the slope portion 256b in the camera connector 1206. It is also preferable that the tilt angle of the slope portion 256b to the X direction is also set in the range of 45°±20°, similarly to the tilt angle θ of the slope portion 256b in the camera connector 1206.

Each embodiment described above has described a surface shape of the slope portion 256b provided on the protrusion portion 256a being flat, but the slope portion 256b may be a curved surface having a curvature. That is, the slope portion 256b may have a surface with a tilt to the X direction.

This embodiment can secure an area for providing a larger number of connection terminals than ever and a shape for protecting them and an area for positioning between components, in the compact camera connector 1206 and accessory shoe 1123.

Figure 22A:
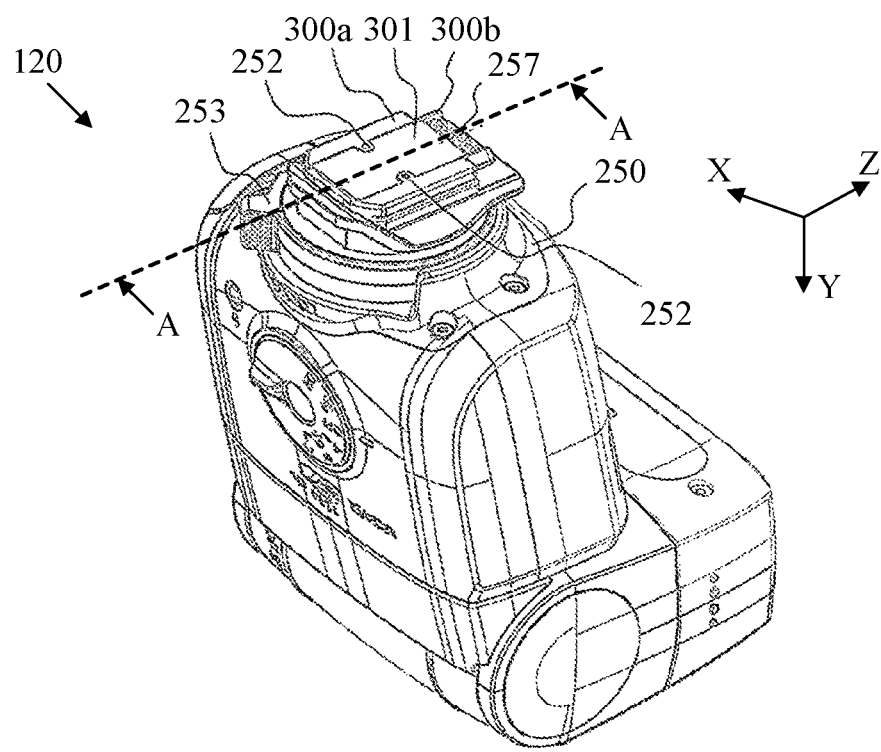
FIGS. 22A and 22B are a perspective view and a sectional view of the external flash unit according to a variation.
Figure 22B:
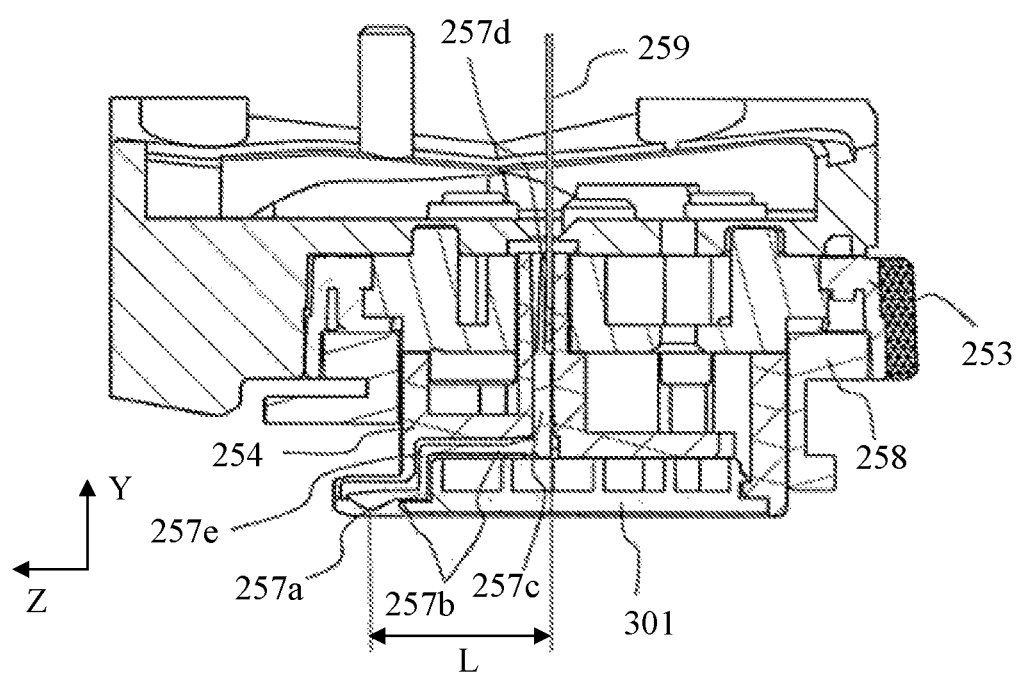
Figure 23A:
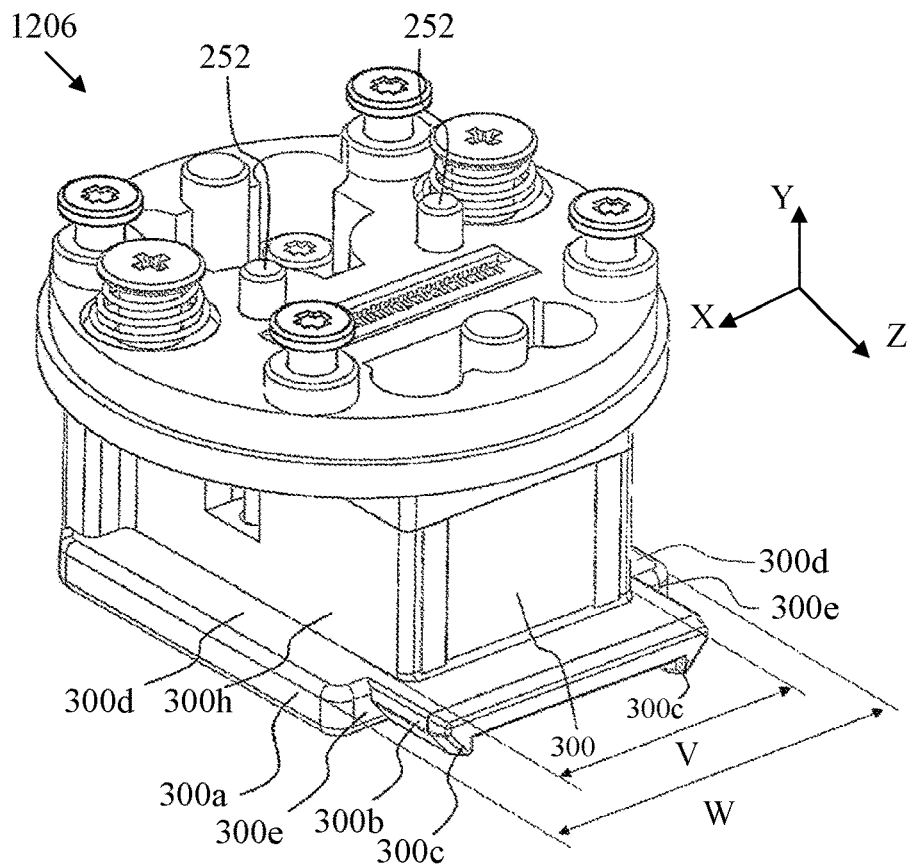
FIGS. 23A and 23B are a perspective view and a front view illustrating the internal structure of the connector according to the variation.
Figure 23B:
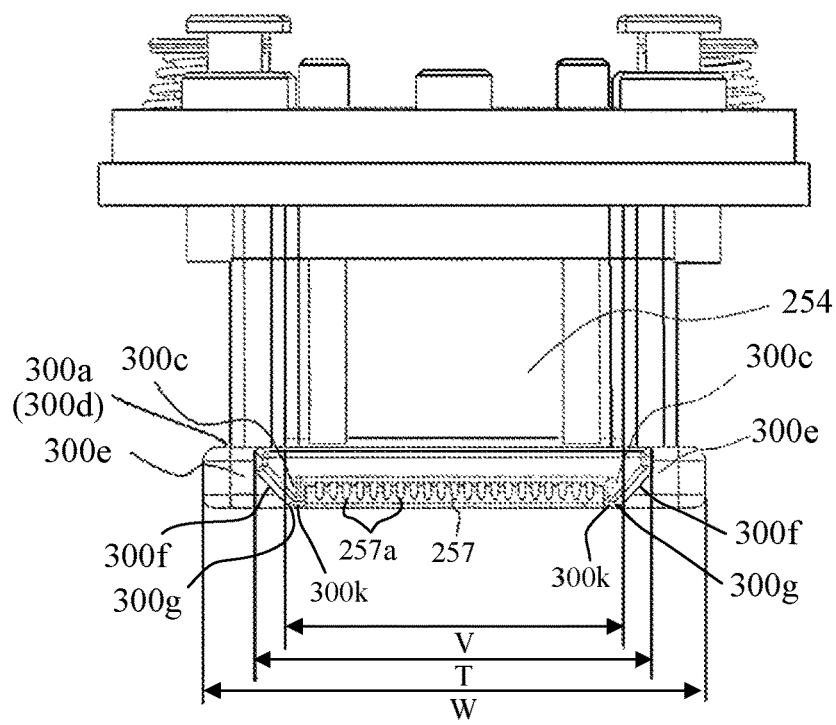

A description will now be given of a variation of an external flash unit 120. FIG. 22A illustrates the external flash unit 120 viewed from the camera connector 1206 side (lower side in the Y direction). FIG. 22B illustrates a section taken along a line A-A in FIG. 22A and illustrates the internal structure of the camera connector 1206. FIG. 23A illustrates the camera connector 1206. However, the base portion 250 and the lock lever 253 are omitted. FIG. 23B illustrates the camera connector 1206 viewed from the front in the Z direction.

The camera connector 1206 is provided on the lower side in the Y direction (upper side in FIG. 22A) of the base portion 250 of the external flash unit 120 as illustrated in FIG. 22B while it is attached to the accessory shoe 1123 of the camera 100. The camera connector 1206 has a shoe attachment leg 300a, lock pins 252, the lock lever 253, the holding member 254, a connection plug 300b, a Y-direction holding member 258, and a shoe cover 301.

The shoe attachment leg 300a is an engagement member for engaging the external flash unit 120 with the accessory shoe 1123 of the camera 100, similar to the shoe attachment leg 251 of the above-described embodiment. That is, the shoe attachment leg 300a is an engagement member on the external flash unit 120 side attachable to and detachable from the engagement member 151 of the accessory shoe 1123.

In the above-described embodiment, the shoe attachment leg 251 as a metal shoe plate and the resin holding member 254 are formed as separate members in order to give priority to the mechanical strength. On the other hand, in this variation, the shoe attachment leg 300a and the holding member 254 are formed as an integrated member by a resin material (nonconductive material). Thereby, the pair of first screws 260a and the pair of second screws 260b described in the previous embodiment are not required, a space for arranging the connection terminals 257 becomes wider, and thus a larger number of connection terminals 257 can be arranged. As a result, the external flash unit 120 can communicate more information with the camera 100 via the camera connector 1206 and the accessory shoe 1123.

The connection plug 300b is provided on the front side in the Z direction of the camera connector 1206, and formed as an integrated member with the holding member 254 made of a nonconductive resin material in this embodiment. Similar to the above-described embodiment, the outermost width T of the connection plug 300b in the X direction is made narrower than the width W of the shoe attachment leg 300a in the X direction, so that the area for providing the contact portion 300e is secured in the shoe attachment leg 300a. The connection plug 300b has a plurality of connection terminals 257 for contacting and communicating with the plurality of connection terminals 152a of the accessory shoe 1123 illustrated in FIG. 18C.

The shoe cover 301 is an enclosure attached to the holding member 254, and is a member that protects a plurality of connection terminals 257. The shape of the connection terminal 257 is similar to that of the above embodiment, and the step portion 257e is provided to secure a sufficient distance L in the Z direction of the extension portion 257b without interfering with the shoe cover 301.

The shape of the connection plug 300b is also similar to that of the connection plug 256 of the previous embodiment, and a pair of protrusion portions 300c that project downward in the Y direction are provided so as to sandwich the plurality of connection terminals 257 at both ends of the connection plug 300b in the X direction. As illustrated in FIG. 23B, a lower tip portion 300k of each protrusion portion 300c projects below a line made by connecting the lower ends of the tip portions 257a of the connection terminals 257 in order to protect the connection terminal 257 from the external force such as the pressure and the impact. That is, the tip portion 257a of the connection terminal 257 is provided above (inside) a line made by connecting the lower tip portions 300k of the pair of protrusion portions 300c.

Even in this embodiment, provided on the outer side of each protrusion portion 300c in the X direction is a slope portion 300f that extends diagonally upward from the lower tip portion 300k and faces diagonally downward. Each protrusion portion 300c having such a shape enables the connection plug 300b to be inserted into the groove portion 152c having the slope portion 152d in the connection terminal connector 152 described in the previous embodiment. As described in the previous embodiment, the slope portion 300f has a role of releasing the external force such as the pressure and the impact on the connection plug 300b to prevent the connection plug from getting damaged.

Similar to the previous embodiment, it is desirable to make as short as possible a distance in the X direction between the slope start positions 300g at the lower tip portion 300k of the slope portions 300f on both sides. Therefore, the slope start positions 300g on both sides are provided inside the width V of the holding member 254 in the X direction to sufficiently secure the area of the contact portion 300e of the shoe attachment leg 300a.

The holding member 254 is formed so that it can be inserted into and engaged with the engagement portion interval 151aa of the engagement member 151 illustrated in FIG. 18A, and has a coupler 300h having a width V shorter than the width W of the shoe attachment leg 300a in the X direction. The width W and the width V are defined by the JIS B7101-1975 "camera accessory attachment seat and attachment foot" as in the previous embodiment. When the coupler 300h is engaged with the engagement member 151, the position of the external flash unit 120 relative to the camera 100 is determined in the X direction. The shoe attachment leg 300a is urged upward in the Y direction when it contacts the elastically deformable portion 154a of the accessory shoe spring 154 illustrated in FIGS. 17A and 17B, and thereby the top surface of the shoe engagement portion 300d contacts the bottom surface (ceiling surface) of the engagement member 151. Thereby, the position of the external flash unit 120 relative to the camera 100 is determined in the Y direction.

When the contact portion 300e of the shoe attachment leg 300a contacts the contact surface 152b on the front side in the Z direction of the connection terminal connector 152, the position of the external flash unit 120 relative to the camera 100 is determined in the Z direction. The holding member 254 is also a structure for coupling the shoe attachment legs 300a and the base portion 250, and the lock pin 252 and the connection terminal 257 are arranged inside the coupler 300h.

In this embodiment, the case where the camera 100, the accessory 200, and the intermediate accessory 300 have 21 or 15 contacts has been described, but the number of contacts may be other numbers.

In this embodiment, the microphone device and the strobe device have been described as the accessory 200, but the accessory according to the present invention includes various devices, such as the electronic viewfinder unit, other than the microphone device and the strobe device. This embodiment has described the camera as an electronic apparatus, but the electronic apparatus according to the present invention also includes various electronic apparatuses other than the camera.

Next follows another embodiment of the external flash unit 120.

Figure 27A:
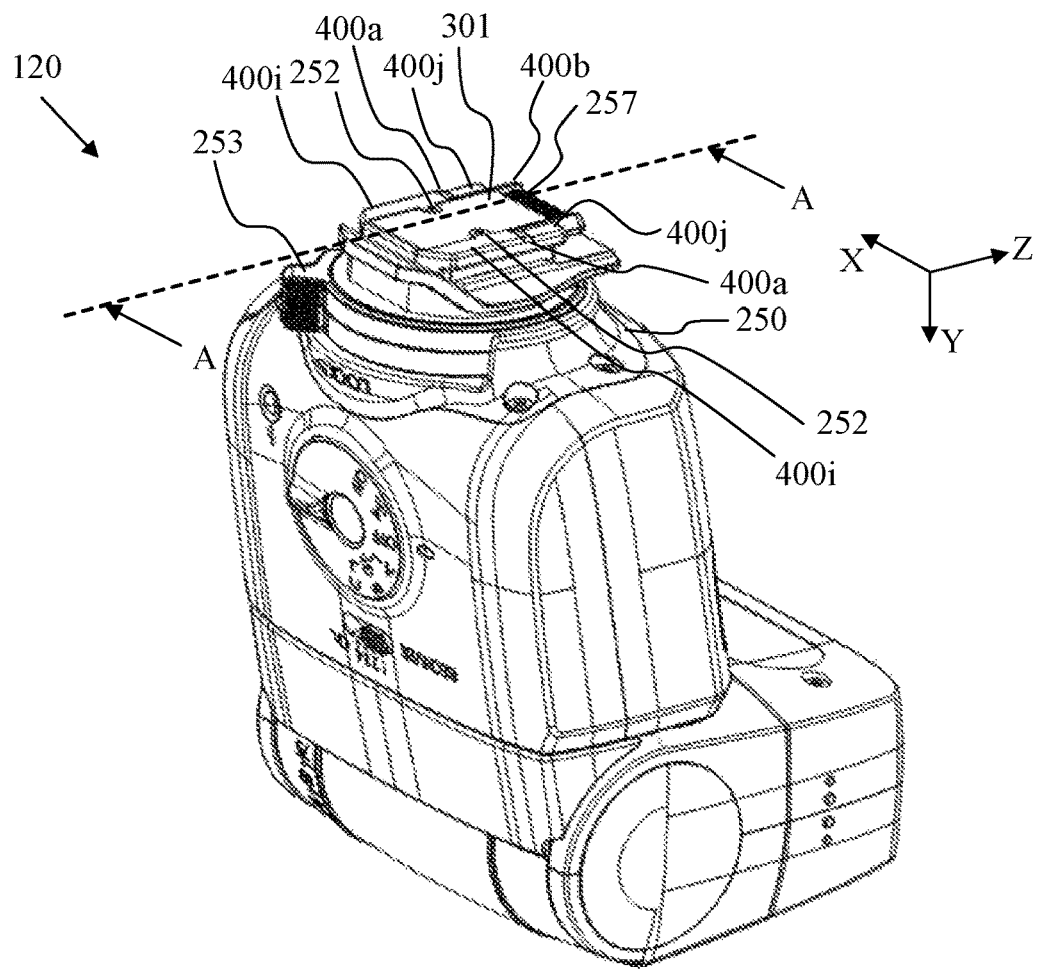
FIGS. 27A and 27B are a perspective view and a sectional view of the external flash unit according to the first embodiment.
Figure 27B:
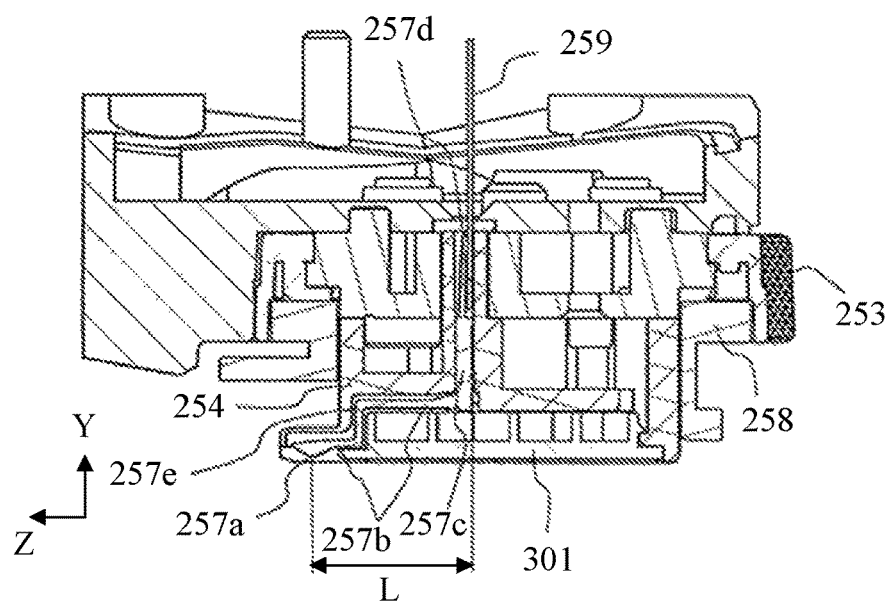
Figure 28A:
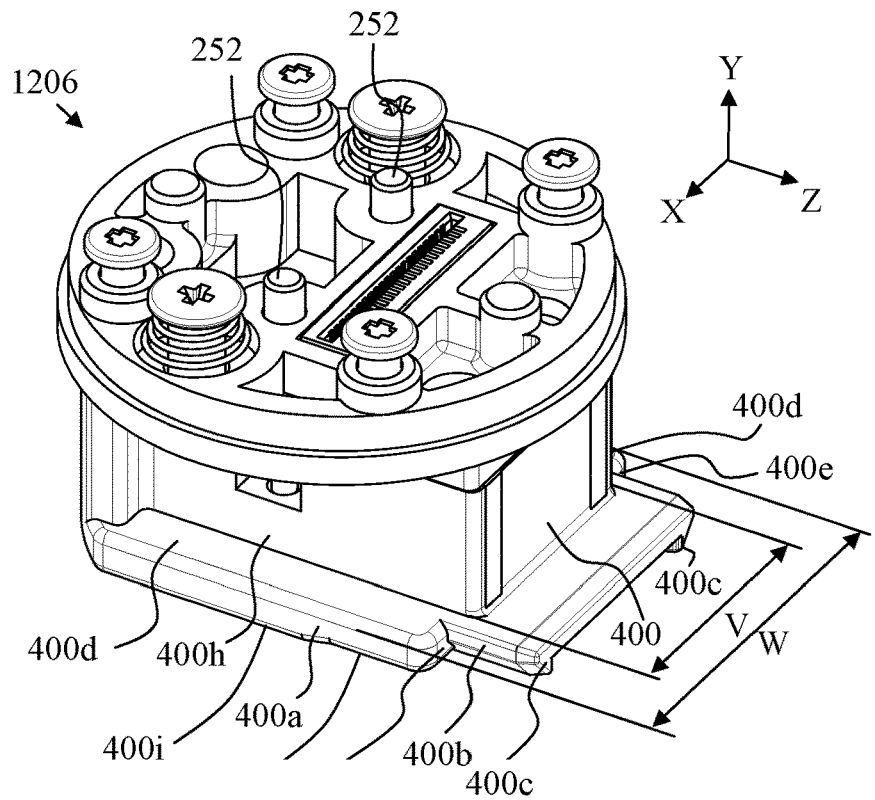
FIGS. 28A and 28B are a perspective view and a front view illustrating the internal structure of the camera connector according to the first embodiment.
Figure 28B:
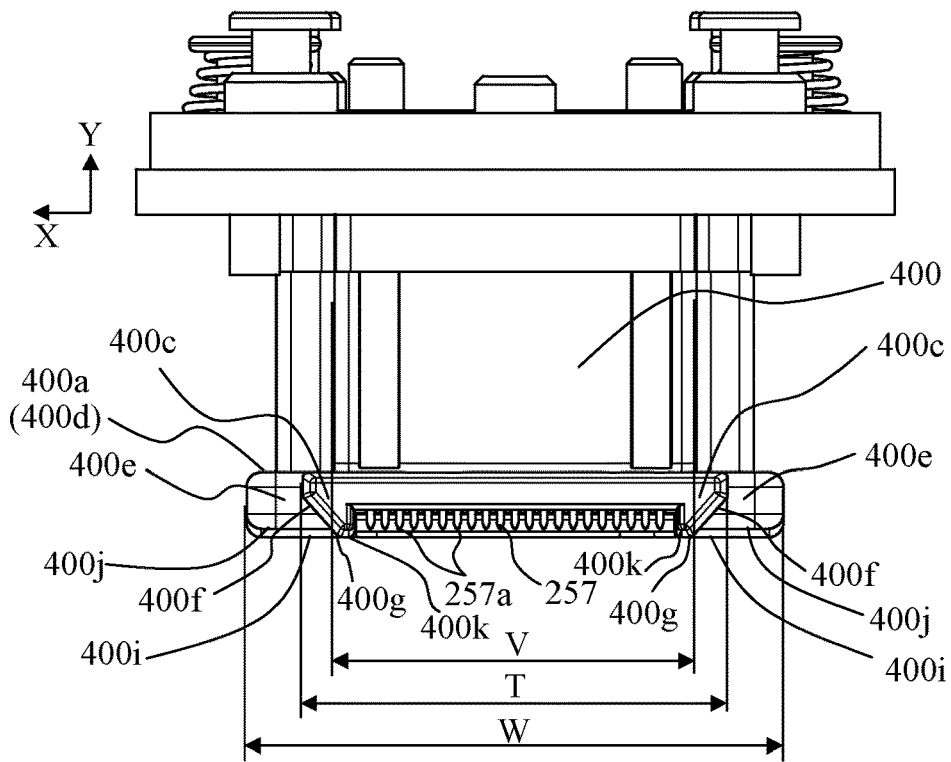

FIG. 27A illustrates the external flash unit 120 viewed from the camera connector 1206 side (lower side in the Y direction). FIG. 27B illustrates a section taken along a line A-A in FIG. 27A, which shows the internal structure of the camera connector 1206. FIG. 28A illustrates the camera connector 1206, but omits the base portion 250 and the lock lever 253. FIG. 28B illustrates the camera connector 1206 viewed from the front in the Z direction.

Figure 29A:
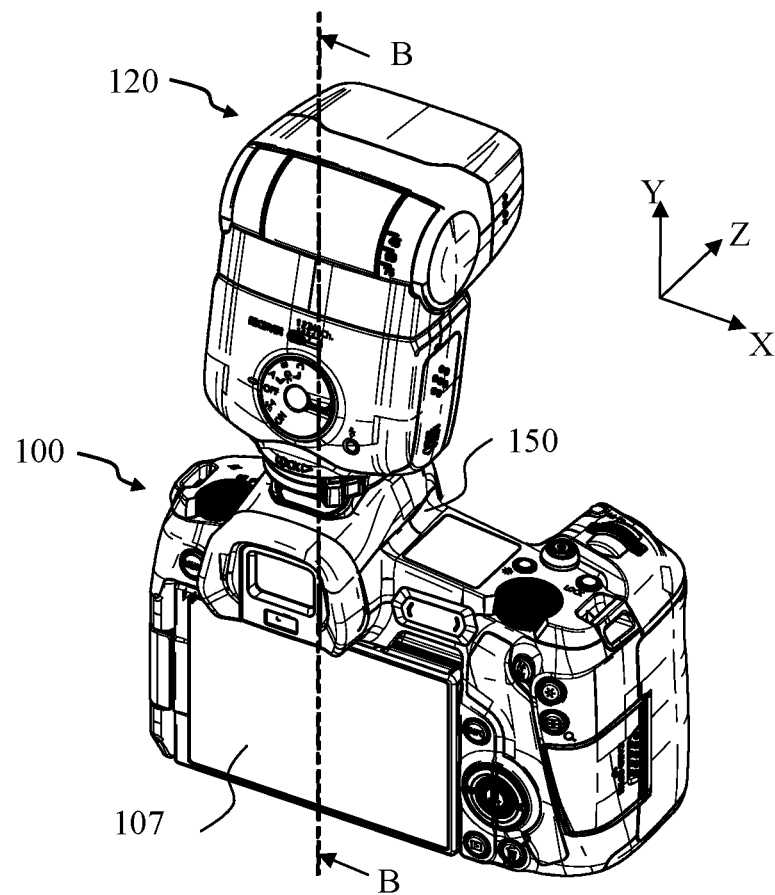
FIGS. 29A to 29C are perspective and sectional views of the digital camera and the external flash unit according to the first embodiment.
Figure 29B:
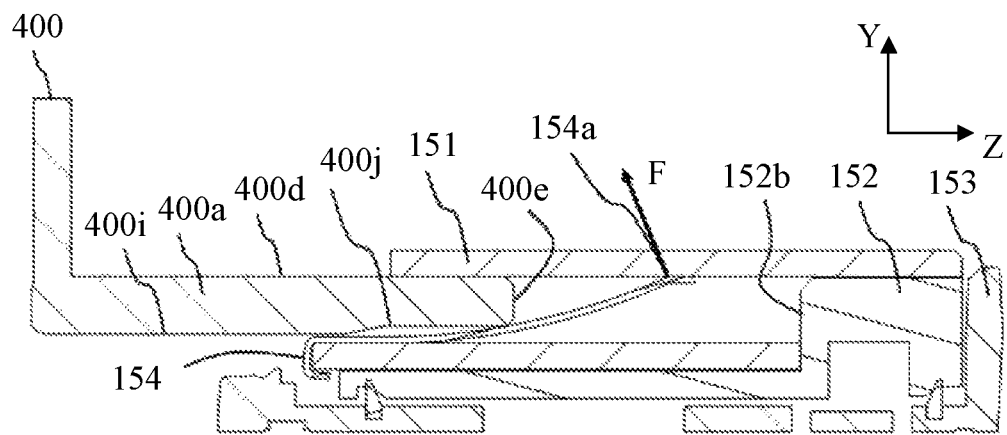
Figure 29C:
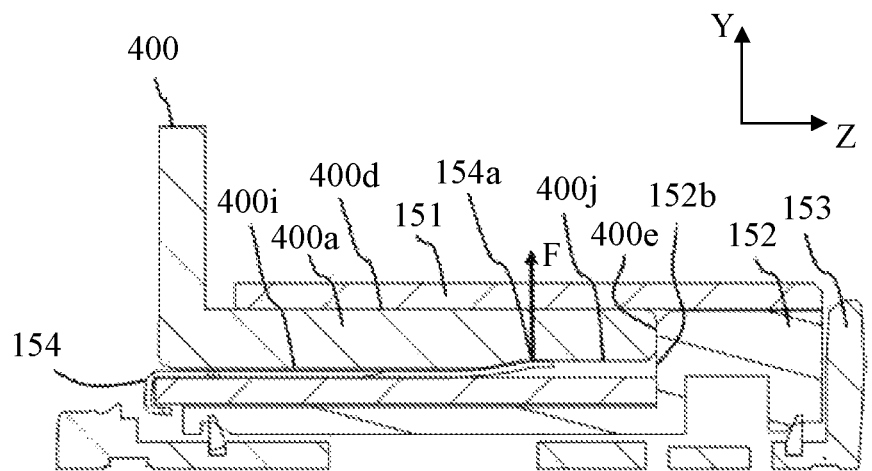

FIG. 29A illustrates the camera 100 to the external flash unit 120 is attached when the camera 100 is viewed from the diagonally rear side. FIG. 29B illustrates a section taken along a line B-B in FIG. 29A, in which the camera connector 1206 (shoe attachment leg 400a) of the external flash unit 120 is being inserted into the accessory shoe 1123 (engagement member 151) of the camera 100. FIG. 29C illustrates the same section as that of FIG. 29B, and illustrates the shoe attachment leg 400a held by the accessory shoe 1123 after the insertion of the shoe attachment leg 400a into the accessory shoe 1123 is completed.

The shoe attachment leg 400a is an engagement member for engaging the external flash unit 120 with the accessory shoe 1123 of the camera 100. That is, the shoe attachment leg 400a is an engagement member for the external flash unit 120 that is attachable to and detachable from the engagement member 151 of the accessory shoe 1123.

The shoe attachment leg 400a and a holding member 400 are formed as an integrated member by a resin material (non-conductive material). This configuration eliminates the need for the pair of first screws 260a and the pair of second screws 260b, and increases the space for arranging the connection terminals 257, so that a large number of connection terminals 257 can be arranged. As a result, the external flash unit 120 can communicate more information with the camera 100 via the camera connector 1206 and the accessory shoe 1123.

A connection plug 400b is provided on the front side in the Z direction of the camera connector 1206, and is formed as a member integrated with the holding member 400 made of a non-conductive resin material. Making the outermost width T of the connection plug 400b in the X direction narrower than the width W of the shoe attachment leg 400a in the X direction can secure an area for providing a contact portion 400e in the shoe attachment leg 400a. The connection plug 400b has a plurality of connection terminals 257 that are to contact and communicate with the plurality of connection terminals 152a of the accessory shoe 1123 illustrated in FIGS. 17A and 17B. The shoe cover 301 is an enclosure to be attached to the holding member 400 and serves as a member that protects the plurality of connection terminals 257. Each connection terminal 257 has the same shape as that of the other embodiment, and the step portion 257e is provided to secure a sufficient distance L in the Z direction of the extension portion 257b without interfering with the shoe cover 301.

The connection plug 400b also has the same shape as that of the connection plug 256 of other embodiments, and a pair of protrusion portions 400c protruding downward in the Y direction so as to sandwich a plurality of connection terminals 257 at both ends of the connection plug 400b in the X direction. As illustrated in FIG. 28B, a lower tip portion 400k of each protrusion portion 400c protrudes to a position below a line connecting the lower ends of tip portions 257a of the connection terminals 257 in order to protect the connection terminal 257 from external forces such as pressure and impact. That is, the tip portions 257a of the connection terminals 257 are provided above (inside) the line connecting the lower tip portions 400k of the pair of protrusion portions 400c.

Even in this embodiment, slope portions 400f extending diagonally upward from the lower tip portions 400k and facing diagonally downward side are provided on the outer side of each protrusion portion 400c in the X direction. Since each protrusion portion 400c has such a shape, the connection plug 400b can be inserted into the groove portion 152c having the slope portion 152d in the connection terminal connector 152 described in the first embodiment. As described in other embodiments, the slope portion 400f has a role of releasing external forces such as pressure and impact from the connection plug 400b and of preventing the connection plug 400b from getting damaged.

A distance in the X direction between slope starting positions 400g at the lower tip portions 400k of the slope portions 400f on both sides may be set as short as possible. Thus, the slope starting positions 400g on both sides are provided inside a width V of the holding member 254 in the X direction to sufficiently secure the area for the contact portion 400e of the shoe attachment legs 400a.

The holding member 400 has a connector 400h insertable into the engagement portion interval 151aa of the engagement member 151 illustrated in FIG. 18A, engageable with the engagement member 151, and having the width V shorter than the width W in the X direction of the shoe attachment leg 400a. The dimensions of the width W and the width V are specified in JIS B7101-1975 "Camera accessories mounting seat and mounting foot." When the connector 400h is engaged with the engagement member 151, the external flash unit 120 with respect to the camera 100 is positioned in the X direction.

The holding member 400 also has a structure for connecting the shoe attachment leg 400a and the base portion 250 to each other, and the lock pin 252 and the connection terminal 257 are arranged inside the connector 400h.

As illustrated in FIGS. 29A to 29C, the shoe attachment leg 400a has a contact range (first range) 400j that contacts the elastically deformable portion 154a of the accessory shoe spring 154 illustrated in FIGS. 17A and 17B. When the contact range 400j contacts the elastically deformable portion 154a of the accessory shoe spring 154, the shoe attachment leg 400a is biased upward in the Y direction and a top surface of the shoe engagement portion 400d contacts a bottom surface of the engagement member 151. An arrow F in FIGS. 29B and 29C represents a biasing force by the accessory shoe spring 154. Thereby, the external flash unit 120 is positioned relative to the camera 100 in the Y direction. The contact range 400j corresponds to a biasing range biased by the elastically deformable portion 154a of the accessory shoe spring 154 while the external flash unit 120 is being attached to the accessory shoe 1123 and when the attachment of the external flash unit 120 to the accessory shoe 1123 is completed. The contact range 400*j* is disposed on both sides of the plurality of connection terminals 152*a* on the front side (front side of the camera 100) in the Z direction as the attachment direction.

The shoe attachment leg 400*a* has a non-contact range (second range) 400*i* that does not contact the elastically deformable portion 154*a* of the accessory shoe spring 154. This non-contact range 400*i* corresponds to a non-biased range that is not biased by the elastically deformable portion 154*a* of the accessory shoe spring 154 while the external flash unit 120 is being attached to the accessory shoe 1123 and when the attachment of the external flash unit 120 to the accessory shoe 1123 is completed. In FIG. 16C, since there is a gap between the accessory shoe spring 154 and the non-contact range 400*i*, the biasing force of the accessory shoe spring 154 against the non-contact range 400*i* is 0.

In this embodiment, the thickness of the non-contact range 400*i* in the Y direction is set to be larger than the thickness of the contact range 400*j* in the same direction. The thickness of the contact range 400*j* is set to be the same as that of the first and second embodiments. The thickness of the non-contact range 400*i* in the Y direction is set to be larger than that of the contact range 400*j* for the following reasons.

A resin shoe according to this embodiment is inferior in strength to a metal shoe where they have the same shape. Thus, the strength can be ensured by increasing the thickness of the shoe attachment leg 400*a* in the non-contact range 400*i* in the Y direction. Since the strength calculated by the moment of inertia of area increases in proportion to the square of the thickness, it is possible to efficiently increase the strength by increasing the thickness in the Y direction. By making the length of the non-contact range 400*i* in the Z direction longer than the length of the contact range 400*j* in the Z direction, more strength can be secured.

By making the thickness of the contact range 400*j* equal to that of the other embodiments, the shoe attachment legs 400*a* can become versatile according to the JIS, and the elastically deformable portion 154*a* of the accessory shoe spring 154 can be prevented from plastically deforming beyond a yield point. When the external flash unit 120 is attached to the accessory shoe 1123, the thickness of the contact range 400*j* in the Y direction is made equal to that of the other embodiments in order to make the attachment load equal to that of the other embodiments.

Since the non-contact range 400*i* is provided on the attachment side of the contact range 400*j* in the Z direction, the elastically deformable portion 154*a* can be prevented from elastically deforming beyond a yield point even while the external flash unit 120 is being attached to the accessory shoe 1123.

In this embodiment, the non-contact range 400*i* is a non-biased range that is not biased by the elastically deformable portion 154*a* of the accessory shoe spring 154 while the external flash unit 120 is being attached to the accessory shoe 1123 and when the attachment of the external flash unit 120 is completed. Alternatively, the non-contact range 400*i* may be biased by the accessory shoe spring 154 *i* while the external flash unit 120 is being attached to the accessory shoe 1123 and when the attachment of the external flash unit 120 is completed. In that case, in the state where the external flash unit 120 is held by the accessory shoe 1123, the range in which the biasing force of the accessory shoe spring 154 is smaller than the contact range 400*j* may be set to a range corresponding to the non-contact range 400*i*. That is, the second range of the shoe attachment leg 400*a* may be thicker than the first range and may have a biasing force (including 0) applied by the accessory shoe spring 154, which is smaller than that of the first range.

When the contact portion 400*e* of the shoe attachment leg 400*a* comes into contact with the contact surface 152*b* on the front side in the Z direction of the connection terminal connector 152, the external flash unit 120 is positioned in the Z direction relative to the camera 100.

Figure 30:
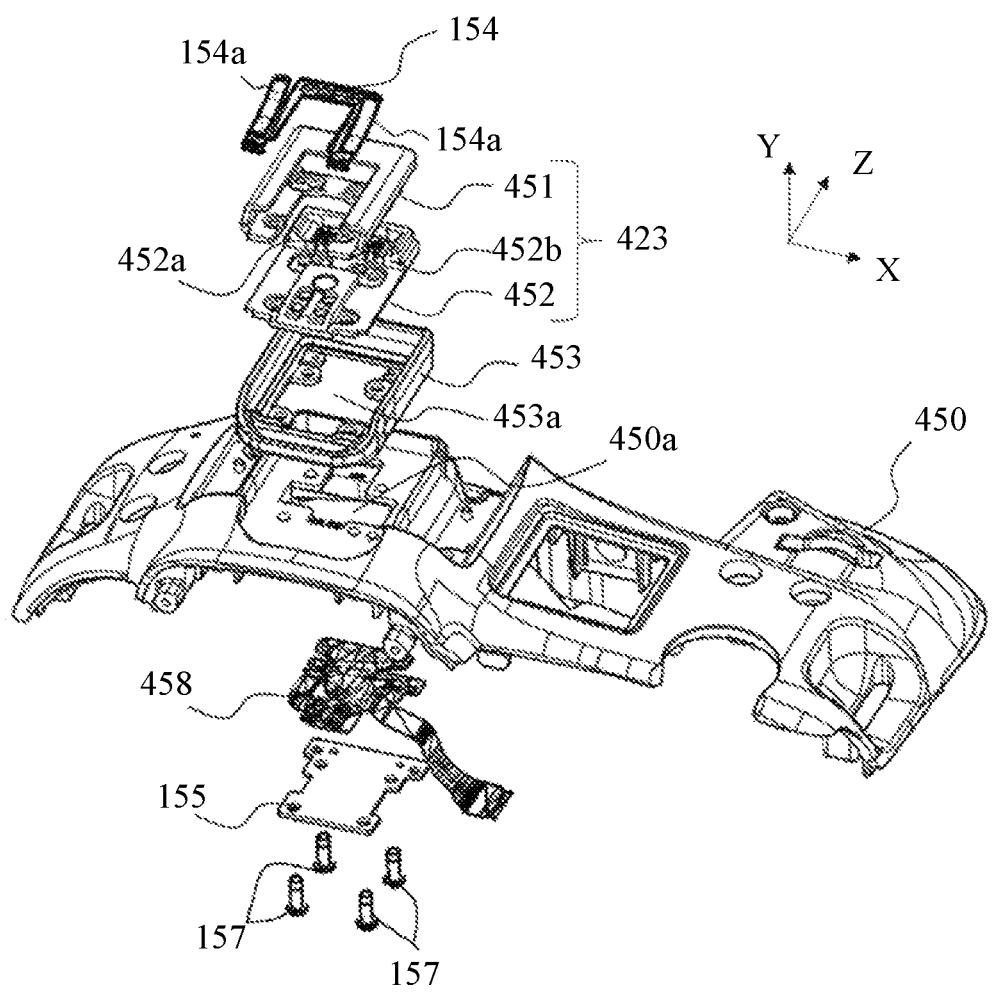
FIG. 30 illustrates a top cover accessory shoe according to the first embodiment.

Next follows another embodiment of an accessory shoe 423. FIG. 30 illustrates a top cover 450 separated from the camera 100, and the disassembled accessory shoe 423.

The accessory shoe 423 includes an engagement member 451, a connection terminal connector 452, a shoe stage 453, and the accessory shoe spring 154. The engagement member 451 is a member that is to be engaged with the external flash unit 120 and thereby hold the external flash unit 120. The connection terminal connector 452 includes a plurality of connection terminals 452*a*. The shoe stage 453 is a housing member that encloses the engagement member 451 and the connection terminal connector 452. The accessory shoe holding member 155 is a structural skeleton that holds the engagement member 451.

The accessory shoe holding member 155, flexible printed circuits (FPC, flexible substrate) 458, the top cover 450, the shoe stage 453, and the connection terminal connector 452 are fastened to the engagement member 451 by four screws 157 inserted into the holes formed in them. Thereby, these members are positioned and fixed to each other.

When the external flash unit 120 is attached to the accessory shoe 423, the connection terminals 452*a* are electrically connected to the external flash unit 120. Each of the plurality of connection terminals 452*a* is electrically connected to the FPC 458 disposed on the lower side in the Y direction of the top cover 450.

The FPC 458 is connected to an unillustrated main substrate of the camera 100. Hence, when the external flash unit 120 is attached to the accessory shoe 423, communication between the external flash unit 120 and the camera 100 becomes available. In order to connect the FPC 458 to the internal electronics of the camera 100, the shoe stage 453 has an opening 453*a*, and the top cover 450 has an opening 450*a*.

Figure 31A:
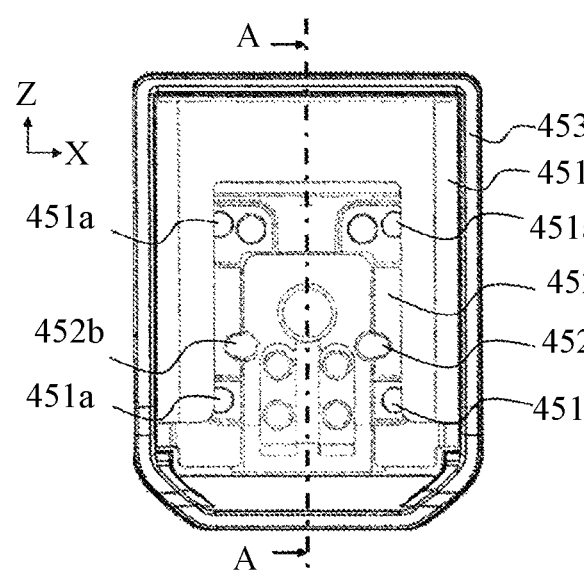
FIGS. 31A to 31C illustrate a drip-proof structure according to the first embodiment.
Figure 31B:
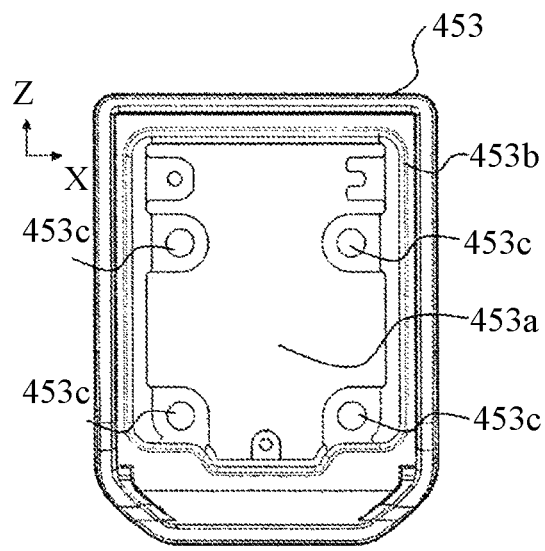
Figure 31C:
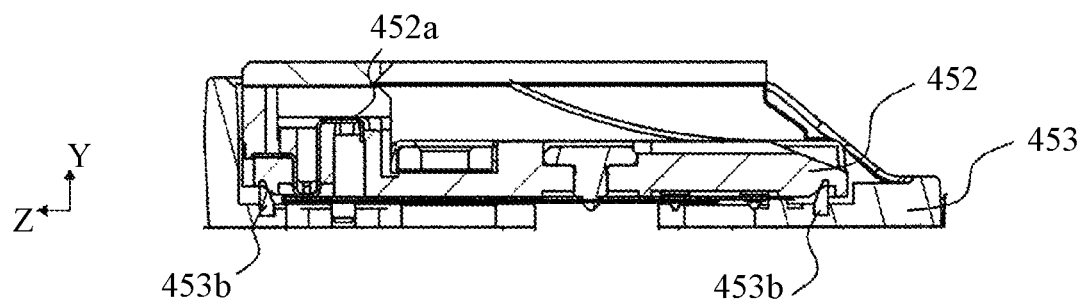

Referring now to FIGS. 31A to 31C, a description will be given of a drip-proof structure. FIG. 31A illustrates the accessory shoe 423 incorporated in the shoe stage 453 viewed from below (−Y direction). FIG. 31B illustrates only the shoe stage 453 viewed from the −Y direction. FIG. 31C illustrates a section taken along a line A-A in FIG. 31A.

Provided at the back of the connection terminal connector 452 in the Z direction (on the back side of the camera 100) are engagement hole portions 452*b* that are engageable with the lock pin 252 of the external flash unit 120 illustrated in FIG. 19A. The engagement member 451 has screw hole portions 451*a* to which the screws 157 are fastened. The shoe stage 453 is provided with through-hole portions 453*c* through which the screws 157 penetrate.

A rectangular frame-shaped drip-proof member 453*b* is provided around the opening 453*a* provided to the shoe stage 453. The drip-proof member 453*b* is an elastic member such as an elastomer, and is integrated with the shoe stage 453. In this embodiment, the drip-proof member 453*b* is integrated with the shoe stage 453 by two-color injection molding.

As illustrated in FIG. 31C, the drip-proof member 453*b* interferes with (contacts) the connection terminal connector 452 and is compressed so as to prevent water from entering the camera 100 through the opening 453a in the shoe stage 453 and the opening 450a in the top cover 450. The drip-proof member 453b may be made of an elastic member such as sponge or silicon as a member separate from the shoe stage 453.

The drip-proof member 453b is disposed in the projection plane (in the XZ projection plane) from the +Y direction of the connection terminal connector 452. The screw hole portions 451a and the through-hole portions 453c described above are arranged inside the drip-proof member 453b. This structure can also prevent water from entering through the screw hole portions 451a and the through-hole portions 453c.

Thus, the drip-proof member 453b provided around the opening 453a of the shoe stage 453 and the connection terminal connector 452 interfere with each other to prevent water from entering the inside of the camera 100.

This embodiment can secure an area for a larger number of connection terminals than ever and a shape for protecting them, and a positioning area between components in a small shoe apparatus and an accessory shoe apparatus.

Second Embodiment

Next follows a description of an accessory shoe of the camera 100 and a shoe apparatus of the external flash unit 120 according to a second embodiment of the present invention. In the case where the camera connector 1206 illustrated in FIGS. 20A to 20C is attached to the accessory shoe 1123 illustrated in FIGS. 17A and 17B, the following problems may occur.

Figure 32:
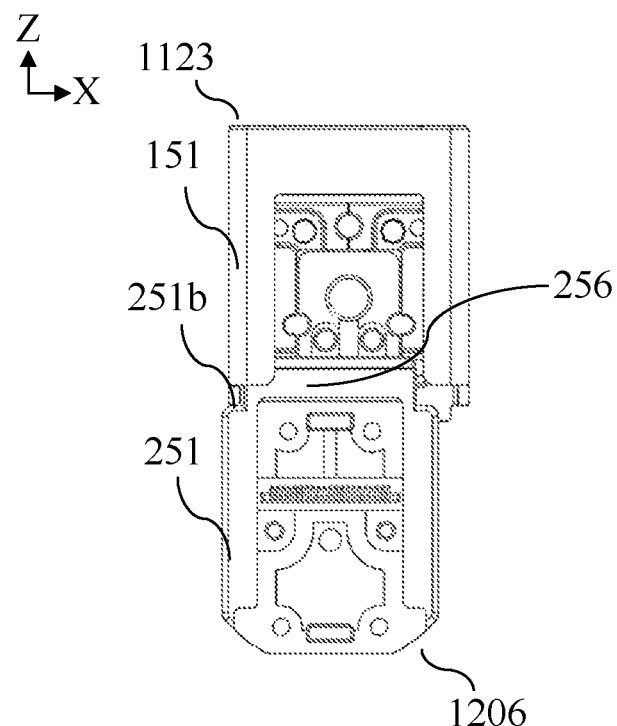
FIG. 32 is a front view illustrating a state in which a camera connector is attached to an accessory shoe according to a second embodiment.

FIG. 32 illustrates that the camera connector 1206 biased in the X direction is about to be attached to the accessory shoe 1123 when they are viewed from the +Y direction. In this state, the contact portion 251b of the shoe attachment leg 251 of the camera connector 1206 contacts the tip of the accessory shoe 1123, and the camera connector 1206 cannot be further inserted into the accessory shoe 1123 in the Z direction. In addition, the shoe attachment leg 251 is not engaged with the engagement member 151, but part of the connection plug 256 is engaged with the engagement member 151. In this state, when an external force is applied to the camera connector 1206 in a tilt direction (+Y direction corresponding to a counterclockwise direction about the X axis), the load tends to concentrate on part of the connection plug 256. Thus, if the external force in the tilt direction is applied to the camera connector 1206 in this state, the connection plug 256 partially engaged with the engagement member 151 may get damaged. Accordingly, this embodiment alleviates the above problems using the following shape.

Figure 33:
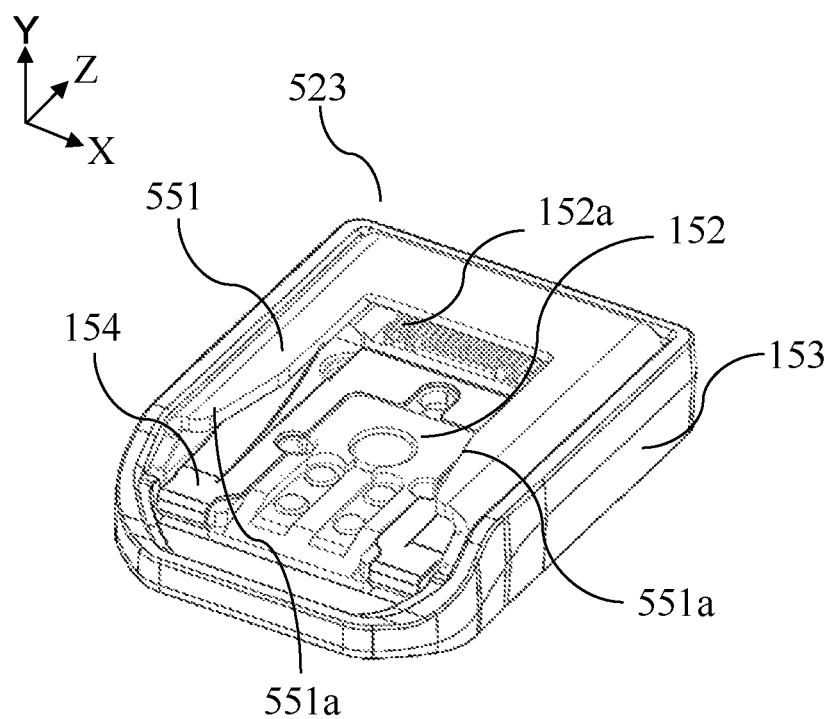
FIG. 33 illustrates a perspective view of the accessory shoe according to the second embodiment.

FIG. 33 illustrates an accessory shoe 523 of the camera 100 according to this embodiment. The accessory shoe 523 includes an engagement member 551, the connection terminal connector 152, the shoe stage 153, and the accessory shoe spring 154. The engagement member 551 is a member engageable with the external flash unit 120 and configured to hold the external flash unit 120, and has oblique (bevel) portions (second diagonal portions) 551a on both sides thereof in the X direction. Each oblique portion 551a is a portion that tilts outward in the X direction toward the tip in the −Z direction.

The connection terminal connector 152 includes a plurality of connection terminals 152a. The shoe stage 153 is a housing member that encloses the engagement member 551 and the connection terminal connector 152.

Figure 34A:
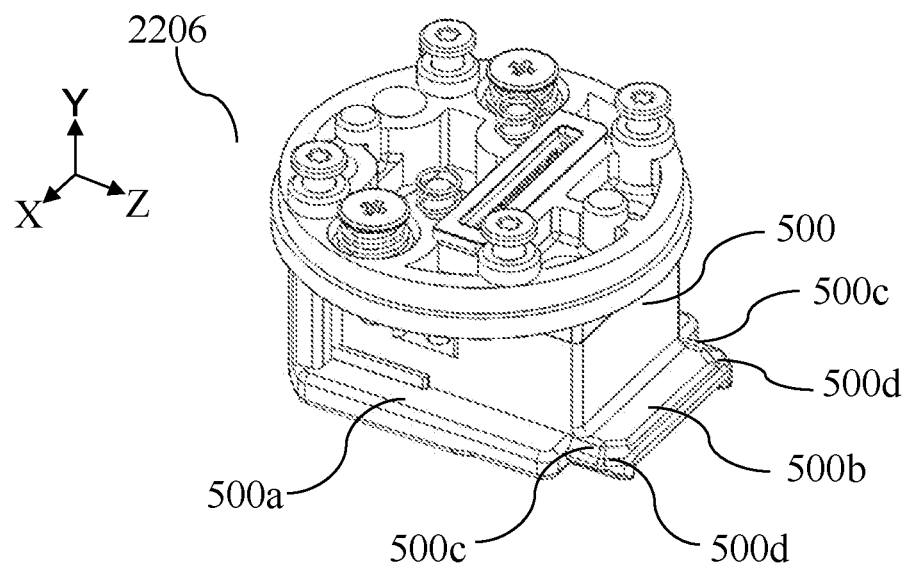
FIGS. 34A and 34B are a perspective view and a front view illustrating the internal structure of the camera connector according to the second embodiment.
Figure 34B:
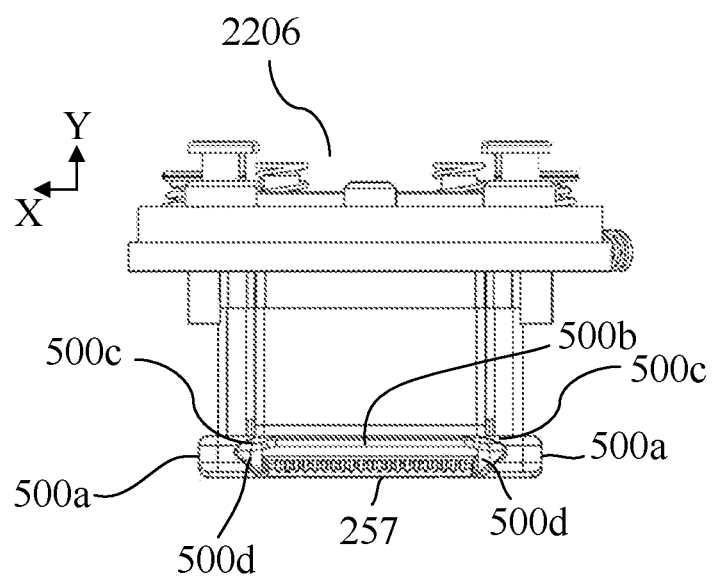

FIG. 34A illustrates a camera connector 2206 provided to the external flash unit 120 according to this embodiment, but omits the base portion 250 and the lock lever 253. FIG. 34B illustrates the camera connector 2206 viewed from the front side in the Z direction.

The holding member 500 of the camera connector 2206 includes a shoe attachment leg 500a as an engagement member (shoe engagement portion) engageable with an engagement member 551 of the accessory shoe 523, and a connection plug 500b that protrudes on the tip side in the Z direction of the shoe attachment leg 500a. The connection plug 500b corresponds to a terminal protecting unit that protects a plurality of connection terminals 257. The shoe attachment leg 500a engaged with the engagement member 551 is positioned in the Y direction when its top surface contacts a ceiling surface of the engagement member 551 in the +Y direction (third direction).

Side (chamfered) slopes 500c are provided on both sides in the X direction on the top surface of the root side of the connection plug 500b, and tip oblique (chamfered) portions 500d as first oblique portions are provided on both sides in the X direction on the tip side of the connection plug 500b. In this embodiment, each of the shoe attachment legs 500a and the connection plug 500b is made of a non-conductive resin material and is formed as one component. Alternatively, only the shoe attachment legs 500a may be made of a metal material.

Figure 35:
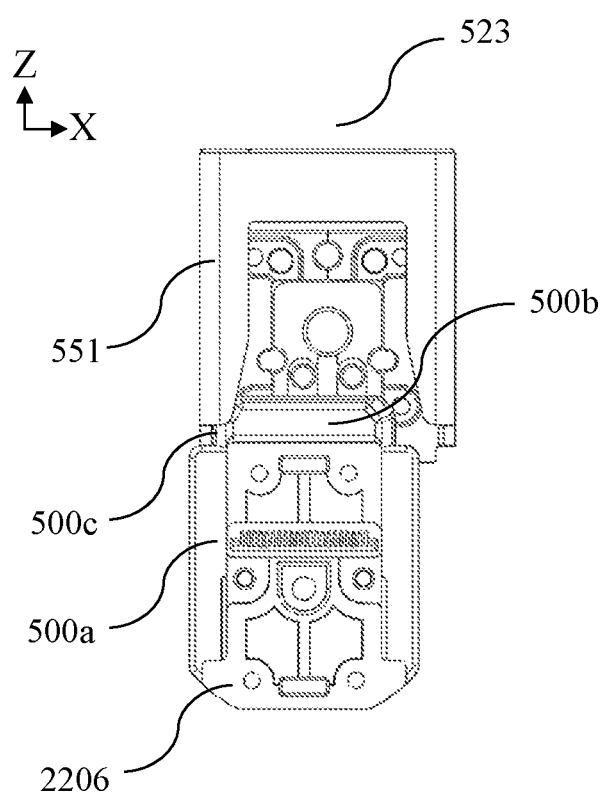
FIG. 35 is a front view illustrating a state in which the camera connector is attached to the accessory shoe according to the second embodiment.

FIG. 35 illustrates that the camera connector 2206 biased to one side (−X direction) in the X direction is about to be attached to the accessory shoe 523 when they are viewed from the +Y direction in this embodiment. In this state, the shoe attachment leg 500a of the camera connector 2206 contacts the engagement member 551 of the accessory shoe 523, and the camera connector 2206 cannot be further inserted into the accessory shoe 523 in the Z direction. In addition, the shoe attachment leg 500a is not engaged with the engagement member 551, but part of the connection plug 500b is engaged with the engagement member 551.

At this time, the side slopes 500c are provided at portions of the connection plug 500b that is engaged with the engagement member 551. Each side slope 500c is a slope that tilts so that the connection plug 500b descends in the −Y direction (direction opposite to the third direction) in an area from the inside to the outside in the X direction. Thus, when an external force is applied to the camera connector 2206 in the tilt direction, the side slopes 500c contact the engagement member 551 and slide, guiding the connection plug 500b to move to the other side (+X direction) in the X direction. This structure can prevent the connection plug 500b from getting damaged. The side slope 500c may be a flat slope having a flat surface or a curved slope having a curved surface. In this embodiment, a slope connected to the side slope 500c is also formed at the tip oblique portion 500d and the outermost tip portion of the connection plug 500b.

That is, the connection plug 500b has a slope that continuously tilts (inclines) from the tip portion in the X direction to the tip portion in the Z direction. The term "continuously tilts" herein means that the tilt parts are connected, and includes a slope having different tilt angles between a slope facing the X direction and a slope facing the Z direction, and a slope that is bent between the slope facing the X direction and the slope facing the Z direction.

Figure 36A:
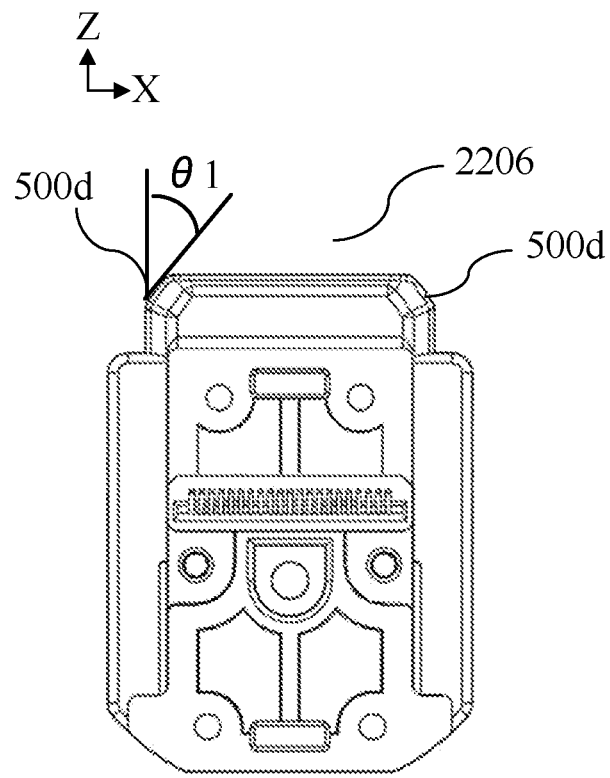
FIGS. 36A and 36B are top views of the accessory shoe and the camera connector according to the second embodiment.
Figure 36B:
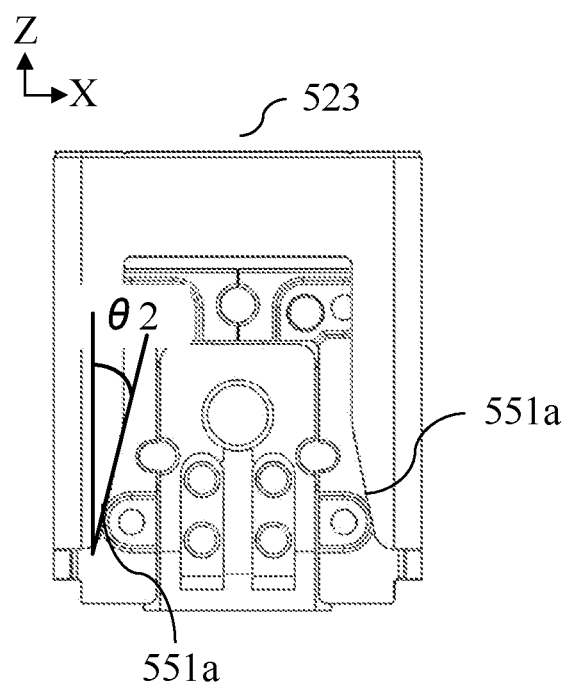
Figure 37:
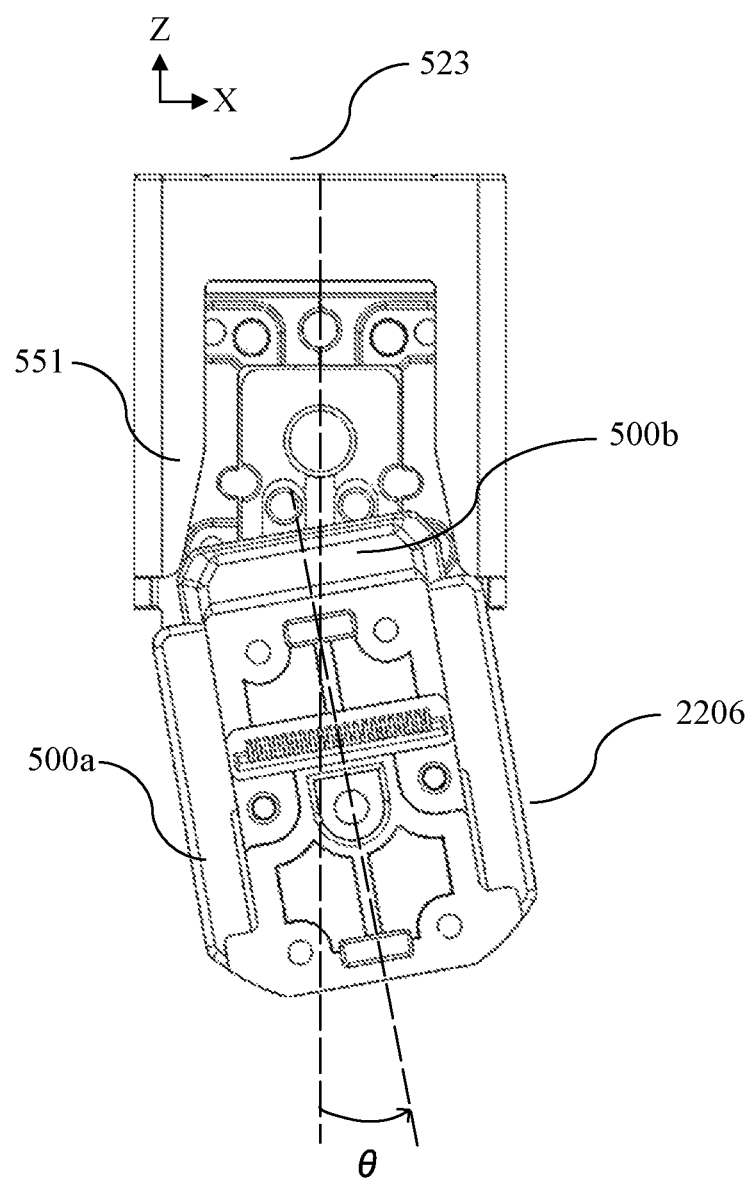
FIG. 37 is a front view illustrating a state in which the camera connector is attached to the accessory shoe according to the second embodiment.

FIGS. 36A, 36B, and 37 illustrate the tip oblique portion 500d of the connection plug 500b and an oblique portion 551a of the engagement member 551 when they are viewed from the +Y direction. As illustrated in FIG. 36A, the tip oblique portion 500d is tilted inward in the X direction by a first angle θ1 toward the tip in the +Z direction, which is the insertion direction (attachment direction) of the camera connector 2206 into the accessory shoe 523. On the other hand, as illustrated in FIG. 36B, the oblique portion 551*a* has a shape that is tilted outward in the X direction by a second angle θ2 toward the tip in the −Z direction.

This embodiment sets the first angle θ1 to the second angle θ2 or larger (θ1≥θ2). The first angle θ1 may be set to be larger than the second angle θ2 (θ1≥θ2).

FIG. 37 illustrates that the camera connector 2206 tilted by an angle θ around the Y-axis relative to the Z direction is about to be inserted into the accessory shoe 523. θ is an angle of θ2 or larger.

Due to the above relationship between θ1 and θ2, in such a state, the connection plug 500*b* alone does not contact the engagement member 551 in the +Y direction before the shoe attachment leg 500*a* is engaged with the engagement member 551 of the accessory shoe 523. Thereby, even if an external force is applied to the camera connector 2206 in the tilt direction in this state, the connection plug 500*b* can be prevented from getting damaged.

Thereafter, when the connection plug 500*b* and the shoe attachment leg 500*a* advance in the +Z direction towards the engagement member 551 while reducing the tilt angle θ from the Z direction, the shoe attachment leg 500*a* alone or the shoe attachment leg 500*a* and the connection plug 500*b* simultaneously can contact the engagement member 551 in the +Y direction.

Figure 38A:
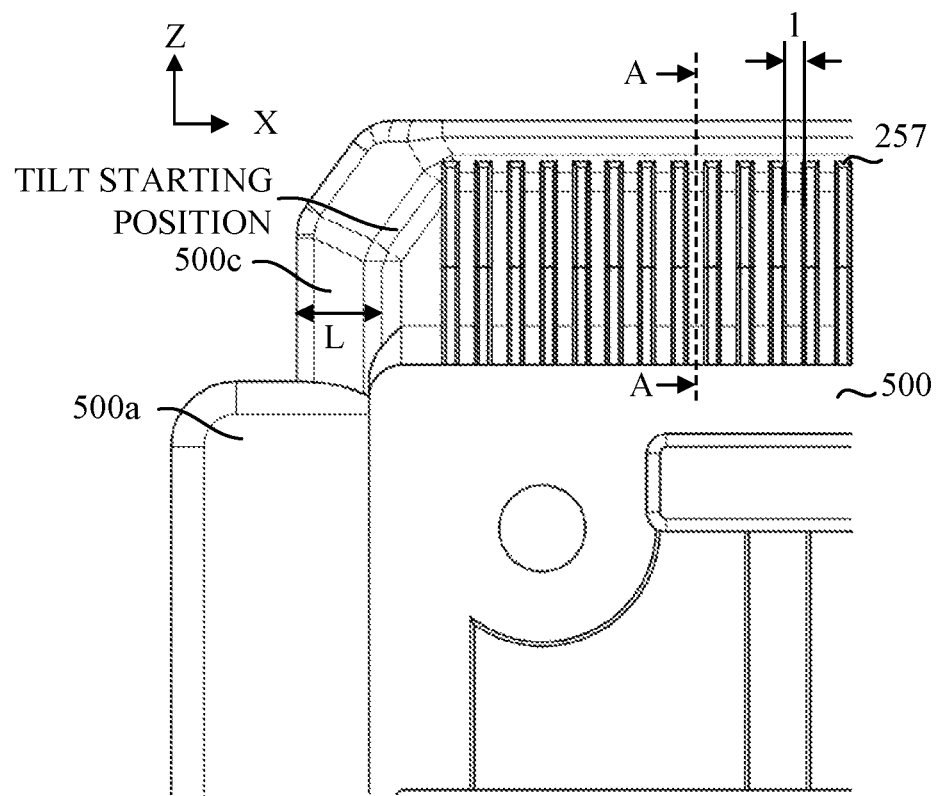
FIGS. 38A and 38B illustrate a positional relationship between a slope of the camera connector and connection terminals according to the second embodiment.
Figure 38B:
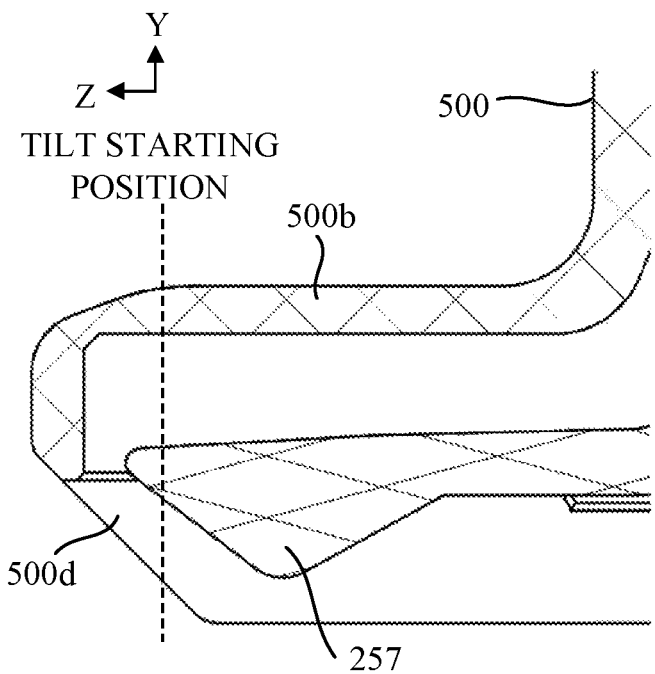

FIGS. 38A and 38B illustrate a positional relationship between the position (tilt starting position) as a starting point of the slope provided at the tip of the connection plug 500*b* and the plurality of connection terminals 257. FIG. 38A illustrates a camera connector 2206 viewed from the +Y direction so as to visualize the positions of the plurality of connection terminals 257 that overlap the connection plug 500*b* and cannot be seen. FIG. 38B illustrates a section taken along a line A-A in FIG. 38A. Each of the plurality of connection terminals 257 is partially exposed from the connection plug 256 on the lower side in the Y direction (−Y direction) and on the tip side in the Z direction (+Z direction).

As illustrated in FIG. 38A, a width of the side slope 500*c* in the X direction is wider than a width between adjacent connection terminals in the plurality of connection terminals 257. Where L is the width of the side slope 500*c* in the X direction and 1 is the width between adjacent connection terminals included in the plurality of connection terminals 257, a relationship of L>31 is established, for example. As illustrated in FIG. 38A, in the X direction, a position (tilt starting position) of a starting point of the side slope 500*c* is farther from the center of the holding member 500 than the connection terminals located at both ends of the plurality of connection terminals 257. This structure can form the side slope 500*c* while maintaining the strength of the connection plug 500*b* so that the connection plug 500*b* is prevented from getting damaged even if an external force in the X direction is applied to the connection plug 500*b*.

As illustrated in FIG. 38B, the tips of the plurality of connection terminals 257 are located on the +Z direction side of the position (tilt starting position) as the starting point of the slope at the tip of the connection plug 500*b*. When the slope becomes wider in the +Z direction, it becomes easier for the connection plug 500*b* to move when an external force is applied to the camera connector 2206 in the tilt direction, so that the connection plug 500*b* can be easily prevented from getting damaged. On the other hand, in an attempt to widen the slope in the +Z direction, the connection plug 500*b* may become large in the Z direction. Accordingly, adopting the above configuration can form the slope having a predetermined width or more at the outermost tip portion while suppressing the size of the connection plug 500*b* in the Z direction.

Thus, in the above structure, the tip of the connection plug 500*b* is tilted so that the connection plug 500*b* does not easily get damaged when an external force is applied to the camera connector 2206 in the tilt direction. Even when the shoe attachment legs 500*a* provided on both sides of the connection plug 500*b* are engaged with the engagement member 551, the shoe attachment legs 500*a* may get damaged when a strong external force is applied to the camera connector 2206 in the tilt direction. Thus, the tip of each shoe attachment leg 500*a* may be tilted. If the tip of the shoe attachment leg 500*a* is tilted, the shoe attachment legs 500*a* become less likely to get damaged and each tilted portion serves as a guide for inserting and ejecting the camera connector 2206 to and from the accessory shoe 523 and facilitates the insertion and ejection.

On the other hand, the shoe attachment leg 500*a* engaged with the engagement member 551 is positioned in the Y direction when its top surface contacts the ceiling surface of the engagement member 551 in the +Y direction, so that the tip of the shoe attachment leg 500*a* may not be tilted based on the positioning accuracy in the Y direction. In consideration of both positioning in the Y direction and preventing the shoe attachment leg 500*a* from getting damaged, an area of the tilted portion may be limited (so as to be smaller than the area of the tilted portion of the connection plug 500*b*) while the tilting structure is employed. In this embodiment, each of the camera 100, the accessory 200, and the intermediate accessory 300 has 21 or 15 contacts, but the number of contacts is not limited.

In this embodiment, the microphone device and the strobe device serve as the accessory 200, but the accessory according to the present invention includes various devices other than the microphone device and the strobe device such as the electronic viewfinder unit. In this embodiment, the camera serves as an electronic apparatus, but the electronic apparatus according to the present invention also includes various electronic apparatuses other than the camera.

The above embodiment can provide a small shoe apparatus that can secure an area for many connection terminals and a shape for protecting them, and a positioning area between components, and restrain the terminal protecting portion from getting damaged.

Other Embodiments

Embodiment(s) of the present invention can also be realized by a2 computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions.

The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-094031, filed on Jun. 4, 2021, which is hereby incorporated by reference herein in its entirety.

What is claimed is:

1. A shoe apparatus attachable to and detachable from an accessory shoe apparatus of an electronic apparatus in a first direction, the shoe apparatus comprising:
a plurality of connection terminals arranged in a second direction orthogonal to the first direction;
a shoe engagement portion engageable with the accessory shoe apparatus; and
a terminal protecting portion configured to project from the shoe engagement portion toward a tip side in the first direction and to protect the plurality of connection terminals,
wherein the plurality of connection terminals are exposed in a direction orthogonal to the first and second directions from the terminal protecting portion, and include slopes that tilt in an exposed direction from inside to outside in the second direction on both sides in the second direction of the terminal protecting portion.

2. The shoe apparatus according to claim 1, wherein each of the slopes is a flat slope or a curved slope.

3. The shoe apparatus according to claim 1, wherein the shoe engagement portion engaged with the accessory shoe apparatus contacts the accessory shoe apparatus in a third direction orthogonal to the first and second directions.

4. The shoe apparatus according to claim 3, wherein while the shoe apparatus is biased to one side in the second direction of the accessory shoe apparatus, each of the slopes that contacts the accessory shoe apparatus in the third direction guides the terminal protecting portion to the other side of the second direction of the accessory shoe apparatus.

5. The shoe apparatus according to claim 1, further comprising first portions that tilt inward in the second direction toward a tip in the first direction on a tip side in the first direction and on both sides in the second direction of the terminal protecting portion.

6. The shoe apparatus according to claim 5, further comprising second portions that tilt outward in the second direction toward a tip in the first direction on both sides in the second direction of an engagement member engaged with the shoe engagement portion of the accessory shoe apparatus,
wherein a first angle as a tilt angle of the first portion to the first direction is equal to or larger than a second angle as a tilt angle of the second portion to the first direction.

7. The shoe apparatus according to claim 6, wherein the first angle is larger than the second angle.

8. The shoe apparatus according to claim 5, wherein the first portions are provided so that the terminal protecting portion alone does not contact the engagement member in a third direction orthogonal to the first and second directions before the shoe engagement portion of the shoe apparatus tilted from the first direction to the accessory shoe apparatus is engaged with the accessory shoe apparatus.

9. The shoe apparatus according to claim 1, wherein a tilt starting position as a starting point of each of the slopes is located outside connection terminals at both ends of the plurality of connection terminals in the second direction.

10. The shoe apparatus according to claim 1, wherein a width of each of the slopes is wider than a width between adjacent connection terminals included in the plurality of connection terminals in the second direction.

11. The shoe apparatus according to claim 1, wherein each of the slopes is continuously formed toward a tip in the first direction.

12. The show apparatus according to claim 11, wherein a tilt starting position as a starting point of a portion of each of the slopes formed at the tip in the first direction is further away from the tip in the first direction than tips of the plurality of connection terminals in the first direction.

13. The shoe apparatus according to claim 1, wherein each of the shoe engagement portion and the terminal protecting portion is made of a resin material.

14. The shoe apparatus according to claim 1, wherein the shoe engagement portion is made of a metal material, and the terminal protecting portion is made of a resin material.

15. An accessory comprising a shoe apparatus attachable to and detachable from an accessory shoe apparatus of an electronic apparatus in a first direction,
wherein the shoe apparatus includes:
a plurality of connection terminals arranged in a second direction orthogonal to the first direction;
a shoe engagement portion engageable with the accessory shoe apparatus; and
a terminal protecting portion configured to project from the shoe engagement portion toward a tip side in the first direction and to protect the plurality of connection terminals,
wherein the plurality of connection terminals are exposed in a direction orthogonal to the first and second directions from the terminal protecting portion, and include slopes that tilt in an exposed direction from inside to outside in the second direction on both sides in the second direction of the terminal protecting portion.

16. An accessory shoe apparatus attachable to and detachable to a shoe apparatus in a first direction,
wherein the shoe apparatus includes:
a plurality of connection terminals arranged in a second direction orthogonal to the first direction;
a shoe engagement portion engageable with the accessory shoe apparatus; and
a terminal protecting portion configured to project from the shoe engagement portion toward a tip side in the first direction and to protect the plurality of connection terminals,
wherein the plurality of connection terminals are exposed in a direction orthogonal to the first and second directions from the terminal protecting portion, and include slopes that tilt in an exposed direction from inside to outside in the second direction on both sides in the second direction of the terminal protecting portion.

17. An electronic apparatus comprising the accessory shoe apparatus according to claim 16.

* * * * *